United States Patent [19]
Yamada et al.

[11] Patent Number: 5,873,735
[45] Date of Patent: Feb. 23, 1999

[54] INFORMATION REPRODUCER AND INFORMATION CREATING UNIT

[75] Inventors: Satoshi Yamada; Hiroomi Ueda; Seiichi Senoo, all of Nara; Tsutomu Satou, Osaka, all of Japan

[73] Assignee: Sharp Kabushiki Kaisha, Osaka, Japan

[21] Appl. No.: 575,731

[22] Filed: Dec. 18, 1995

[30] Foreign Application Priority Data

Dec. 28, 1994 [JP] Japan .................................. 6-328202
Dec. 28, 1994 [JP] Japan .................................. 6-328203
Mar. 16, 1995 [JP] Japan .................................. 7-057445
Mar. 17, 1995 [JP] Japan .................................. 7-059114

[51] Int. Cl.$^6$ ...................................................... G09B 5/00
[52] U.S. Cl. ........................ 434/316; 434/169; 434/185; 434/307 R; 382/183; 235/462; 706/927
[58] Field of Search ...................................... 434/118, 156, 434/157, 169, 185, 307 R–309, 311, 317–319, 321–323, 325, 355, 362, 365; 395/101, 114, 280, 282, 651; 361/686; 463/1, 30; 235/383, 462, 375; 382/183; 707/529, 530; 706/927

[56] References Cited

U.S. PATENT DOCUMENTS

| | | | |
|---|---|---|---|
| 4,425,099 | 1/1984 | Naden | 434/311 X |
| 4,457,719 | 7/1984 | Dittakavi et al. | 434/169 X |
| 4,602,152 | 7/1986 | Dittakavi | 434/317 X |
| 4,681,548 | 7/1987 | Lemelson | 434/311 |
| 4,884,974 | 12/1989 | DeSmet | 434/317 |
| 4,994,987 | 2/1991 | Baldwin | 434/307 R X |
| 5,001,696 | 3/1991 | Baldwin | 434/308 X |
| 5,115,888 | 5/1992 | Schneider | 235/383 X |
| 5,273,437 | 12/1993 | Caldwell et al. | 434/322 X |
| 5,302,132 | 4/1994 | Corder | 434/362 X |
| 5,474,457 | 12/1995 | Bromley | 434/311 |
| 5,475,205 | 12/1995 | Behm et al. | 235/375 |
| 5,506,697 | 4/1996 | Li et al. | 235/462 X |
| 5,544,287 | 8/1996 | Rothy | 395/114 |
| 5,579,487 | 11/1996 | Meyerson et al. | 395/280 |
| 5,613,909 | 3/1997 | Stelovsky | 434/323 X |
| 5,635,698 | 6/1997 | Terada | 235/462 |
| 5,765,176 | 6/1998 | Bloomberg | 707/530 X |
| 5,768,402 | 6/1998 | Ikeda et al. | 235/462 X |

FOREIGN PATENT DOCUMENTS

| | | |
|---|---|---|
| 61-177068 | 8/1986 | Japan . |
| 61-259380 | 11/1986 | Japan . |
| 3-11482 | 1/1991 | Japan . |
| 3-291754 | 12/1991 | Japan . |
| 5-12288 | 1/1993 | Japan . |

*Primary Examiner*—Joe H. Cheng
*Attorney, Agent, or Firm*—Nixon & Vanderhye P.C.

[57] ABSTRACT

An information reproducer which includes reading device for a reading visual information and sound information printed on a printing sheet, a storage device for storing the visual information and the sound information read by the reading device, a display device for selectively displaying the stored visual information on a screen, a visual information designating device for designating a partial area of the visual information displayed on the display screen, a connecting device for connecting the partial area of the visual information designated by the designating device with a part of the sound information corresponding thereto, and a sound information reproducing device for reading, from the storage device, and reproducing the sound information connected with the designated visual information.

11 Claims, 64 Drawing Sheets

| 1 | a1 (xa1,ya1) (xa1,ya1') | b1 (xb1,yb1) (xb1,yb1') | - - - - - | s1 s1' |
|---|---|---|---|---|
| 2 | a2 (xa2,ya2) (xa2',ya2') | b2 (xb2,yb2) (xb2',yb2') | - - - - - | s2 s2' |
| 3 | a3 (xa3,ya3) (xa3',ya3') | b3 (xb3,yb3) (xb3',yb3') | - - - - - | s3 s3' |
| n | an (xan,yan) (xan',yan') | bn (xbn,ybn) (xbn',ybn') | - - - - - | sn sn' |

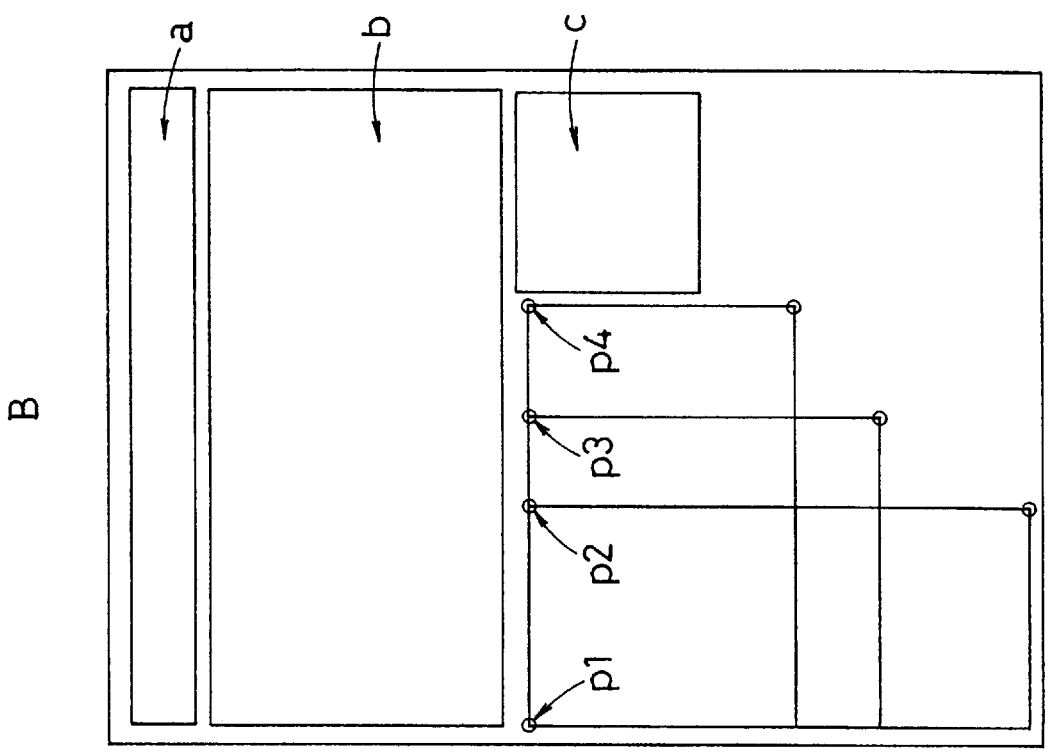
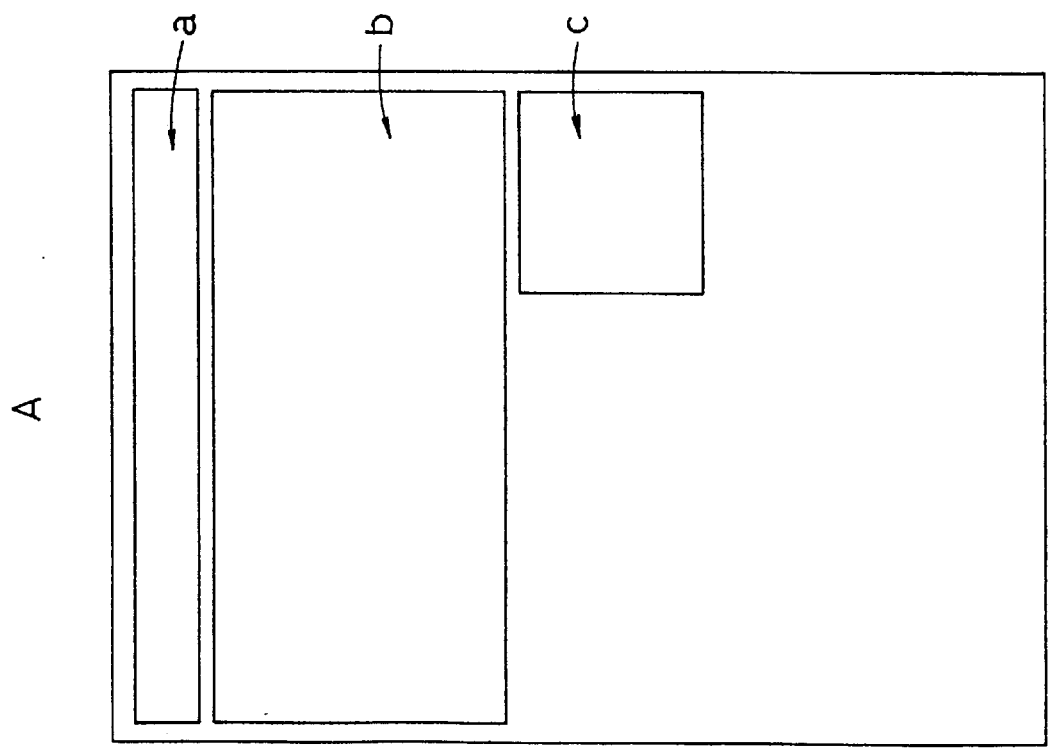
Fig.32

PRINT EXAMPLE

INFORMATION REPRODUCER AND INFORMATION CREATING UNIT

BACKGROUND OF THE INVENTION

1. Field of the Invention

The present invention relates to an information reproducer and an information creating unit, and more particularly to an information processing system wherein sound information converted into two-dimensional bar code is related to visual information (an information source such as document information, image information and graphic information) which has been utilized by various document processors such as a Japanese word processor, various image processors such as an optical file, and communication terminals, POS terminals, cash registers having various information transferring functions and the like, the related information thus obtained is printed on a printing sheet, and the visual information and the sound information are connected together based on the related information which is printed so as to transfer information.

2. Description of the Related Art

At present, a record medium such as a printing sheet or a floppy disk has mainly been used as means for interchanging and distributing information. Every document and image information is recorded on the record medium. However, a printing sheet having bar code descriptions has been proposed in place of the record medium. The code descriptions encode and describe document information, image information and the like.

If such a printing sheet is used to interchange and distribute data, costs can be reduced as compared with the case where a floppy disk is used. In addition, the printing sheet serves for security because data cannot directly be decoded.

Japanese Laid-Open Patent No. 5-12288 has disclosed an information processor in which document information and the encoded document information are printed and used. According to the information processor described above, the document information is converted into the encoded information having one-dimensional bar code such as JIS code, and the encoded information thus obtained is printed on a recording sheet. The recording sheet is read and inverted as required, so that the encoded information is returned to the document information for use. In the case where the recording sheet is copied or transmitted by a facsimile, the encoded information is not degraded and information absence or error can be prevented from occurring very often.

However, since information volume expressed in bar code which can be recorded on a printing sheet or the like is small, application is restricted. For example, the printing sheet is not suitable for encoded sound information.

Sound information is generally recorded on a record medium such as a magnetic tape or a CD. Instead, a printing sheet which records the sound information in two-dimensional bar code having a mesh pattern has been considered.

The two-dimensional bar code means a mark (two dimensional pattern) which can optically be read and given to virtual matrix (two-dimensional) lattice.

Japanese Laid-Open Patent No. 3-11482 has disclosed a sound recording method and device and a sound reproducing method and device wherein sound information is printed on a printing sheet in two-dimensional bar code. According to the sound recording method and device and the sound reproducing method and device, a sound is digitized, and the digital data thus obtained is converted into an image having a mesh pattern so as to be printed on a printing sheet. Inversely, the printing sheet on which the image having a mesh pattern is printed is read by an image reader, digitized and analog-converted so that a sound can be reproduced.

Although sound information can be printed on the sheet, it is not related to other printing information on the periphery. The sound information recorded on a sheet is only reproduced as a group of sound information and cannot be further utilized.

Accordingly, if it is possible to relate the sound information to other visual information, and to reproduce the sound information as required, and call and edit the visual information corresponding to the sound information, additional values can be obtained.

There have been known an apparatus in which the document for plural pages can be reduced and printed on a sheet (for example, see Japanese Laid-Open Patent No. 61-177068) and an apparatus in which a plurality of document information are collectively outputted to a single-unit copying sheet, the abstract of the document information stored in a storage sheet is created and retrieval information is added to a copying sheet (for example, see Japanese Laid-Open Patent No. 3-291754).

However, even though plural kinds of information such as document information, image information and the like are reduced, printed and arranged on a sheet, and such information is read from the printing sheet by a scanner, the information are not reduced by encoding so that it is hard to restore and reuse them as type information.

SUMMARY OF THE INVENTION

In consideration of such circumstances, it is an object of the present invention to provide an information reproducer and an information creating unit in which the sound information printed on a printing sheet in two-dimensional bar code is related to the visual information so that the sound information requested by the visual information can be outputted as required, and the contents of the visual information can be displayed according to the outputted sound information.

Thus, the present invention provides an information reproducer including reading structure for reading visual information and sound information printed on a printing sheet, a storage device for storing the visual information and the sound information read by the reading structure, a display for selectively displaying the stored visual information on a screen, visual information designating structure for partially designating an area of the visual information displayed on the display screen, connecting structure for connecting a part of the visual information designated by the designating structure with a part of the sound information corresponding thereto, and sound information reproducing structure for reading, from the storage device, and reproducing the sound information connected with the designated visual information.

The information reproducer of the present invention uses a print sheet created by an information creating unit including a visual information input for inputting visual information, a sound information input for inputting sound information, a related information input for inputting the related information which relates the visual information to the sound information, and printing structure for printing the visual information, the sound information and the related information together on a printing sheet.

It is another object of the present invention to add the function of automatically correcting the related information in correspondence to the edit such as retrieval or movement of the visual information, to add the function of automatically correcting the related information in correspondence to the edit such as movement or copy of the sound information, and to add a secret function to the sound information.

The above and other objects of the present invention will become apparent from the description hereinafter.

BRIEF DESCRIPTION OF THE DRAWINGS

The accompanying drawings are as follows;

FIGS. 32A and 32B are diagrams showing an example (1) of two-dimensional bar code input to the printing sheet according to the present invention;

DESCRIPTION OF THE PREFERRED EMBODIMENTS

The present invention will be described in detail with reference to the drawings. The present invention should not be construed as being limited by the following embodiments.

Figure 1:
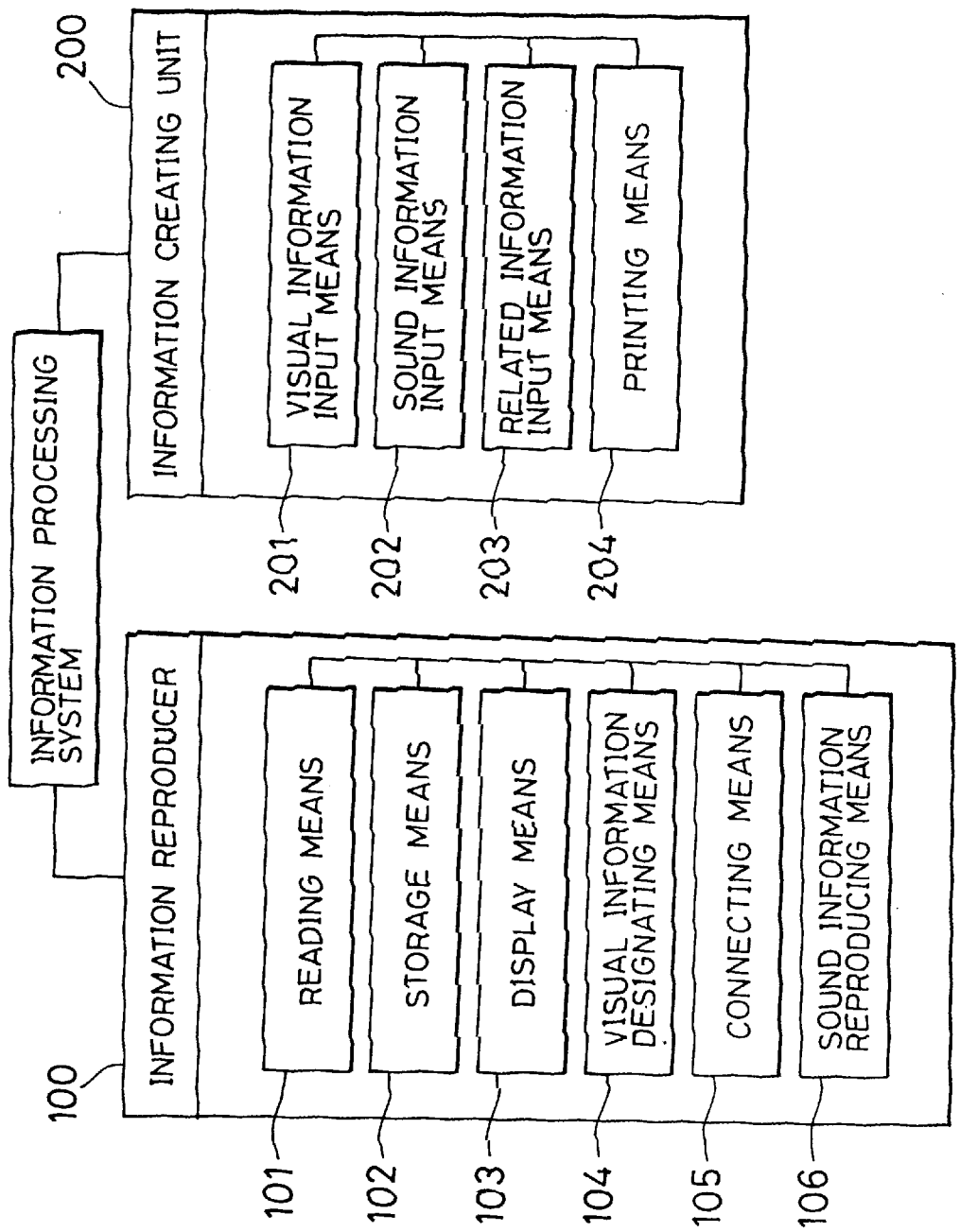
FIG. 1 is a block diagram showing a structure according to the present invention.

FIG. 1 is a block diagram showing a structure according to the present invention. As shown in FIG. 1, an information creating unit of the present invention basically comprises reading means 101 for reading visual information and sound information printed on a printing sheet, storage means 102 for storing the visual information and the sound information read by the reading means, display means 103 for selectively displaying the stored visual information on a screen, visual information designating means 104 for partially designating an area of the visual information displayed on the display screen, connecting means 105 for connecting a part of the visual information designated by the designating means with a part of the sound information corresponding thereto, and sound information reproducing means 106 for reading, from the storage means, and reproducing the sound information connected with the designated visual information.

The present invention provides an information processing system comprising an information creating unit 200 which includes visual information input means 201 for inputting visual information, sound information input means 202 for inputting sound information, related information input means 203 for inputting the related information which relates the visual information to the sound information, and printing means 204 for printing the visual information, the sound information and the related information together on a printing sheet.

According to the present invention, the information creating unit 200 creates a printing sheet on which the visual information, the sound information and the related information which relates the visual information to the sound information are printed, and the connecting means 105 connects the visual information and the sound information related to the visual information, based on the related information printed on the printing sheet.

Accordingly, the sound information reproducing means 106 can reproduce the sound information related to the visual information as required.

According to the present invention, various image sensors (for example, a CCD sensor) can be used as the reading means 101.

A display device such as a CRT display or a LCD (liquid crystal display) can be used as the display means 103.

Various sound generators which comprise a speaker and a D/A converter for converting digital sound information into analog sound information can be used as the sound information reproducing means 106.

An input device such as a keyboard, a pen or a mouse can be used as the visual information designating means 104, the visual information input means 201 and the related information input means 203.

It is preferred that an image reader is used as the visual information input means 201 when inputting image information.

The storage means 102 and the connecting means 105 comprise a microcomputer which includes a CPU, a ROM, a RAM and an I/O port.

The RAM is used as means for storing the visual information, the sound information and the related information, and a CPU work area (for example, a conversion data area).

The connecting means 105 usually recognizes the contents of the related information obtained from the related information input means 203 so as to relate the visual information to the sound information. If there is no related information, the connecting means 105 may have a dictionary in advance so as to relate the visual information to the sound information.

In the ROM are stored a functional program such as a control program for causing the CPU to control each means and a program for creating the related information, two-dimensional bar code conversion data, and related information conversion data.

Various sound input devices comprising a microphone and a D/A converter for converting analog sound information into digital sound information can be used as the sound information input means 202.

Various printers such as a thermal printer, a laser printer and the like can be used as the printing means 204.

The information creating unit further comprises visual information storing means for storing the visual information inputted by the visual information input means, area designating means for designating the sound information inputted by the sound information input means and an area in which the sound information is related to the visual information inputted by the visual information input means, converting means for converting, into two-dimensional bar code, the sound information and the related information which relates the sound information to the visual information, sound information storing means for storing the sound information converted into the two-dimensional bar code, related information storing means for storing the related information converted into the two-dimensional bar code, and display means for displaying the visual information and the sound information. Accordingly, the printing means can express the sound information and the related information in two-dimensional bar code and print them together with the visual information on the printing sheet.

Since the visual information and the sound information are related and stored, the processing for corresponding them can be executed.

Because the sound information and the related information are printed in two-dimensional bar code having great information volume, the area occupied on the printing sheet is reduced.

The area designating means is comprised of a cursor key of a keyboard. The converting means converts the digital sound information and the related information into two-dimensional bar code by means of the two-dimensional bar code conversion data.

The reading means has the function of reading the sound information and the related information expressed in two-dimensional bar code from the printing sheet which is created by the information creating unit. The display means has the function of displaying, on a screen, the visual information read by the reading means, and the sound and related information expressed in two-dimensional bar code. The sound information reproducing means has the function of reproducing the sound information converted into the two-dimensional bar code.

According to such a structure, for example, when a part of the visual information to be displayed is designated, the sound information which is related to the visual information thus designated is reproduced from the two-dimensional bar code.

There is further provided print control means for deciding the printing arrangement on a printing sheet of the visual information stored in the visual information storing means, the sound information stored in the sound information storing means and the related information stored in the related information storing means. The print control means has the function of printing only the sound or related information in the vicinity of the visual information designated by the area designating means.

According to the structure described above, the relationship between the visual information and the sound information can easily be discriminated. Therefore, if the information related to the sound information which is printed on the printing sheet is indicated, the sound information can immediately be heard.

Means for preventing the read error of the sound information to be printed on the printing sheet is provided, so that the grade of the sound information can be ensured.

There is further provided print control means for deciding the printing arrangement on the printing sheet of the visual information stored in the visual information storing means, the sound information stored in the sound information storing means and the related information stored in the related information storing means.

The print control means has the function of printing only the sound or related information on the peripheral portion of the visual information.

According to such a structure, a printing format is determined to answer the purpose at the time of reproduction. When reading the printing sheet, the two-dimensional bar code of the sound or related information is read prior to the visual information. Consequently, it is possible to easily deal with the information which is subsequently called. In addition, a sound can be outputted while the related sound information are being sequentially extracted from the head in the process of reading the printing sheet.

There are further provided reproducing condition designating means for designating the reproducing conditions of the sound information and identifying means for identifying the sound information from the two-dimensional bar code read by the reading means. The sound information reproducing means reproduces the sound information identified by the identifying means according to the conditions designated by the reproducing condition designating means. With such a structure, when reading the sound information from the printing sheet and reproducing the same, the output of the sound information can be controlled to turn down the volume or the reproduction of the sound information can be stopped in consideration of circumstances. Apart from the read of information on the printing sheet and the sound output timing, it is possible to previously read the information and then output a sound while verifying the information displayed on a display portion. In the case where a cursor is moved when outputting the sound information, the sound information which is being reproduced is not stopped and a sound can continuously be outputted until the end of the sound information even though the cursor is moved beyond the object area of the sound information. Thus, the cursor can be moved to the next work while hearing the sound which is being outputted.

There are further provided display condition designating means for designating the display conditions of the two-dimensional bar code which is displayed by the display means, and display control means for making the display means display the two-dimensional bar code in compliance with the display conditions designated by the display condition designating means.

According to such a structure, in the case where the sound and visual information expressed in two-dimensional bar code are displayed together, it is possible not to display the two-dimensional bar code when it is hard to read the visual information.

There are further provided coordinate designating means for designating the specific position coordinates of the sound information displayed by the display means, and display control means for referring to the related information to scroll a screen so that the visual information related to the reproduced sound information is displayed in the display area of the display means when the sound information reproducing means reads the sound information corresponding to the designated coordinates from the sound information storing means and reproduces the same.

According to such a structure, the related visual information is scrolled and displayed on the display screen while reproducing the sound information corresponding to the specific position.

There are further provided cursor moving means for moving a cursor in the screen area of the display means, and area deciding means for deciding whether the visual information related to the sound information gets out of the display area or not when the display control means scrolls the screen in correspondence to cursor movement.

The display control means scrolls the screen so that the visual information related to the sound information which is being reproduced can always remain in the display area based on the result of decision outputted from the area deciding means even though the cursor is moved by the cursor moving means while the sound information reproducing means is reproducing the sound information in the specific position which is designated.

With such a structure, the visual information related to the sound information which is being reproduced does not get out of the display area.

There are further provided all information storing means for storing the visual information read by the reading means and all information on two-dimensional bar code, and retrieval designating means for designating to retrieve all the visual information related to the sound information. When the sound information reproducing means sequentially reproduces the sound information expressed in two-dimensional bar code according to the designation of the retrieval designating means, the display control means scrolls the screen so that the visual information related to the sound information which are being reproduced are sequentially displayed in the display area.

According to such a structure, when the designation for retrieving all the information related to the sound information is inputted, all the sound information are sequentially reproduced so that the information related thereto can be displayed on the screen. Consequently, the contents of the sound information can be grasped simultaneously.

There are further provided code expression area calculating means for calculating the code expression area of two-dimensional bar code corresponding to the sound information volume inputted by the sound information input means, starting point designating means for designating the starting point of the sound information to be printed on a screen, length designating means for designating the length of a vertical or horizontal side of a rectangle, and length calculating means for calculating the length of another vertical or horizontal side.

According to such a structure, when encoding the inputted sound information to two-dimensional bar code and printing the same on the printing sheet, the starting point for printing on the screen and the vertical or horizontal length are respectively designated so that the vertical or horizontal length is automatically calculated from the code expression area obtained based on the sound information volume and the area to be printed on the screen can be displayed in a real time. Consequently, it is possible to perform verification by the eye so that the printing sheet can efficiently be used.

The two-dimensional bar code has a low density dot size and a high density dot size. There is further provided dot size designating means for designating the density of a dot size of the two-dimensional bar code. The converting means converts the inputted sound information into the two-dimensional bar code having the designated dot size.

According to such a structure, when encoding the inputted sound information to the two-dimensional bar code and printing the same on the printing sheet, the dot size of the two-dimensional bar code can be set to a high or low density according to the situation. Consequently, when reading the sound information, the area occupied by the two-dimensional bar code can be adjusted while ensuring the grade of the two-dimensional bar code.

There are further provided data expression area calculating means for calculating the data expression area of visual information, residual area calculating means for calculating the residual area expressed in two-dimensional bar code from all the expression area and the data expression area, code expression area calculating means for calculating the code expression area of the two-dimensional bar code based on the low or high density dot size from the inputted sound information volume, dot size deciding means for comparing the residual area with the code expression area so as to decide whether the dot size of the two-dimensional bar code should be set to a low or high density, and dot size switching means for switching the density of the dot size of the two-dimensional bar code based on the result of decision.

According to such a structure, the dot size of the two-dimensional bar code is automatically decided to be switched to a high or low density in correspondence to the status of the area occupied by the two-dimensional bar code. Consequently, when reading the sound information, the area in which the sound information can be printed can efficiently be used while ensuring the grade of the two-dimensional bar code.

When switching the density of the dot size of the two-dimensional bar code based on the result of decision obtained by the dot size deciding means, the dot size switching means sets the dot size to a low density till the midway area of the code expression area which can be expressed in two-dimensional bar code, and to a high density in the residual area.

According to the status of the area occupied by the two-dimensional bar code, the dot size of the two-dimensional bar code can be switched from a low density to a high density on the way, so that the area in which the sound information can be printed can fully be utilized. There is further provided compressing means for sampling the sound information inputted by the sound information input means and adjusting the same at a stepwise compression level. The converting means converts the sound information into the two-dimensional bar code at a compression level where the sound information reproduced by the sound information reproducing means can be heard.

According to such a structure, when converting the inputted sound information to the two-dimensional bar code, the compression level of the sound information is adjusted to the range in which the sound information can be heard so that the read error of the two-dimensional bar code can be reduced.

There are further provided secret adding means for adding the secret function to all or a part of the sound information inputted by the sound information input means, password setting means for setting a password corresponding to the secret function, password deciding means for deciding whether the inputted password and the set password match or not, and secret canceling means for canceling the secret function. The converting means converts the set password into the two-dimensional bar code, and the sound information reproducing means reproduces the sound information corresponding to the password.

According to such a structure, the password is set to the inputted sound information so that the secret function can be added and canceled.

The password is comprised of sound waveform. The password deciding means includes sound waveform comparing means for comparing the sound waveform of the inputted password with that of the set password.

With such a structure, when adding the secret function to the inputted sound information so as to set a password, a sound can be shaped into waveform and stored as a password and the inputted sound can be compared with the waveform of the password so that it is possible to add and cancel the secret function of the sound information by a sound.

There is further provided retrieving means for retrieving the sound information corresponding to each password which is set by the secret adding means.

Since a plurality of secret functions which can set a password every inputted sound information, the sound information corresponding to the password can be retrieved.

There is further provided sort table generating means for generating sort tables for each password which is set and the sound information related to the password when the password setting means sets a plurality of passwords for each sound information.

According to such a structure, when retrieving each sound information related to the set password, the sort tables for the set password and the sound information related to the password can be displayed or printed on a screen.

Coordinate designating means, area designating means, area moving means and related information correcting means are provided. The coordinate designating means designates the specific position coordinates of the sound information displayed by the display means. The area designating means designates an area to which the sound information on the designated specific position coordinates is moved. The area moving means moves the sound information to the designated area. The related information correcting means automatically corrects the coordinate information of the related information stored in the related information storing means with the area movement of the sound information.

With such a structure, when moving the sound information displayed on a display screen to the designated area by the area moving means, the coordinate information of the related information is corrected by the related information correcting means interlockingly with the area movement so that it is not necessary to set the coordinates of the related information again.

The related information correcting means includes page number adding means for adding the page numbers of printing sheets to the related information. In the case where the sound information expressed in two-dimensional bar code is related to the sound information described on plural pages, the page numbers are added to the related information and the coordinate information on the pages are corrected together.

With such a structure, in the case where the sound information expressed in two-dimensional bar code is related to the information described on plural pages, the page numbers are added to the related information and the coordinate information on the pages are corrected together. Consequently, it is possible to manage the sound information on plural pages.

There is further provided area copying means for copying the sound information designated by the area designating means. The related information correcting means adds the related information and corrects the coordinate information with the area copy of the sound information.

According to such a structure, when an area for copying the sound information is designated and the sound information is copied by the area copying means, the related information correcting means additionally corrects the related information interlockingly. Consequently, it is not necessary to set the coordinates of the related information again.

There is further provided enlarging/reducing means for enlarging and reducing the dot size of the sound information designated by the area designating means. The related information correcting means correct the coordinate information of the related information with the enlargement and reduction of the sound information.

According to such a structure, the dot size of the two-dimensional bar code can be set in correspondence to the resolution level on the reader side.

There are further provided additional area designating means, additional inserting means, area moving means and aligning means. The additional area designating means designates an area where the sound information is additionally inserted. The additional inserting means additionally inserts the sound information expressed in two-dimensional bar code into a plurality of sound information expressed in two-dimensional bar code in the visual information. The area moving means moves the sound information with the additional insertion of the sound information. The aligning means realigns the related information thus additionally inserted. The related information correcting means corrects the coordinate information of the related information stored in the related information storing means with the additional insertion of the sound information.

According to such a structure, when the additional inserting means additionally inserts the sound information expressed in two-dimensional bar code into a plurality of sound information expressed in two-dimensional bar code in the visual information, the aligning means realigns the related information stored in the related information storing means with the additional insertion of the sound information and the related information correcting means corrects the coordinate information of the related information. Consequently, it is possible to easily retrieve the information.

All information storing means, retrieval designating means and sound information retrieving means are further provided. The all information storing means stores the visual information described on plural pages and all information on two-dimensional bar code. The retrieval designating means designates to retrieve only the sound information out of all the information stored in the sound information storing means. The sound information retrieving means retrieves all the sound information based on the related information and outputs the same to the printing means. The printing means aligns the sound information thus retrieved and prints the same on the printing sheet.

According to such a structure, the printing means aligns the retrieved sound information and prints the same on the printing sheet. Consequently, it is possible to pick up only the sound information from the information described on plural pages and save the same on the printing sheet. In addition, it is not necessary to retrieve the sound information on plural pages.

There are further provided sound information selecting means for selecting the sound information and reading means for reading, on the display screen, the visual information corresponding to the selected sound information with reference to the related information.

With such a structure, it is possible to pick up the sound information and call the information related to the sound information. Consequently, the information can be retrieved more efficiently. In addition, the information related to the sound information on plural pages can be easily retrieved.

The present invention provides an information creating unit comprising visual information input means for inputting the visual information comprised of document information, printing means for printing at least one of the visual information and the two-dimensional bar code on a printing sheet, page eject code adding means for adding the first page eject code and the second page eject code to the inputted document information, converting means for converting the document information into a type pattern and two-dimensional bar code, and print control means for printing the document information on the printing sheet in one of the type pattern and two-dimensional bar code and performing the page eject of the printing sheet based on one of the first page eject code and the second page eject code, wherein when printing the document information in the type pattern, the print control means makes the first page eject code valid and the second page eject code invalid, and when printing the document information in two-dimensional bar code and printing the same in both the type pattern and two-dimensional bar code, the print control means makes the first page eject code invalid and the second page eject code valid, so that the page eject of the printing sheet can be performed.

According to the present invention, the information printing volume for each page can be adjusted even though the type pattern and the two-dimensional bar code make various printing densities.

There are further provided display means for displaying visual information and two-dimensional bar code on a screen, and computing means for calculating the sum of the size of a corresponding type pattern printing area and that of a two-dimensional bar code printing area and for displaying, by display means, a decision value for deciding the document information volume which can be printed on a printing sheet based on the sum thus obtained when printing the inputted document information in the type pattern and two-dimensional bar code.

With such a structure, the second page eject code can easily be added based on the contents which are displayed when printing the document information in both the type pattern and two-dimensional bar code.

There are further provided display means for displaying visual information and two-dimensional bar code on a screen, and computing means for calculating the size of a corresponding two-dimensional bar code printing area and for displaying, by display means, a decision value for deciding the document information volume which can be printed on a printing sheet based on the sum thus obtained when printing the inputted document information in two-dimensional bar code.

With such a structure, the second page eject code can easily be added based on the contents which are displayed when printing the document information only in two-dimensional bar code.

There are further provided display means for displaying visual information and two-dimensional bar code on a screen, and computing means for calculating the sum of the size of a corresponding type pattern printing area and that of a two-dimensional bar code printing area and for displaying, by the display means, a decision value for deciding the document information volume which can be printed on a printing sheet based on the sum thus obtained when printing a part of the inputted document information in the type pattern, and others in two-dimensional bar code.

With such a structure, the second page eject code can easily be added based on the contents which are displayed when printing a part of the document information in the type pattern, and others in two-dimensional bar code.

The printing means prints the inputted document information on a printing sheet in the type pattern and two-dimensional bar code.

According to such a structure, the same document information can be printed on the printing sheet in both the type pattern and two-dimensional bar code.

The printing means prints the inputted document information on the printing sheet in two-dimensional bar code.

With such a structure, all the print information can be kept secret.

The printing means prints, on the printing sheet, a part of the inputted document information in the type pattern, and others in two-dimensional bar code.

With such a structure, when the document information printed in the type pattern is used as a title, header or summary, it is easy to retrieve the information printed in two-dimensional bar code and grasp the contents thereof.

According to the structure of the present invention, a RAM of a microcomputer forms the visual information storing means, the sound information storing means, the related information storing means and the all information storing means which are not shown. A CPU of a microcomputer forms the converting means, the print control means, the display control means, the identifying means, the area deciding means, the code expression area calculating means, the length calculating means, the data expression area calculating means, the residual area calculating means, the dot size deciding means, the dot size switching means, the compressing means, the secret adding means, the password deciding means, the sound waveform comparing means, the retrieving means, the sort table generating means, the area moving means, the related information correcting means, the page number adding means, the area copying means, the enlarging/reducing means, the additional inserting means, the aligning means, the reading means, the page eject adding means and the computing means which are not shown. The CPU functions as each means by functional programs.

A keyboard, a pen, a tablet, a coordinate detecting circuit and a cursor position control circuit form the area designating means, the reproducing condition designating means, the display condition designating means, the coordinate designating means, the retrieval designating means, the starting point designating means, the length designating means, the dot size designating means, the password setting means, the secret canceling means, the additional area designating means and the sound information selecting means which are not shown.

Figure 2:
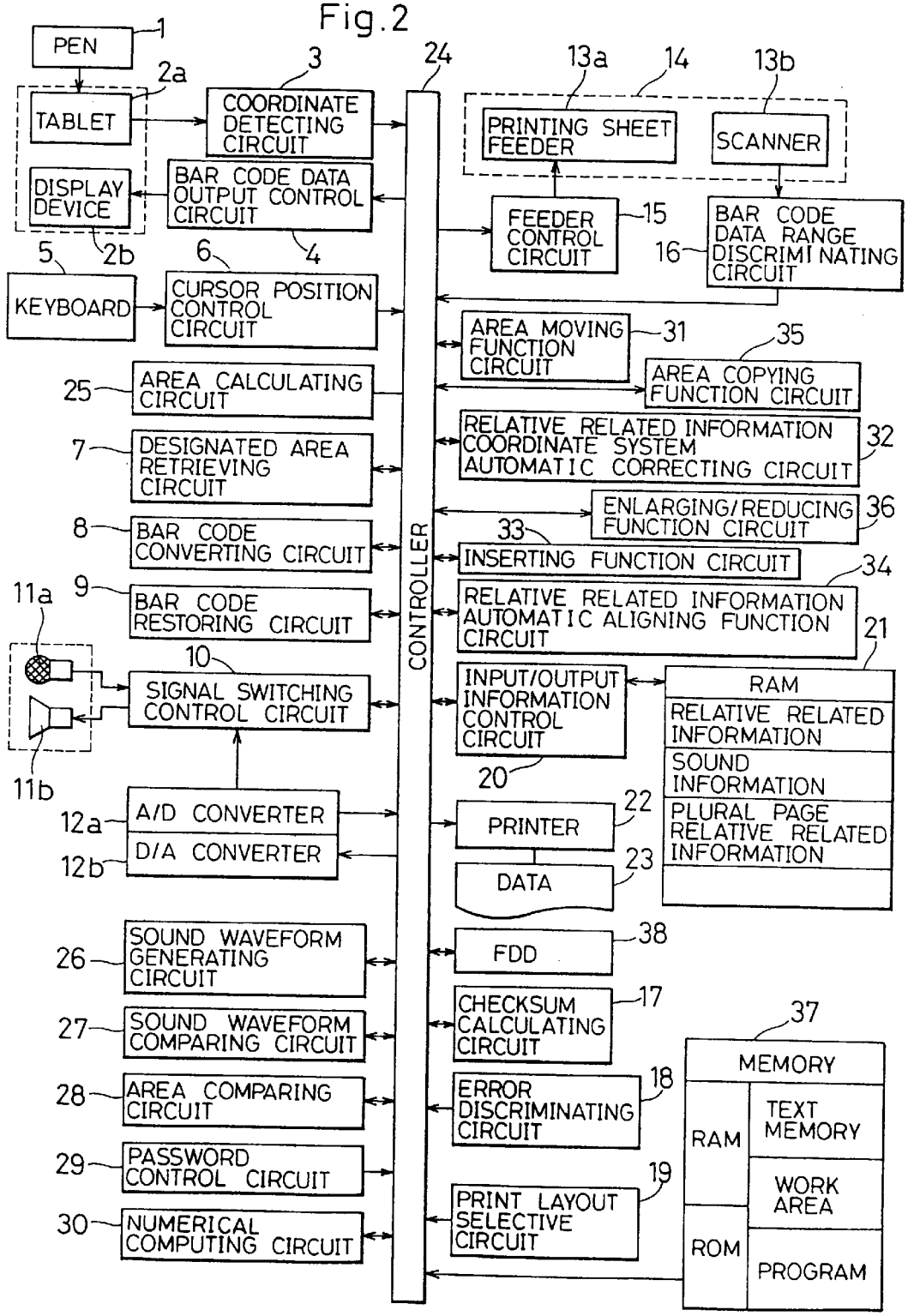
FIG. 2 is a block diagram showing a structure according to an embodiment in which the present invention is applied to a data processing system capable of printing and reading sound information.

FIG. 2 is a block diagram showing a structure according to an embodiment in which the present invention is applied to a data processing system capable of printing and reading sound information.

In FIG. 2, the reference numeral 1 denotes a pen for designating coordinates on a display screen (for example, coordinate designating means), the reference numeral 2*a* denotes a tablet for detecting a point on the display screen which is designated by the pen 1, and the reference numeral 2*b* denotes a display device having a display screen such as a LCD (liquid crystal display). The display device 2*b* displays the contents of a RAM or a text memory as requested. The reference numeral 3 denotes a coordinate detecting circuit for detecting the position coordinates designated by the pen 1.

The reference numeral 4 denotes a bar code data output control circuit for controlling the output of two-dimensional bar code data which is displayed on the screen of the display device. The reference numeral 5 denotes a keyboard, for example, an operating portion for implementing the functions as the visual information input means, retrieval designating means, starting point designating means, length designating means, dot size designating means, password setting means, secret canceling means, additional area designating means, sound information selecting means and character converting means. The keyboard 5 is comprised of a function key corresponding to the function guidance displayed on the display device 2*b*, execution and cancel keys for controlling programs, a type input key for additionally correcting a text memory, a cursor key for operating the coordinates of the display device and the like. The reference numeral 6 denotes a cursor position control circuit.

The reference numeral 7 denotes a designated area retrieving circuit (area designating means) for retrieving the positional relationship between a cursor and sound producing areas in document information, image information and graphic information.

The reference numeral 8 denotes a bar code converting circuit (converting means) for converting the digitized sound information into two-dimensional bar code. The reference numeral 9 denotes a bar code restoring circuit (a part of sound information reproducing means) for converting the two-dimensional bar code sound information which is read into digital sound information. The reference numeral 10 denotes a signal switching control circuit for switching and controlling a signal inputted from a microphone and a signal outputted to a speaker. The reference numeral 11*a* denotes a microphone (MC, sound information input means) for fetching sound information. The reference numeral 11*b* denotes a speaker (a part of the sound information reproducing means) for outputting sound information. The reference numeral 12*a* denotes an A/D converter for converting the analog signal of the inputted sound information into a digital signal. The reference numeral 12*b* denotes a D/A converter for converting the digital signal of the sound information to an analog signal.

The reference numeral 13*a* denotes a printing sheet feeder for feeding, into a scanner 13*b*, a printing sheet on which the sound information, the visual information and the related information are printed.

The reference numeral 13*b* denotes a scanner (reading means) for reading various information printed on the printing sheet as images, An image reader 14 is comprised of the printing sheet feeder 13*a* and the scanner 13*b*.

The reference numeral 15 denotes a feeder control circuit for controlling the printing sheet feeder 13*a*. The reference numeral 16 denotes a bar code data discriminating circuit for detecting the range of two-dimensional bar code information printed on the printing sheet.

The reference numeral 17 denotes a checksum calculating circuit for calculating a checksum for detecting read error. The reference numeral 18 denotes an error discriminating circuit for discriminating the error obtained by comparing two-dimensional bar code with the checksum. The reference numeral 19 denotes a printing layout selecting circuit. The reference numeral 20 denotes an input/output information control circuit (reading means) for controlling input/output data from/to a RAM. The reference numeral 21 denotes a RAM for storing the related information, the sound information and the like (visual information storing means, sound information storing means, related information storing means and all information storing means).

The reference numeral 22 denotes a printer such as a thermal printer, which prints out the contents of a RAM or text memory as requested. The reference numeral 23 denotes the data which is printed.

The reference numeral 24 denotes a controller for controlling all circuits (each means), which is comprised of a microcomputer including a CPU, a RAM, a ROM and an I/O port. The ROM stores programs for controlling each circuit. The controller 24 functions as the connecting means, the print control means, the display control means, the secret adding means, the password setting means, the retrieving means, the sort table generating means, the page number adding means, the sound information retrieving means and the like.

The reference numeral 25 denotes an area calculating circuit for calculating an area which can be printed on a printing sheet, an area for printing the visual, sound and related information, and an area designated by the pen 1, the keyboard 5 or the like (code expression area calculating means, data expression area calculating means, residual area calculating means). The area calculating circuit 25 is comprised of a CPU.

The reference numeral 26 denotes a sound waveform generating circuit for converting the inputted sound signal (password) into waveform. The reference numeral 27 denotes a sound waveform comparing circuit (sound waveform comparing means) for comparing two sound signals which are shaped into waveform and discriminating match or mismatch.

The reference numeral 28 denotes an area comparing circuit (area deciding means) for comparing values calculated by the area calculating circuit 25 and deciding which value is greater. The reference numeral 29 denotes a password control circuit (password deciding means, secret canceling means) for comparing the password printed on the printing sheet with the password inputted later and controlling secret cancel depending on the match or mismatch of the passwords. The reference numeral 30 denotes a value computing circuit (length calculating means) for performing every calculation. The value computing circuit 30 is comprised of a CPU.

The reference numeral 31 denotes an area moving function circuit (area moving means) for moving an area. The reference numeral 32 denotes a coordinate system automatic correcting circuit (related information correcting means) for correcting the coordinates of the related information. The reference numeral 33 denotes an inserting function circuit (additional inserting means) for additionally inserting sound information into each information. The reference numeral 34 denotes an automatic aligning function circuit (aligning means) for aligning the relative related information based on the coordinates. The reference numeral 35 denotes an area copying function circuit (area copying means). The reference numeral 36 denotes an enlarging/reducing function circuit (enlarging/reducing means) for enlarging and reducing the dot size of the sound information.

The reference numeral 37 denotes a memory comprised of a RAM and a ROM. The RAM includes a text memory and a work area. The ROM stores programs for the controller 24 to control two-dimensional bar code creation, two-dimensional bar code recognition, edit mode management, edit printing and the like. Partly, information can be read from a floppy disk driver (FDD) 38 and used again.

A method for inputting a sound in a data processing system shown in FIG. 2 and a method for displaying and printing the same will be described below.

First, document information, graphic information, image information and others are created by the keyboard 5, the pen 1, the image reader 14 and the like. Then, a sound is inputted.

The present invention will be described in detail with reference to FIGS. 3 to 27.

Figure 3:
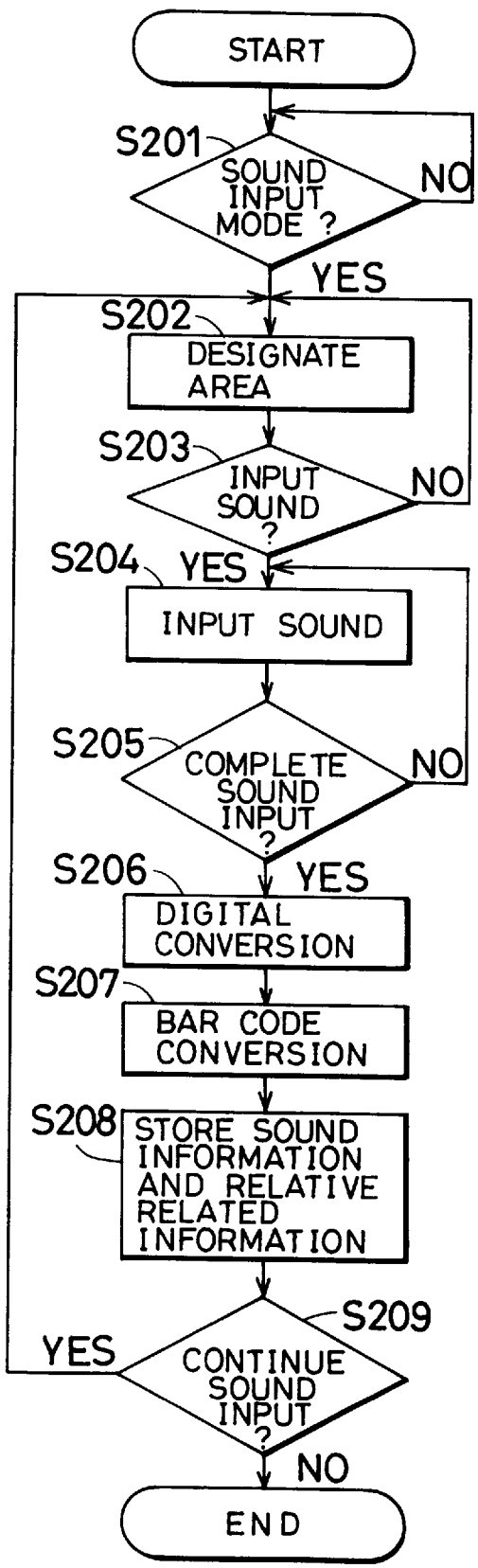
FIG. 3 is a flowchart showing the contents of sound input processing in a data processing system according to the present invention.
Figure 4:
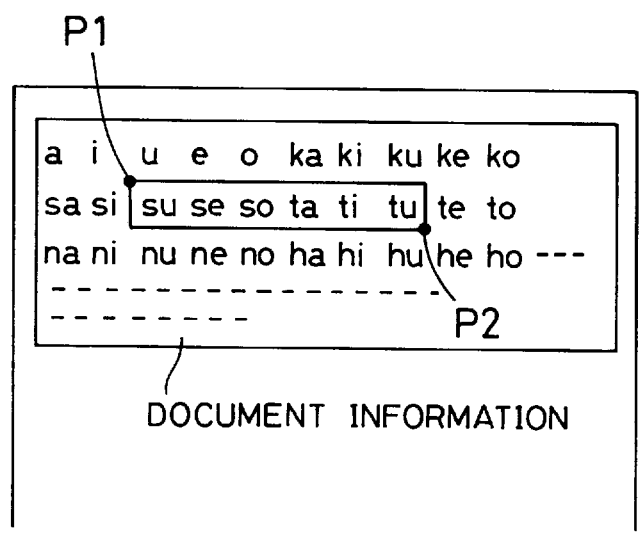
FIG. 4 is a diagram showing a method for designating the area of visual information according to the present invention.

The contents of the processing for inputting a sound in the data processing system shown in FIG. 2 will be described with reference to a flowchart in FIG. 3.

First, the routine proceeds to the decision of the sound input mode (Step S201). Then, a portion of which sound is produced is designated by coordinate designating means such as the cursor or the tablet 2a integrated with the display device 2b as shown by P1 and P2 of FIG. 4 (Step S202). A sound input key in the keyboard 5 is pressed down through the microphone 11a (Step S203) to start sound input (Step S204). The sound input key is pressed down again (Step S205) to complete the sound input.

The analog signal of the inputted sound is converted into a digital signal by the A/D converter 12a (Step S206) and two-dimensional bar code data is converted by the bar code converting circuit 8 (Step S207). At this point, the coordinate information of the designated areas for the document, graphic and image information is related to two-dimensional bar code sound information (Step S207).

The related information (relative related information) by which relation can be grasped is stored in two-dimensional bar code (Step S208). In the case where the same document has a plurality of portions of which sounds should be produced, the same operation is repeated (Step S209).

Figure 5:
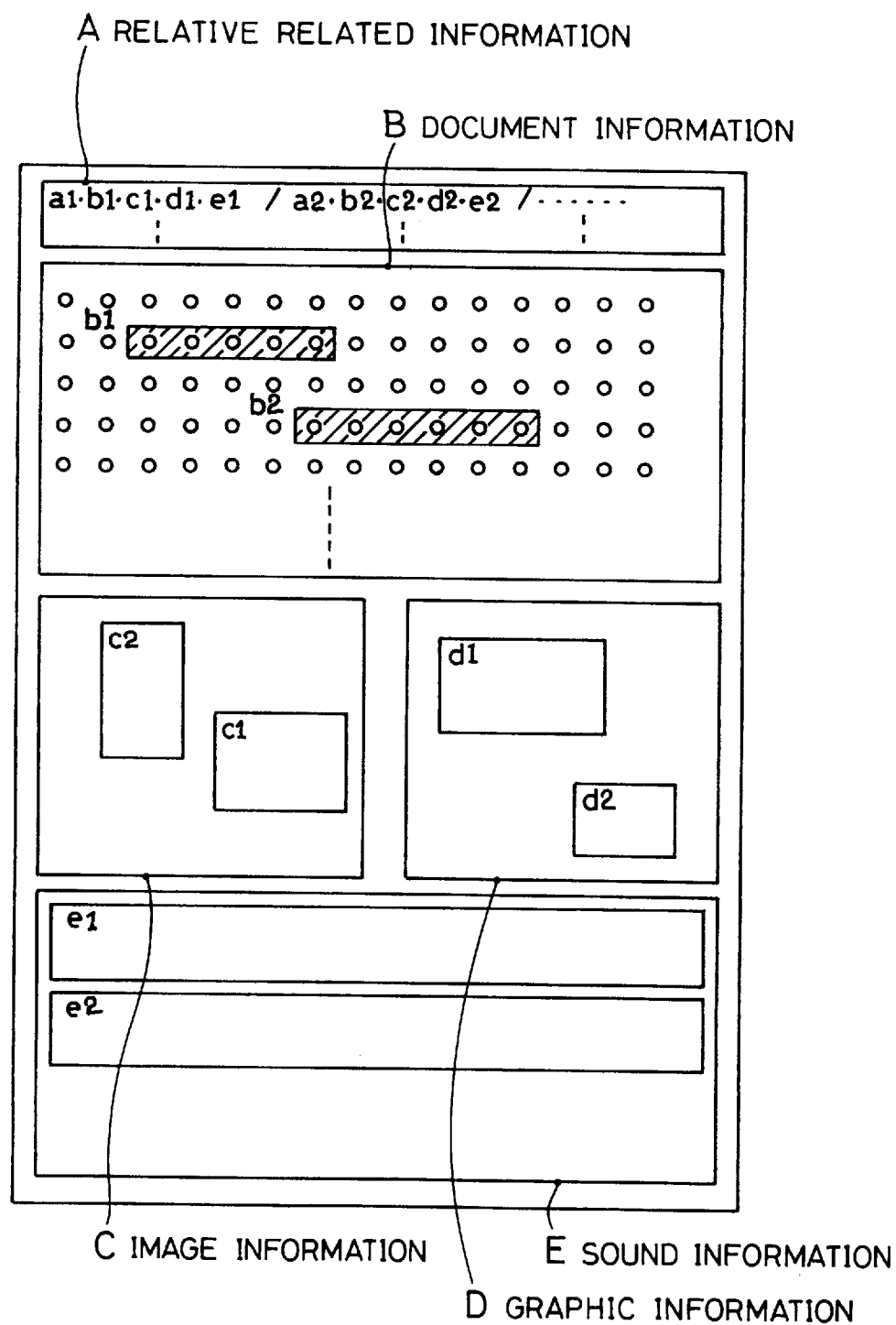
FIG. 5 is a diagram showing an example in which sound information expressed in two-dimensional bar code is related to coordinate information on the designated areas of document information, graphic information and image information according to the present invention.
Figure 6:
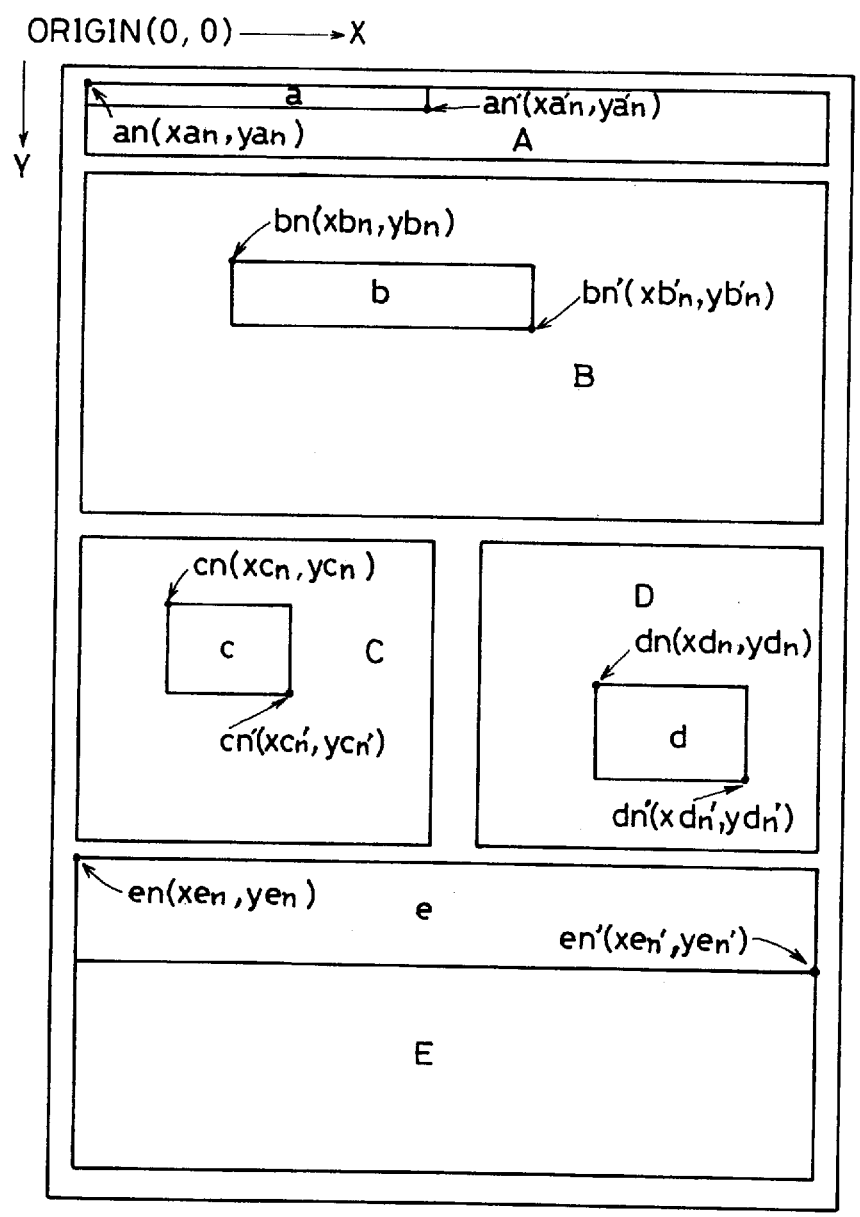
FIG. 6 is a diagram showing a method for relating the sound information expressed in two-dimensional bar code to the coordinate information on the designated areas of the document information, the graphic information and the image information according to the present invention.

FIG. 5 shows an example of the related information. In FIG. 5, the relative related information, the document information, the image information, the graphic information and the sound information which is converted into two-dimensional bar code are recorded in areas A, B, C, D and E, respectively. Each information is related by reference numbers (n) added after symbols in order of input.

The area A for the relative related information is provided in the header portion of a sheet, so that the advanced means for recognizing the position of the sound information is not necessary. The relating method will be described with reference to FIG. 6.

For example, the areas B, C, D and E in the document, image, graphic and sound information are related. In this case, coordinates (xbn, ybn), (xbn', ybn') for points bn, bn' which indicate the area B, coordinates (xcn, ycn) and (xcn', ycn') for points cn and cn' which indicate the area C, coordinates (xdn, ydn) and (xdn', ydn') for points dn and dn' which indicate the area D, and coordinates (xen, yen) and (xen', yen') for points en and en' which indicate the area E are recorded in the relative related information area A.

For example, the area indicated at the points bn and bn' is designated by the pen or cursor in order to produce the sound of a text in the area B. Thereby, the coordinates of the points en and en' which indicate the area E in the area A are called.

Figures 7, 8:
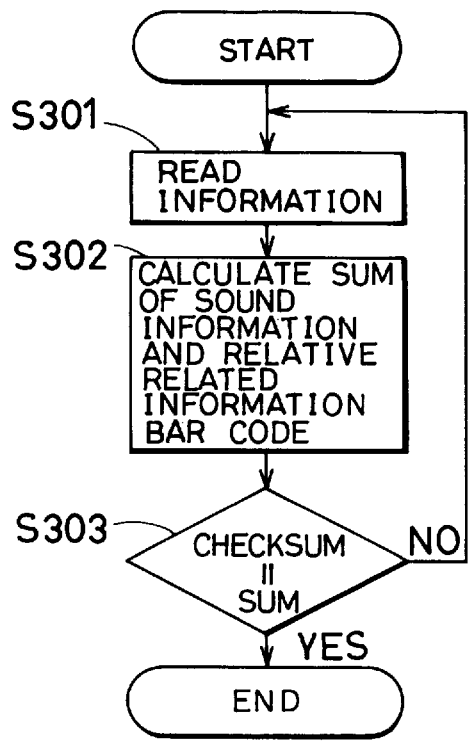
FIG. 7 is a flowchart showing the checksum adding processing according to the present invention.
FIG. 8 is a diagram showing the structure of data for the related information according to the present invention.

The relative related information and the two-dimensional bar code of the sound information are read by the image reader 14. If read error occurs, a checksum is added to the end of each block of the two-dimensional bar code of the relative related information and the sound information so as to read them again. For example, the result of sum of information strings is added, by a reference number, to the end of each block of the two-dimensional bar code of the relative related information and the sound information. FIG. 7 shows a flowchart for the checksum adding processing.

First, the two-dimensional bar code of the relative related information and the sound information is read (Step S301). The sum of information strings is calculated (Step S302). Then, the bar code of the sum of the information strings which are subsequently printed is read (Step S303). Two values thus obtained are compared with each other (Step S304). If they are equal to each other, it is decided that error does not occur. If they are different from each other, reading is performed again.

An example of a method for calculating the sum of data for the relative related information will be described with reference to the data structure of the relative related information shown in FIG. 8.

Reference numbers 1 to n are added to the relative related information. For the reference number 1, (xa1, ya1), (xa1', ya1') to (xe1, ye1), (xe1', ye1') which indicate the areas a to e are recorded. Their sums S1 and S1' are expressed as follows.

S1=(xa1+xb1+ . . . +xe1)+(ya1+yb1+ . . . +ye1)

S1'=(xa1'+xb1'+ . . . +xe1')+(ya1'+yb1'+ . . . +ye1')

These values are added to the end of data. Similarly, the sum is calculated on and after the reference number 2 in a second line.

Figure 9:
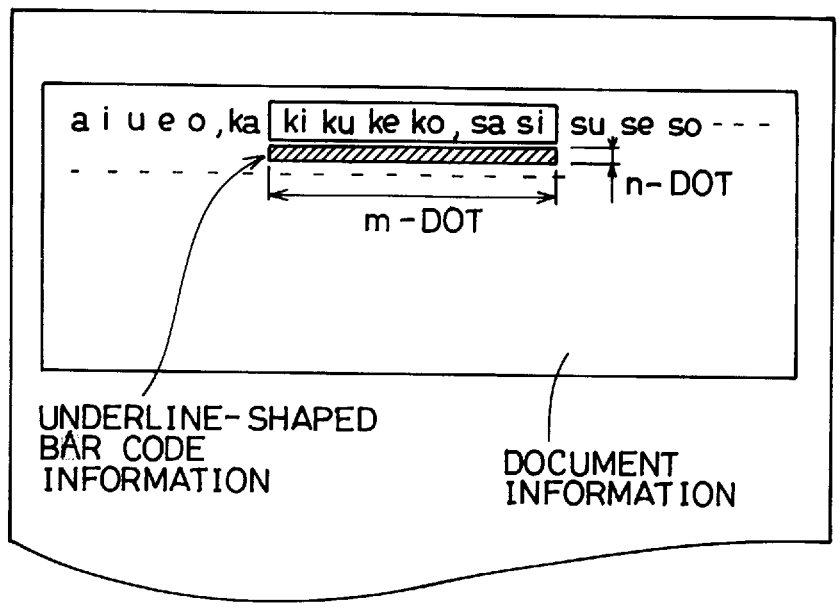
FIG. 9 is a diagram showing an example in which the bar code of the related and sound information is added to the lower portion of the document information according to the present invention.

As shown in FIG. 9, the bar code of the relative related information and the sound information can be added in the vicinity of the document information, and added in the vicinity of the image information and the graphic information. For example, when a portion of which sound should be produced in the document information is designated to complete sound input, the two-dimensional bar code of the relative related information and the sound information is added like an underline in the document. The underline is described by a vertical n-dot and a horizontal m-dot at a starting point which is the head of a text of which sound is produced. The dot numbers n and m are determined by data volume and the like.

Figure 10:
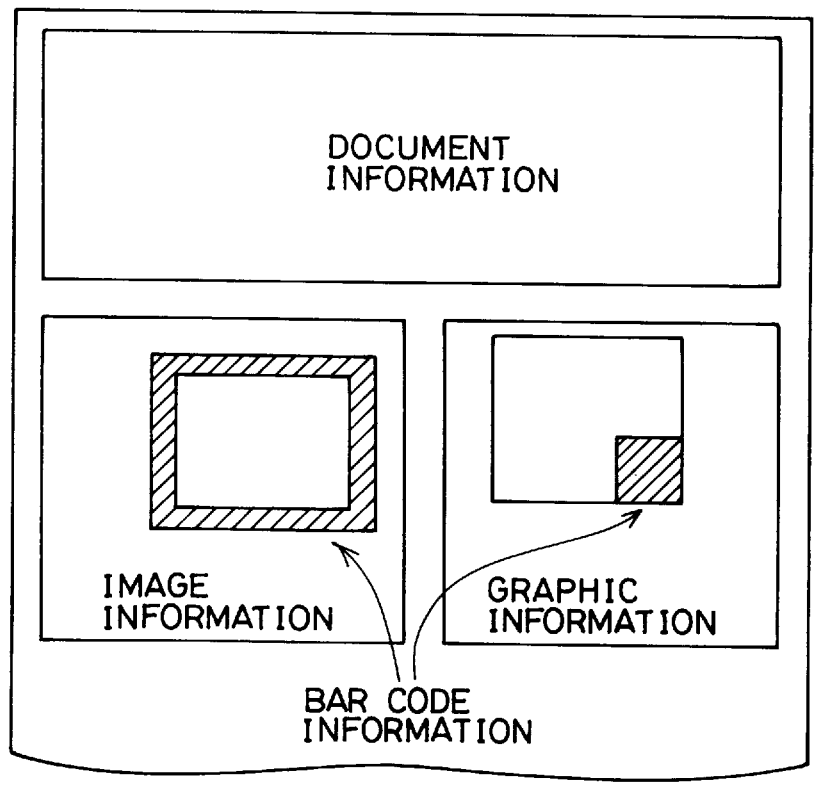
FIG. 10 is a diagram showing an example in which the bar code of the related and sound information is added to the periphery of the image information and a part of the graphic information according to the present invention.

As shown in FIG. 10, in the case where sound guidance should be added to the graphic or image information, the two-dimensional bar code of the relative related information and the sound information is added like a frame of the information or on the corner of the area when the graphic and image information are designated and sound input is completed.

The frame-shaped sound information is recorded clockwise or counterclockwise at a starting point of the upper left of the area. The data width (the number of dots) is determined by the data volume, the outer peripheral length of the area and the like. In the case where the sound information is added to the corner of the area, the suitable numbers of vertical and horizontal dots are determined depending on the data volume, the area size and the like. In these cases, if the relative related information printed on a sheet is indicated, the sound information can be heard immediately.

In the case where the stored information is printed as described above, printing can be performed in various printing formats.

Figure 11:
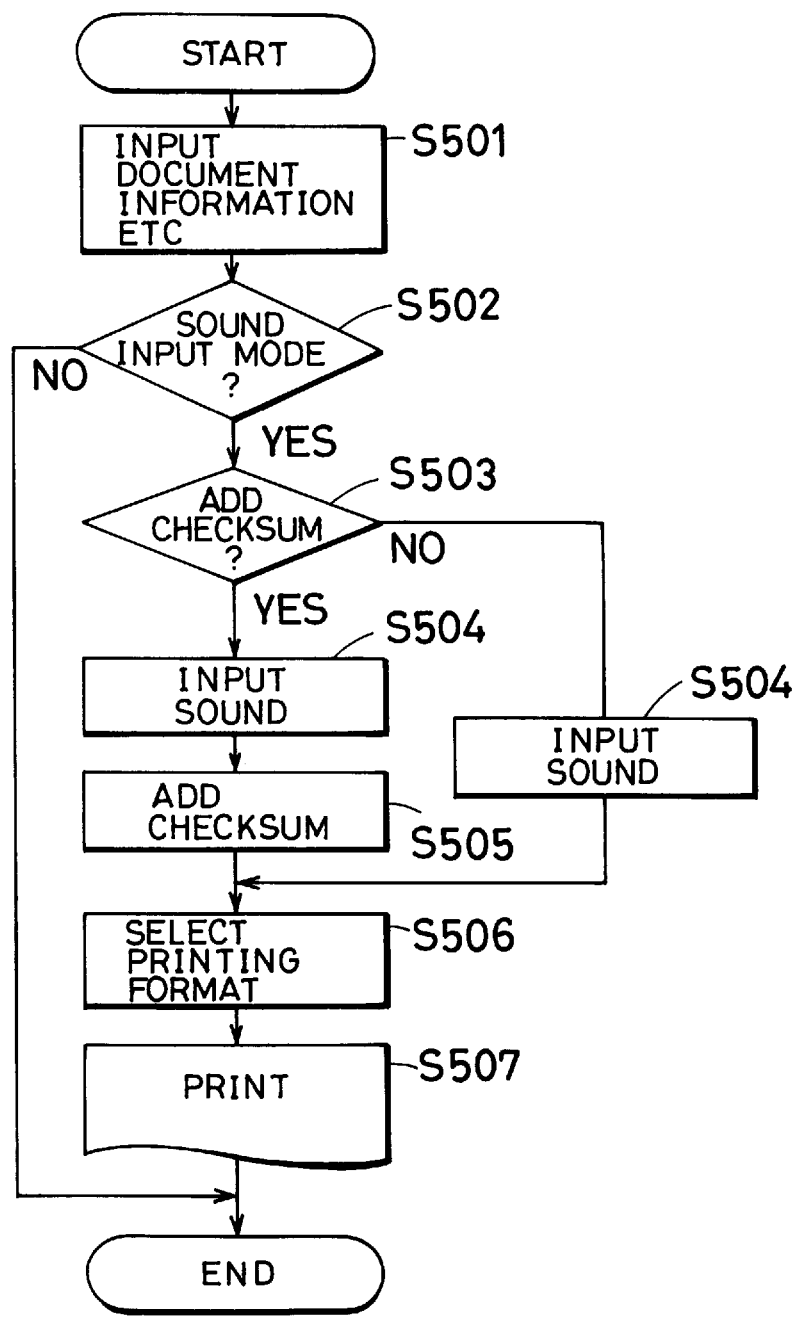
FIG. 11 is a flowchart showing the processing executed when selecting a printing format according to the present invention.

FIG. 11 is a flowchart showing the processing for selecting the printing format.

When the document information, the image information and the graphic information are inputted (Step S501), the routine proceeds to the decision of the sound input mode (Step S502). Whether a checksum is added or not is selected when producing a sound (Step S503).

When the sound is inputted and the sound and relative related information are completely converted into two-dimensional bar code (Step S504), the checksum is added (Step S505). If the checksum is not added, the printing format is selected (Step S506). Then, printing on a sheet is executed (Step S507).

Figure 12:
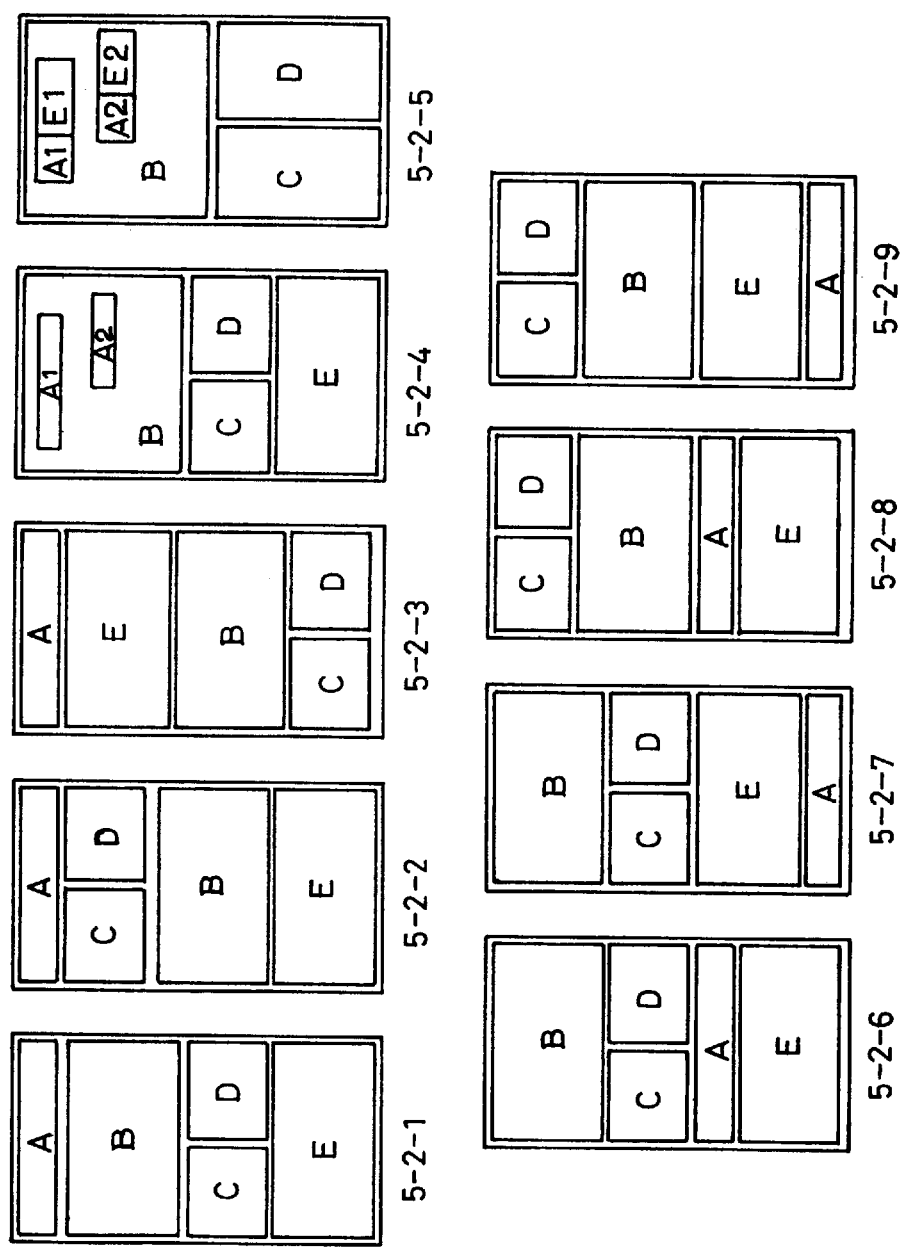
FIG. 12 is a diagram showing an example of the selectable printing format according to the present invention.

FIG. 12 shows an example of the printing format which can be selected in Step S506.

Areas A, B, C, D and E indicate the relative related information, the document information, the image information, the graphic information and the sound information, respectively. For example, according to (5-2-1), the relative related information exists in the header portion of the sheet. Consequently, it is not necessary to use the advanced means for recognizing the position of the relative related information so that the time for processing can be reduced.

According to (5-2-5), the relative related information and the sound information are recorded like an underline in the document information, so that a sound can be produced simultaneously with original reading.

According to (5-2-6), a portion expressed in two-dimensional bar code is provided on the lower portion of the sheet, so that a user can easily read a document and the like. Thus, there are various characteristics depending on the method of layout. There are other layout patterns which are not shown. It is possible to select a layout pattern which meets user's needs.

It is supposed that the document information, graphic information and image information can be moved, enlarged and reduced by means of a pen or cursor based on the layout thus selected.

In the case where the sheet in which the sound information is recorded is read, a reproduced sound should be controlled, sound reproduction should be stopped or volume should be turned down depending on the circumstances. In order to implement the foregoing, it is possible to select the reproduced sound control before reading.

Figure 13:
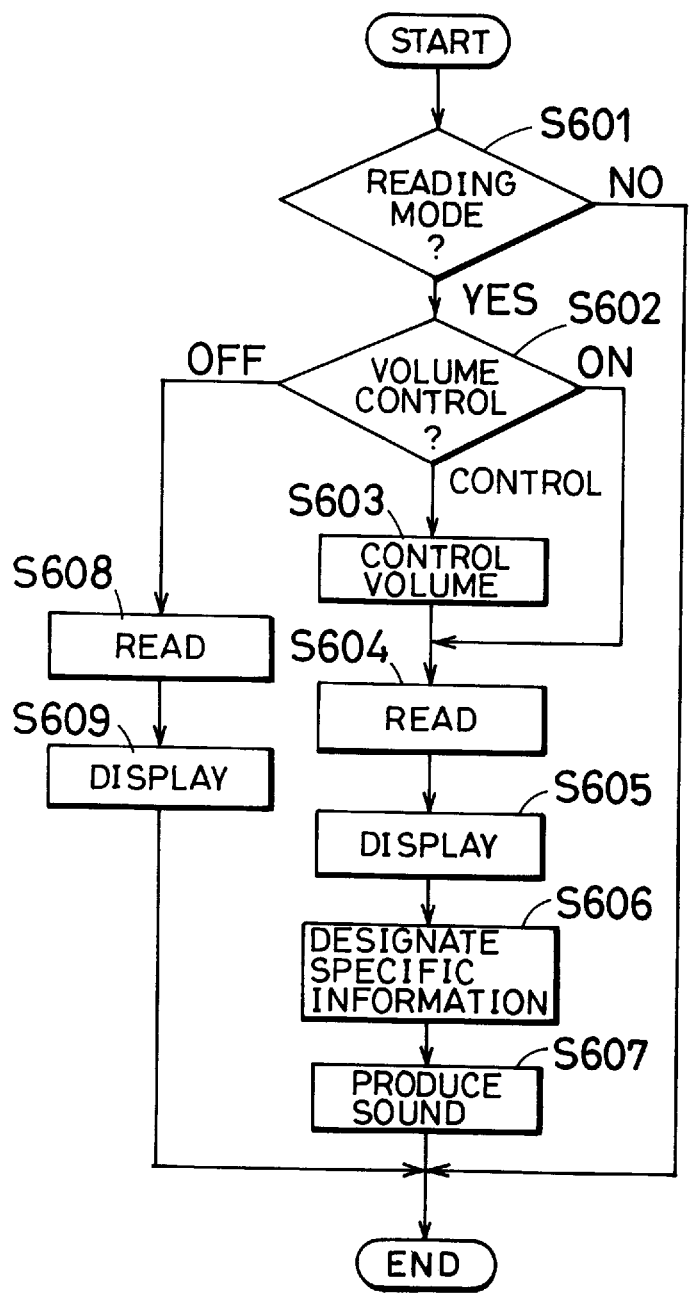
FIG. 13 is a flowchart showing the processing for suppressing the reproduced sound according to the present invention.

FIG. 13 is a flowchart showing the reproduced sound control processing.

Figure 14:
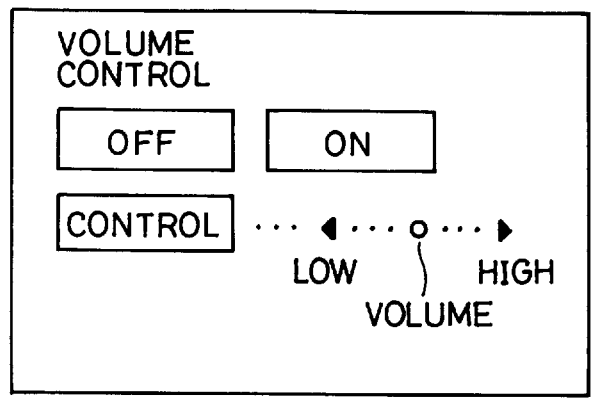
FIG. 14 is a diagram showing an example of the screen display obtained in the case of volume control according to the present invention.

First, the routine proceeds to the decision of the reading mode (Step S601). A screen shown in FIG. 14 is displayed. Volume control is selected by cursor movement on the display screen or by means of a pen (Step S602).

In the case where sound reproduction is turned OFF, the sheet is read (Step S608) and displayed on the screen (Step S609). Consequently, setting is completed. If volume control is required, the volume is controlled by the cursor movement on the display screen shown in FIG. 14 or by means of the pen (Step S603). In the case where the sound reproduction is turned ON, the volume control screen in Step S603 is skipped and the sheet is read (Step S604). The information on the sheet is displayed on the display screen (Step S605). The information necessary for sound production is designated by the cursor or pen (Step S606). Then, a sound is produced (Step S607).

In the case where a sheet on which the sound information exists together is read, the document, image and graphic information displayed on the screen may be hard to read. In order to avoid such a status, it is possible to select the presence of sound information display before reading.

Figure 15:
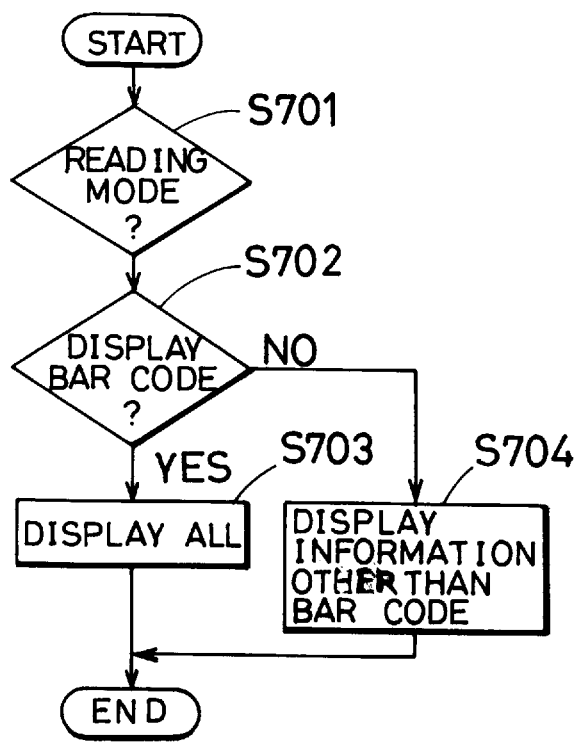
FIG. 15 is a flowchart showing the processing for selecting the presence of sound information display according to the present invention.
Figure 16:
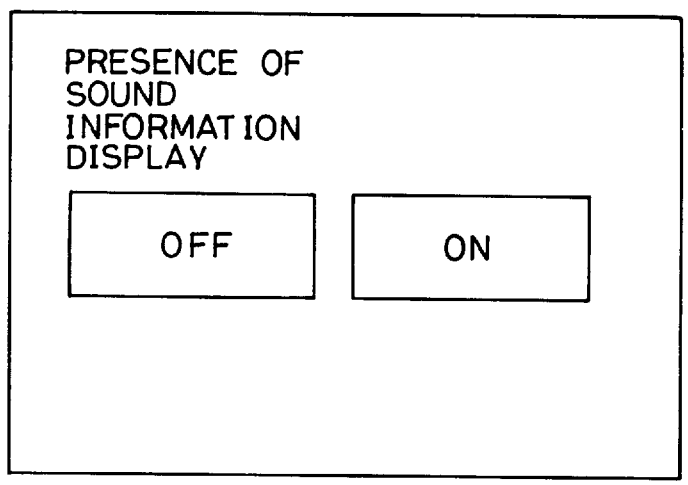
FIG. 16 is a diagram showing an example of a screen for selecting the presence of the sound information display according to the present invention.

FIG. 15 is a flowchart showing the processing for selecting the presence of sound information display. First, the routine proceeds to the decision of the reading mode (Step S701). The selection screen shown in FIG. 16 is displayed and the presence of sound information display is selected by the cursor movement on the display screen or by means of the pen (Step S702). If the sound information display is required, the entire sheet is read and displayed (Step S703). If the sound information display is not required, the areas for the relative related information and sound information are recognized based on the relative related information after reading the sheet and are extracted for display (Step S704).

Figure 17:
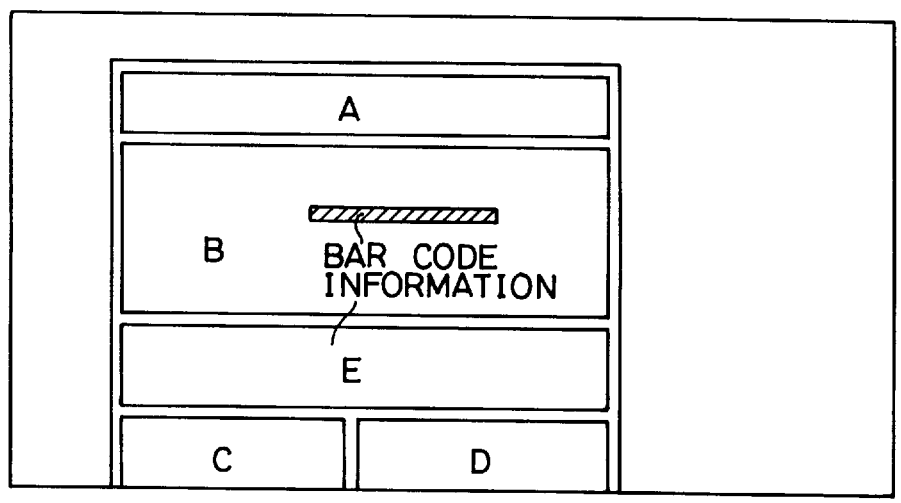
FIG. 17 is a diagram showing an example in which the sound information display is present according to the present invention.
Figure 18:
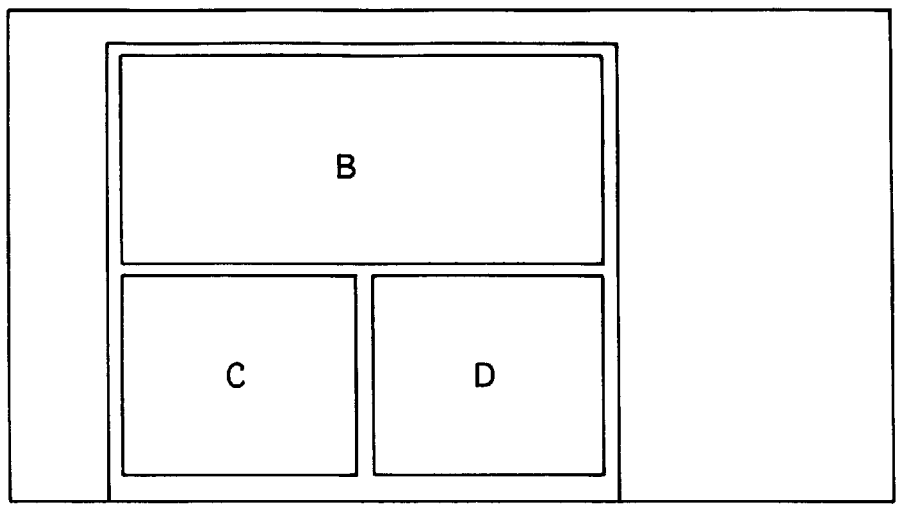
FIG. 18 is a diagram showing an example in which the sound information display is not present according to the present invention.

FIGS. 17 and 18 show the examples of the presence of sound information display. Areas A, B, C, D and E indicate the relative related information, the document information, the image information, the graphic information and the sound information, respectively. FIG. 17 shows the normal display. If display OFF is selected in Step S702 shown in FIG. 15, the display screen shown in FIG. 18 can be obtained. Consequently, the screen can be seen more easily.

The case where the sheet is read and a sound is produced will be described below.

Within the range of the capacity of an internal memory of an information processor which is used, all the sound information expressed in two-dimensional bar code can be stored in the internal memory and called to produce a sound as required.

Figure 19:
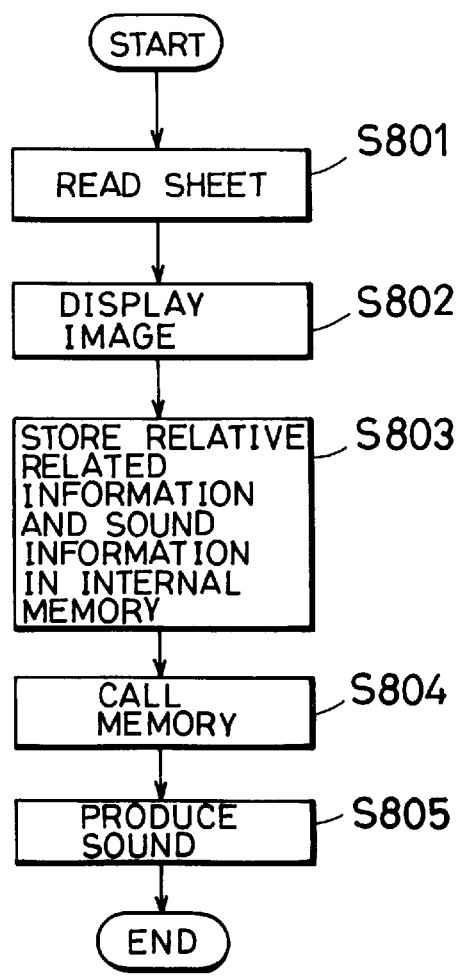
FIG. 19 is a flowchart showing the processing for reading a sheet and producing a sound according to the present invention.

FIG. 19 is a flowchart showing the processing executed when reading a sheet so as to produce a sound.

The sheet on which each information is described is read by a scanner (Step S801), and an image is displayed on a screen (Step S802).

The relative related information and the sound information expressed in two-dimensional bar code are recorded in the internal memory (Step S803). A memory in a specific address is called as required (Step S804) and the sound of the information is produced (Step S805).

All the sound information are stored in the memory and called as required in order to produce a sound. In addition, the image reader 14 is controlled each time based on the relative related information so that only the sound information which is necessary can be read to produce a sound.

Figure 20:
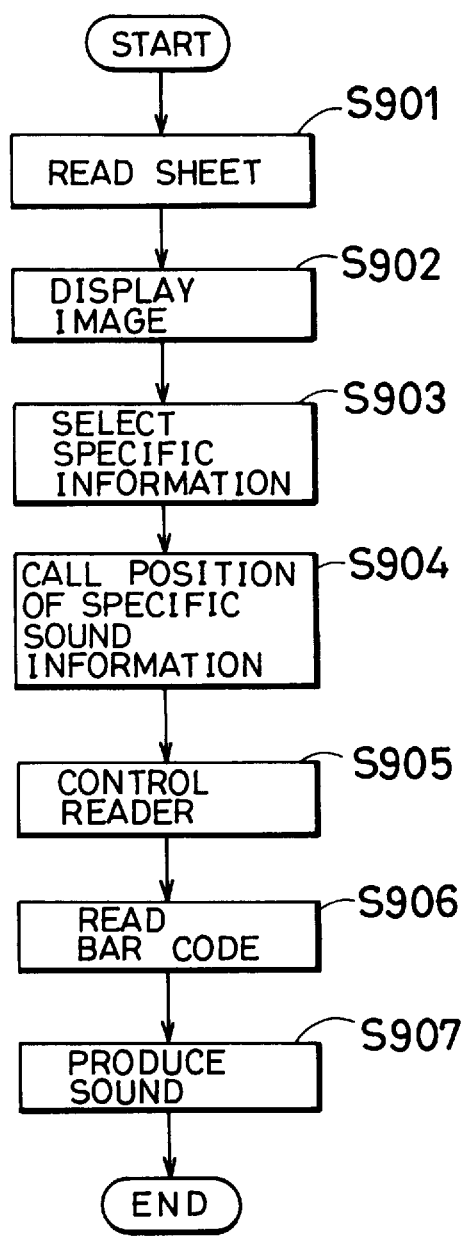
FIG. 20 is a flowchart showing the processing for reading only the specific sound information and producing a sound according to the present invention.

FIG. 20 is a flowchart showing the processing for reading only the specific sound information to produce a sound.

The sheet on which each information is described is read by the scanner (Step S901). An image is displayed on the screen (Step S902). However, the sound information expressed in two-dimensional bar code is not recorded in the internal memory. The specific document information, image information and graphic information of which sounds are produced are selected by means for designating specific positions such as a pen 1 (Step S903). Consequently, the position of the specific sound information is called from the relative related information (Step S904). A reader is controlled (Step S905). Only the specific information is read (Step S906). Thus, a sound is produced (Step S907).

Figure 21:
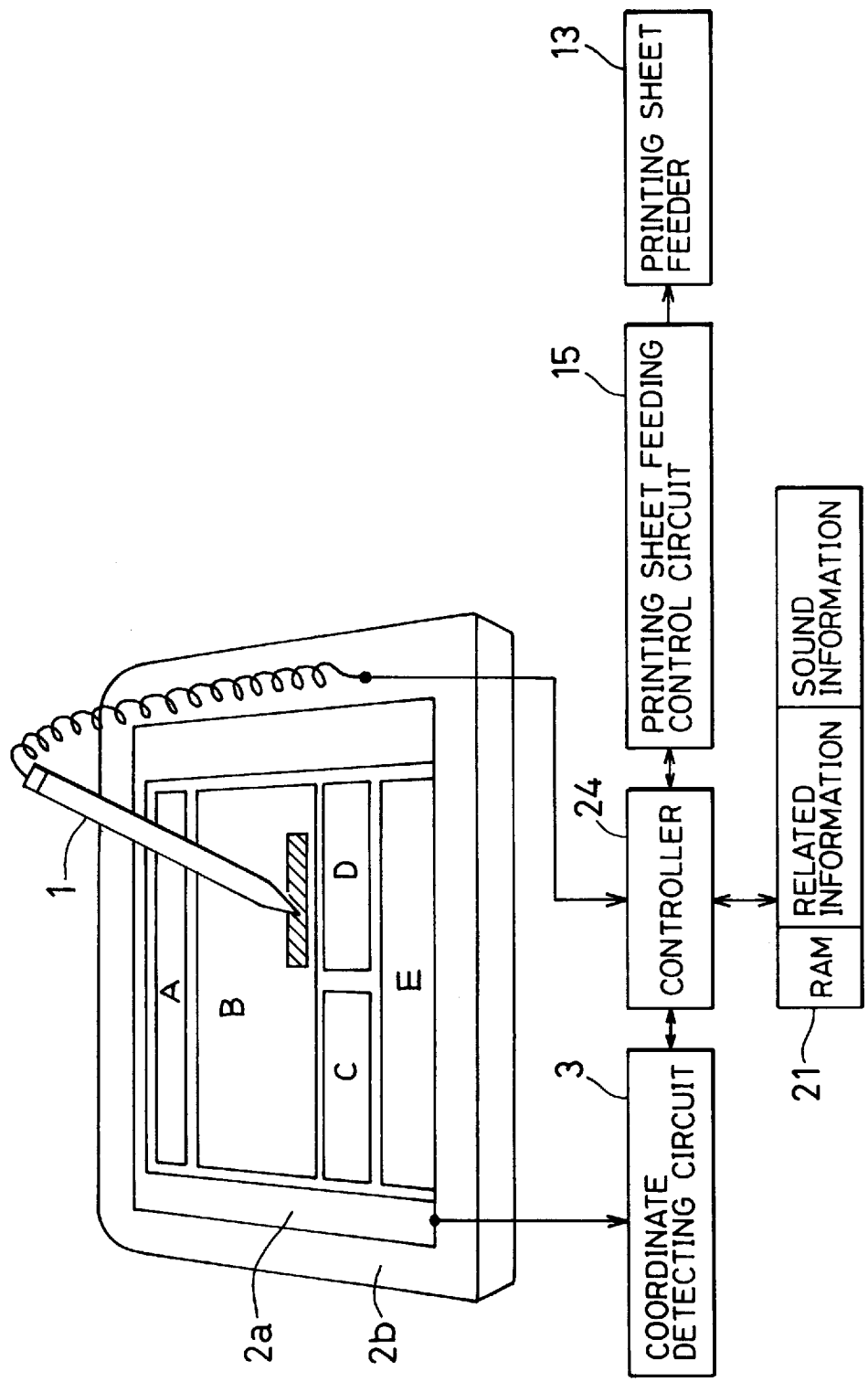
FIG. 21 is a diagram showing the concrete structure of a pen for designating the specific positions of document information, image information and graphic information according to the present invention.

FIG. 21 shows the concrete structure of the pen 1 for designating the specific positions of the specific document information, image information and graphic information of which sounds are produced. The same reference numerals designate the same components as in FIG. 2. According to the structure shown in FIG. 21, a pen 1 and a transparent tablet 2a are used. The tablet 2a is superposed on the screen of a display device 2b. A, B, C, D and E displayed on the screen of the display device 2b indicate areas for the relative related information, the document information, the image information, the graphic information and the sound information, respectively.

In order to produce the sound of a part of a text in the area B, the area B on the tablet 2a is designated by the pen 1 or the cursor is moved into the specific area and a designating key is pressed down to designate the specific area. Consequently, point coordinates which indicate the area E and the like are called from the information on the area A in a RAM 21. A controller 24 calculates the sheet feeding amount of a printing sheet feeder 13a from the coordinates. The printing sheet feeder 13a is operated to read the specific sound information.

A timing for producing the sound of the sound information will be described. For example, in the state where the sound information is inputted and the related information is displayed on the screen, it is possible to produce the sound of the sound information corresponding to an area in which the cursor is present or which is designated by the pen 1 or the like, and to output the same.

Figure 22:
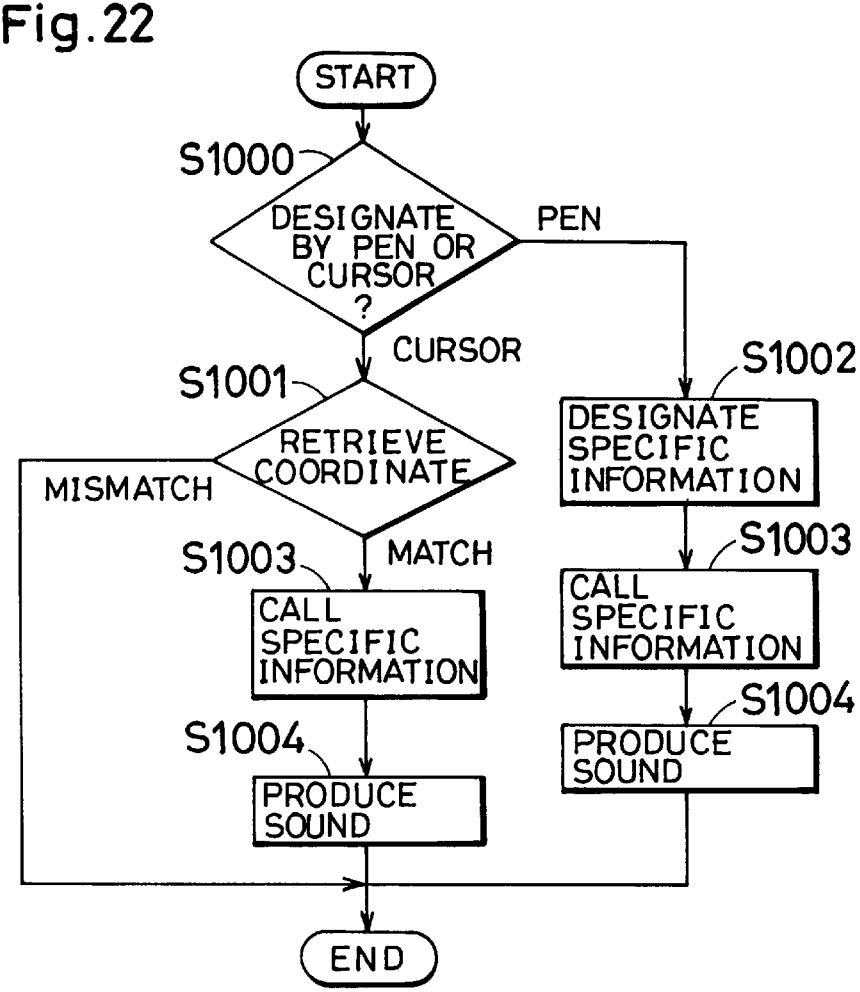
FIG. 22 is a flowchart showing the sound producing output processing by area designation according to the present invention.

FIG. 22 is a flowchart showing the sound producing output processing by area designation.

The specific area in the document information which is designated when inputting a sound is shown by inversion and the like. The specific areas in the image and graphic information are shown by framing. In the relative related information are recorded the numeric data of the area, for example, numeric values in the X and Y directions on the basis of the coordinates of an apex, and serial numbers and the like for deciding which sound information is paired.

The pen 1 or cursor is used for designation (Step S1000). When the cursor enters the area (Step S1001 ) or the pen 1 designates the area (Step S1002), the serial number recorded in the area is checked with the relative related information to call the corresponding sound information (Step S1003). Thus, a sound is produced (Step S1004).

Figure 23:
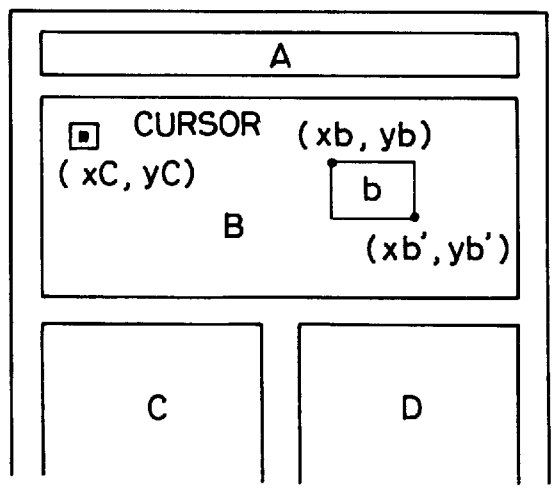
FIG. 23 is a diagram showing a method for designating the specific information of the document, image and graphic information by cursor movement according to the present invention.

A method for designating the specific information in the document, image and graphic information by cursor movement will be described in detail. As shown in FIG. 23, it is assumed that the area of the specific document information b of which sound should be produced is represented by a rectangle having coordinates (xb, yb) and (xb', yb'), and that the position of the cursor is represented by (xC, yC) at the current point.

Figure 24:
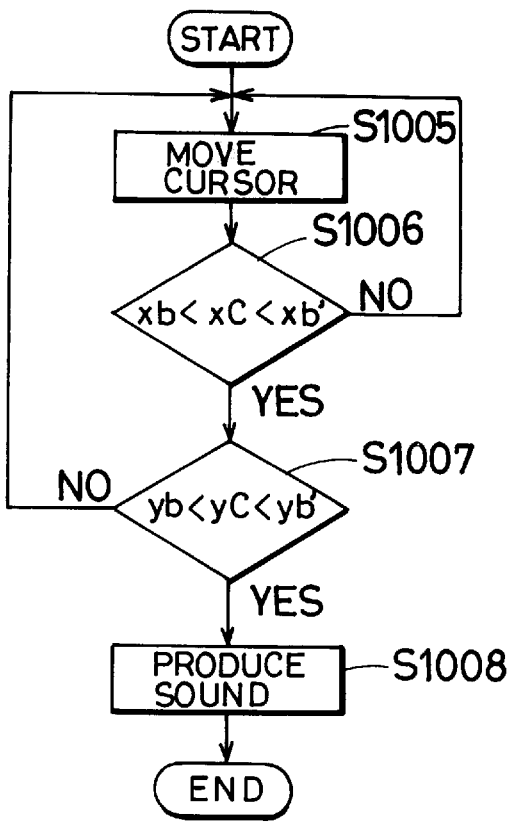
FIG. 24 is a flowchart showing the cursor moving processing executed when designating the specific information according to the present invention.

FIG. 24 is a flowchart showing the cursor moving processing.

The cursor is moved in the optional direction by a keyboard (Step S1005). The coordinates which indicate the area of the document information b are compared with the position of the cursor at that point in the X-coordinate direction (Step S1006) and in the Y-coordinate direction (Step S1007). A sound is produced within the range of the coordinates (Step S1008).

When producing the sound of the sound information by the method described above, other areas may be designated even though the sounds of the sound information in the area which is previously designated are not produced at all.

Figure 25:
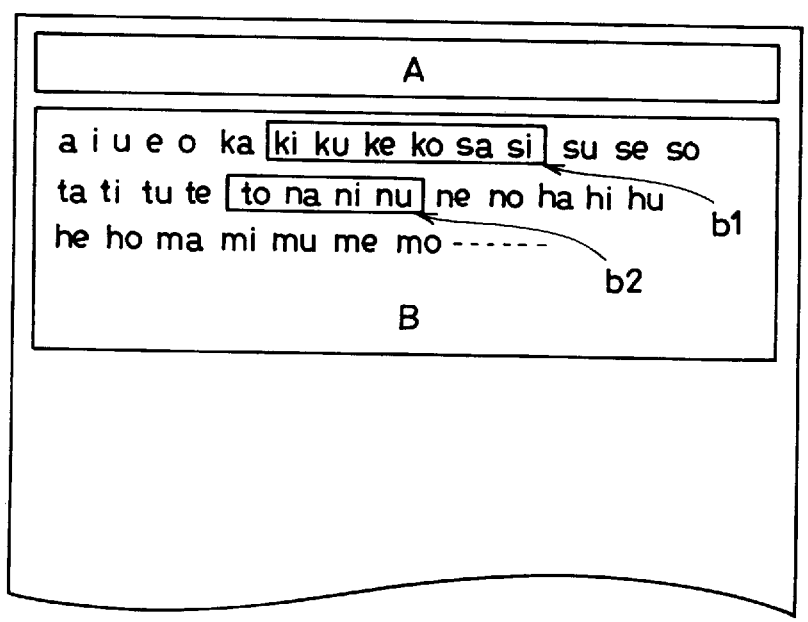
FIG. 25 is a diagram showing an example in which the designation for reproducing sound information is continued according to the present invention.

As shown in FIG. 25, in the case where the specific documents b1 and b2 of which sounds are produced are present in the document information area B, the document b1 is first designated and the document b2 is then designated in the middle of sound production. In this case, after the sound information of the document b1 is completely reproduced, a certain blank time is made. Then, the sound information of the document b2 is reproduced.

Figure 26:
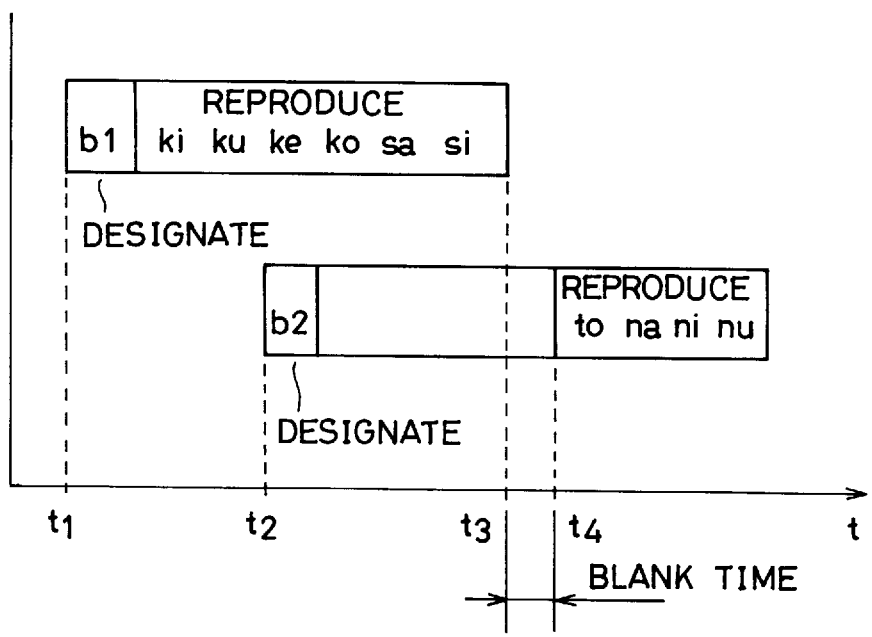
FIG. 26 is a time chart showing a timing for waiting for the sound reproduction according to the present invention.
Figure 27:
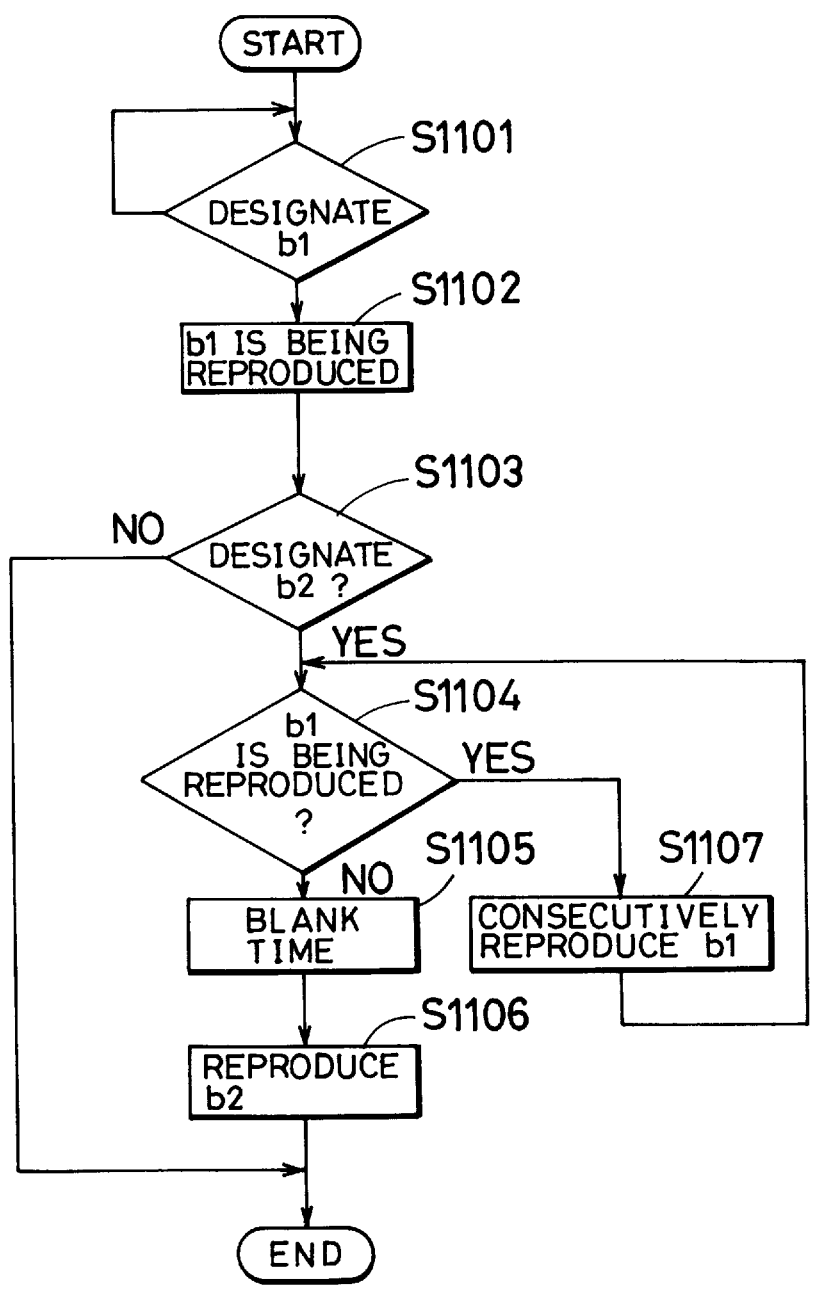
FIG. 27 is a flowchart showing the processing for waiting for the sound reproduction according to the present invention.
Figure 28:
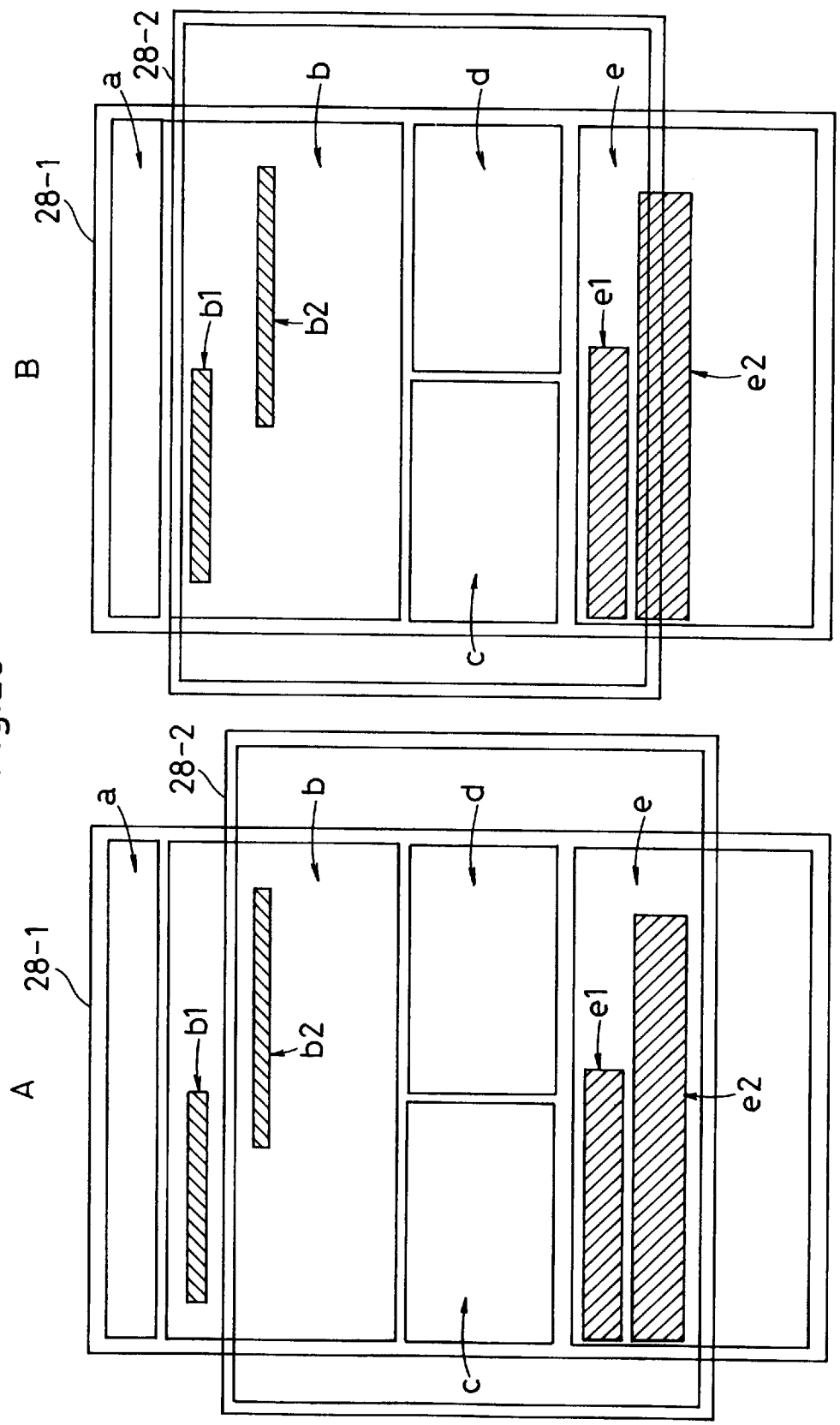
FIGS. 28A and 28B are diagrams showing the positional relationship between an example of print of a printing sheet and that of display thereof according to the present invention.

FIG. 26 is a time chart for waiting for the sound reproduction. FIG. 27 is a flowchart showing the processing for waiting for the sound reproduction.

The document b1 in the document information area B is designated (Step S1101). The sound information of the document b1 is reproduced (Step S1102). If the document b2 is designated during reproduction (Step S1103), it is decided whether the document b1 is being reproduced (Step S1104). If the document b1 is being reproduced, reproduction is consecutively executed (Step S1107). If the reproduction is completed, a certain blank time is made (Step S1105). Then, the sound information of the document b2 is reproduced (Step S1106).

Thus, the sound information is related to other printed information and recorded on the sheet, so that the contents of the document, image and graphic information on the sheet can be filled.

For example, it is possible to print the sound image which is hard to express by a text, the contents of emotional speech and the like as the sound information attendant on the document, image and graphic information, and to add the supplementary information related to them as the sound information.

When the sound information is related to other information and recorded, the information can variously be utilized. More specifically, in the case where the sounds of the sound information for the document, image and graphic information are produced and outputted, the specific areas of the document, image and graphic information are designated by a pointing device such as a mouse or a pen or cursor movement so that the sounds of the sound information related to the specific areas can be produced and outputted.

When producing and outputting the sound of the sound information, it is possible to display the specific areas of the related document, image and graphic information in such a form that they can be decided.

In the former case (where the sound information is outputted from other information), the sound information which has emotional expression or is hard to express in words can be transmitted by a letter or document. In addition, it is possible to realize a dictionary from the printing expression other than the sound information to the sound information. Further, the strictly secret information which is prohibited from catching people's eyes can be recorded and managed as the sound information. Moreover, it is possible to read the document information by cursor movement without seeing the display.

In the latter case (where areas other than the sound information are guided on the display screen by sound information output), the information other than the sound information can be related and seen according to the flow of the sound information. Therefore, the document information and the like can be read without seeing the display and moving the cursor, and other information related to the sound information can be visualized. Consequently, the guidance to an object on a map can be performed, and the dictionary from the sound information to other information can be realized.

Further, the sound information can be saved and managed in the state of a sheet, so that management and retrieval can be performed more easily. More specifically, information filing can easily be carried out and the information on the sheet can be copied by a copying machine. Consequently, the information can easily be distributed to a lot of people. In addition, the printed matter including the sound information can be issued as various publications. Thus, means for distributing the sound information on an inexpensive sheet can be provided and utilized as various communications.

The foregoing can be performed by printing the sound information and the related information on the sheet by various methods. For example, by printing the sound and related information on the header portion of the sheet or in the area of the document, image or graphic information, or adding the saved information expressed in two-dimensional bar code to eliminate read error, a format can be selected so as to answer the purpose of the information which is should be described on the sheet. Thus, various printed matters can be obtained.

At the time of reproduction, an output for producing the sound of the sound information on the sheet can be erased and controlled. In addition, the information two-dimensional bar code of the sound information and sound related information which are displayed can be erased.

In the case where the sound designation on the display is continuously requested by the cursor, a sound producing output is completed and then the next sound can be heard. Accordingly, the sounds can be heard without overlapping.

Further, it is possible to read the sheet collectively and then to output sound production. In addition, the output for producing the sound can be performed every time the sheet is read.

According to the structure of the present invention described above with reference to FIGS. 2 to 27, the visual information and the sound information in the areas designated by the area designating means can be related and stored. Therefore, it is possible to perform the processing for corresponding the visual information to the sound information.

In the case where only the sound information or relative related information is printed on the peripheral portion of the visual information, the sound information can easily correspond to the visual information.

In the case where only the sound information or the relative related information is printed in the vicinity of the visual information designated by the area designating means, the relationship between the visual information and the sound information can easily be discriminated.

In the case where the reading means, the reproducing condition designating means, the identifying means and the sound reproducing means are further provided, the volume of the reproduced sound can be turned down and sound reproduction can be stopped according to the circumstances.

In the case where the reading means, the display means, the bar code display condition designating means and the display control means are further provided, it is possible to prevent the bar code display if the bar code and the visual information are displayed together so that the visual information is hard to read. Consequently, the visual information can easily be seen.

In the case where the sound information reproduction designating means, the reading means and the sound reproducing means are further provided, it is possible to reproduce only the sound information corresponding to the designated visual information.

The present invention will be described in detail with reference to FIGS. 28 to 43.

FIGS. 28A and 28B are diagrams showing the positional relationship between an example of print of a printing sheet and that of display thereof according to the present invention. In FIGS. 28A and 28B, the reference numeral 28-1 denotes the example of print wherein the document information expressed in type, the image information, the graphic information and the sound information expressed in two-dimensional bar code are printed together on the printing sheet. The reference numeral 28-2 denotes the example of display of the printing sheet which is displayed on a display screen.

Various information on the printing sheet which are read by the scanner 13b shown in FIG. 2 are stored in the RAM 21. Actually, only the double frame portion indicated at 28-2 is displayed on the display screen.

Herein, a, b, c, d, and e indicate the relative related information, the document information expressed in type, the image information, the graphic information, and the sound information expressed in two-dimensional bar code, respectively.

A plurality of related information are saved in a to e. It is assumed that b1 is related to e1 and that b2 is related to e2. The symbols a to e which will be described below are the same as the foregoing.

FIG. 28B shows an example in which the information (coordinates) related to the sound information designated on the display screen in FIG. 28A is scrolled so as to enter a screen area.

Figure 29:
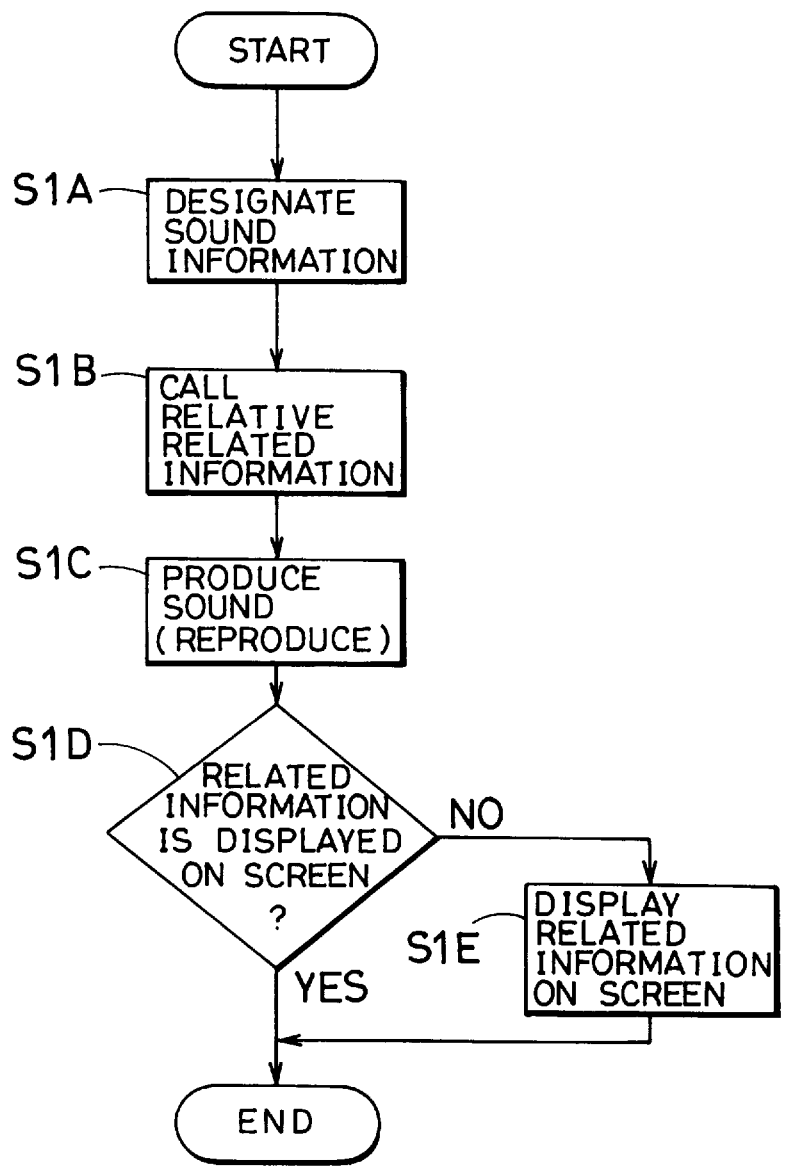
FIG. 29 is a flowchart showing the sound reproduction and display processing (1) according to the present invention.

FIG. 29 is a flowchart showing the sound reproduction and display processing (1) according to the present invention. The flowchart of FIG. 29 shows the processing in which the specific coordinates e1 of the sound information are designated by means of the pen 1 or the cursor movement by the keyboard 5 so that the area of the related information b1 can enter the screen area.

In FIG. 29, the two-dimensional bar code of the information e1 is designated (Step S1A). In this case, the coordinates of the information b1 related to the information e1 are called from the relative related information a (Step S1B). A sound is reproduced (produced) by the bar code restoring circuit 9, the D/A converter 12b, and the speaker 11b (Step S1C). The information b1 is out of the display screen. It is decided whether the information b1 is displayed on the display screen or not (Step S1D). If the information b1 is not displayed on the display screen, the display screen is scrolled to make the information b1 enter there (Step S1E, see FIG. 28B).

Figure 30:
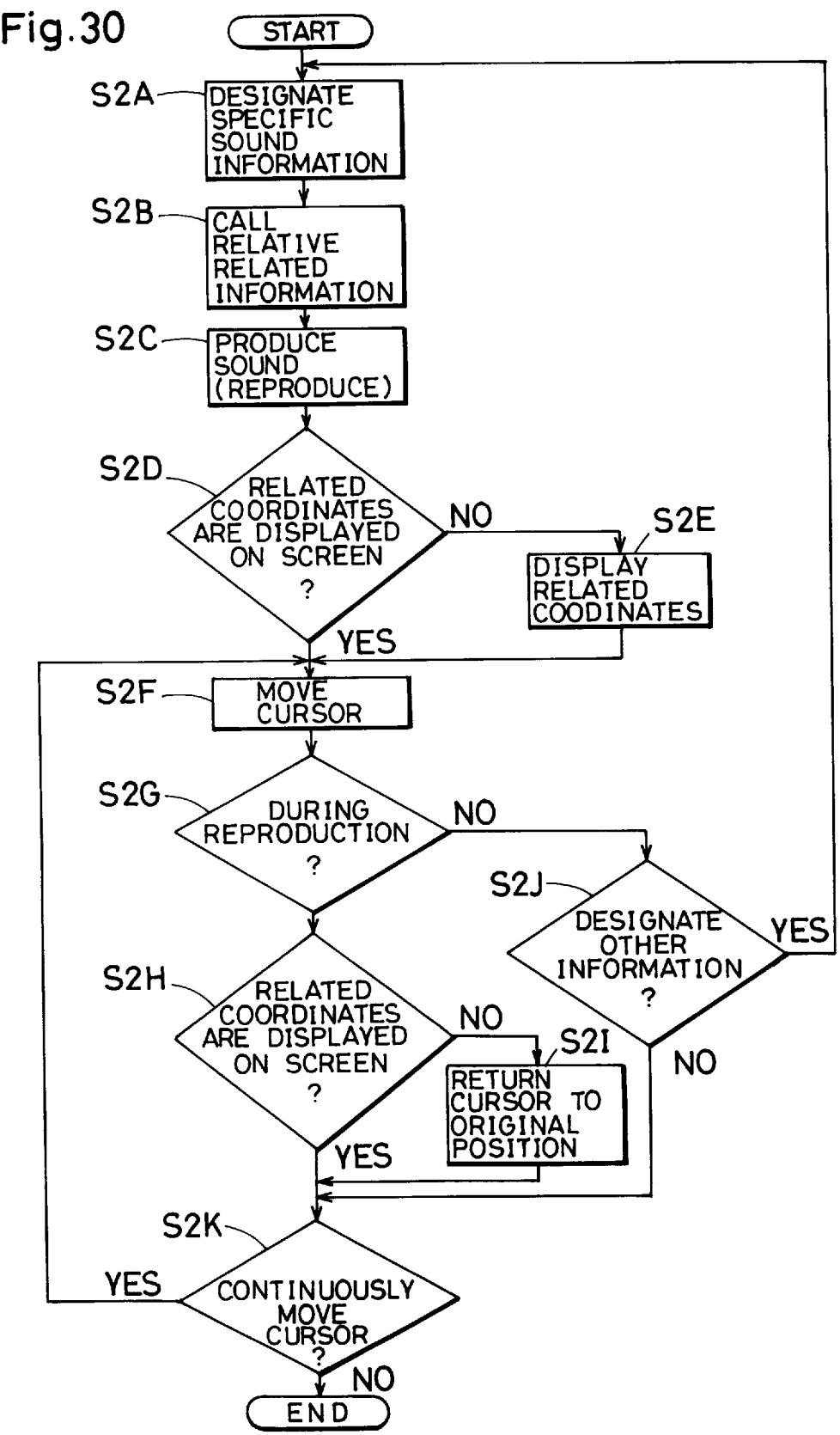
FIG. 30 is a flowchart showing the sound reproduction and display processing (2) according to the present invention.

FIG. 30 is a flowchart showing the sound reproduction and display processing (2) according to the present invention. In the flowchart of FIG. 30, the flow of Steps S2A to S2E is the same as in FIGS. 28A and 28B. The cursor is moved by the keyboard while the sound information e1 is being reproduced in the state of FIG. 28B (Step S2F). Then, it is decided whether the sound information e1 is being reproduced or not (Step S2G). If the sound information e1 is being reproduced, it is decided whether the related information b1 is displayed on the display screen by cursor movement or not (Step S2H). If the related information b1 is not displayed on the display screen, the cursor is returned to an original position (Step S2I). If the sound information e1 has completely been reproduced in Step S2G, it is decided whether the coordinates of other sound information are designated or not (Step S2J). If the coordinates of other sound information are designated, the routine returns to Step S2A. If the cursor is moved (Step S2K), the routine returns to Step S2F.

Figure 31:
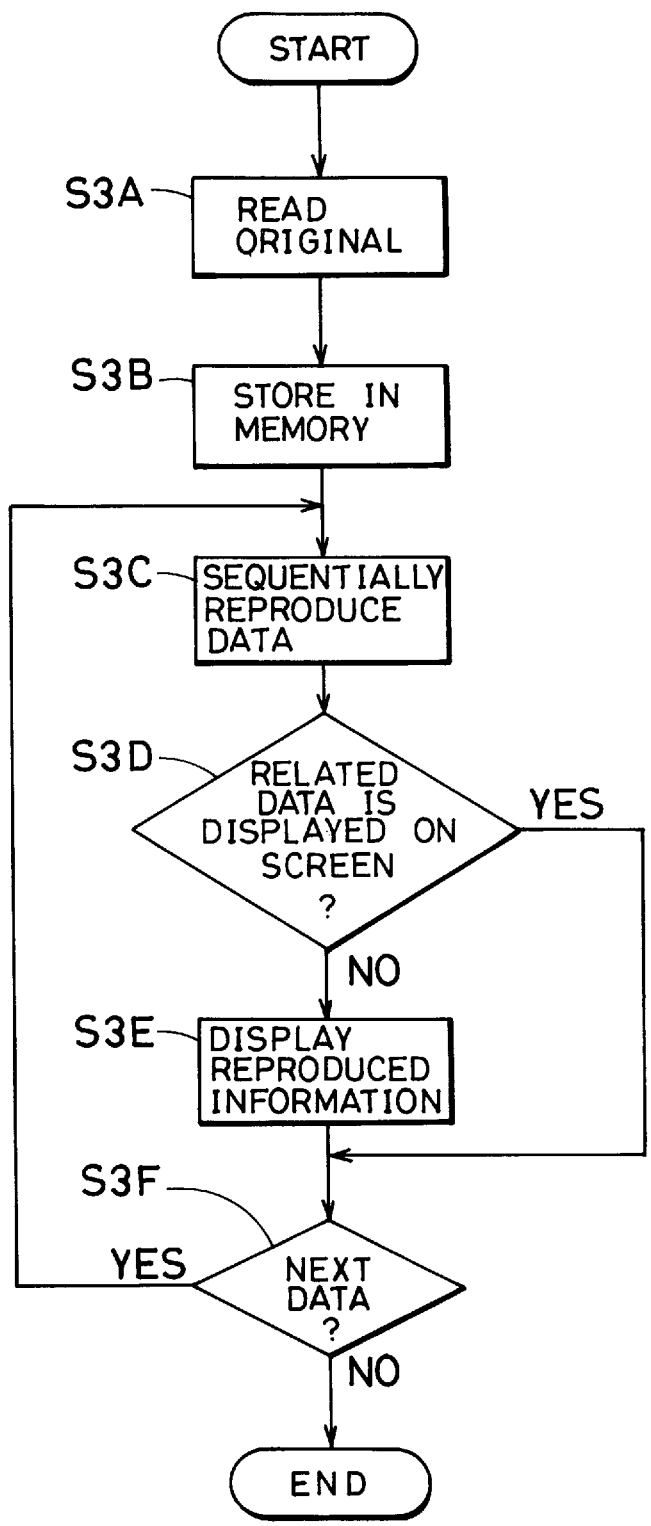
FIG. 31 is a flowchart showing the sound reproduction and display processing (3) according to the present invention.

FIG. 31 is a flowchart showing the sound reproduction and display processing (3) according to the present invention. In the flowchart of FIG. 31, the document information expressed in type, the image information, the graphic information and the sound information expressed in two-dimensional bar code are read by the scanner 13b (Step S3A) and are stored in the RAM 21 (Step S3B). If the designation for retrieving all the information b related to the sound information is inputted, the sound information are sequentially reproduced (Step S3C). It is decided whether the related information b is displayed on the display screen or not (Step S3D). If the related information b is not displayed on the display screen, the display screen is scrolled to make the information b enter there (Step S3E). Then, it is decided whether there are other sound information or not (Step S3F). If there are other sound information, the routine returns to Step S3C.

FIGS. 32A and 32B are diagrams showing an example (1) of the two-dimensional bar code input to the printing sheet. For example, FIG. 32A shows the state in which the relative related information a, the document information b and the image information c are inputted. FIG. 32B shows that the sound information e expressed in two-dimensional bar code is inputted.

Figure 33:
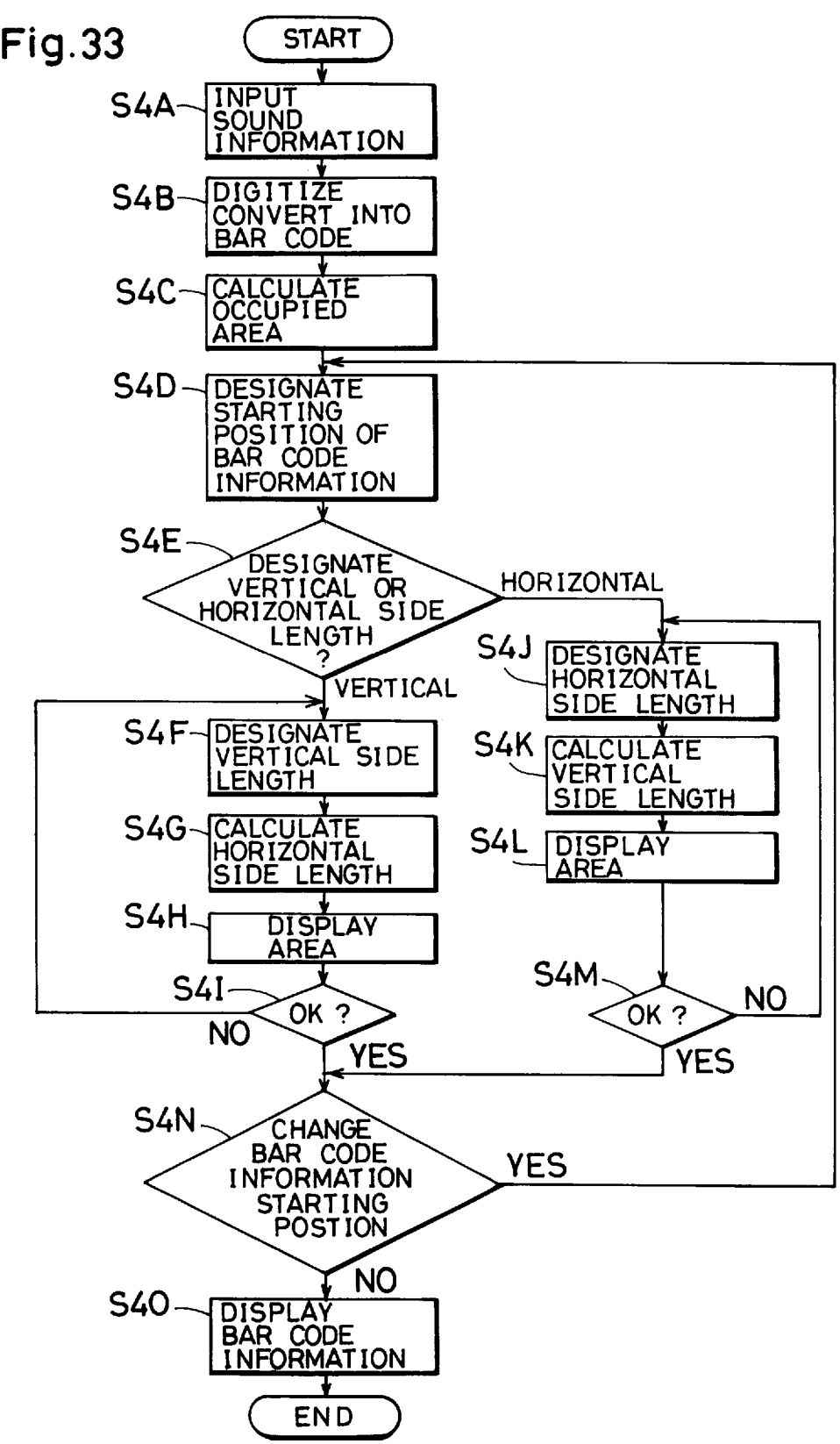
FIG. 33 is a flowchart showing the processing for calculating the area of two-dimensional bar code according to the present invention.

FIG. 33 is a flowchart showing the processing for calculating the two-dimensional bar code area according to the present invention. In the flowchart of FIG. 33, the sound information is first inputted (Step S4A), and is digitized by the A/D converter 12a and converted into bar code by the bar code converting circuit 8 (Step S4B). An area necessary for printing the encoded sound information on the printing sheet is calculated by the area calculating circuit 25 (Step S4C). As indicated by p1 in FIG. 32B, a print starting position p1 (starting point P1) is designated by cursor operation with the keyboard 5 or by means of the pen 1 (Step S4D). Either of the vertical side length or the horizontal side length is designated (Step 5 S4E).

If the horizontal side length is designated, a position p2 which indicates the horizontal side length is designated (Step S4J). The vertical side length is calculated from the horizontal side length and the area (Step S4K), and the area is displayed on the display screen (Step S4M). If it is not OK, the routine returns to Step S4J so as to designate p3 and p4 as shown in FIG. 32B.

If the print starting position is designated again by the cursor operation with the keyboard or by means of the pen (Step S4N), the routine returns to Step S4D. If it is OK, the area is determined (Step S4O). If the vertical side length is designated in Step S4E, the same operation is executed (Steps S4F to S4I).

Figure 34:
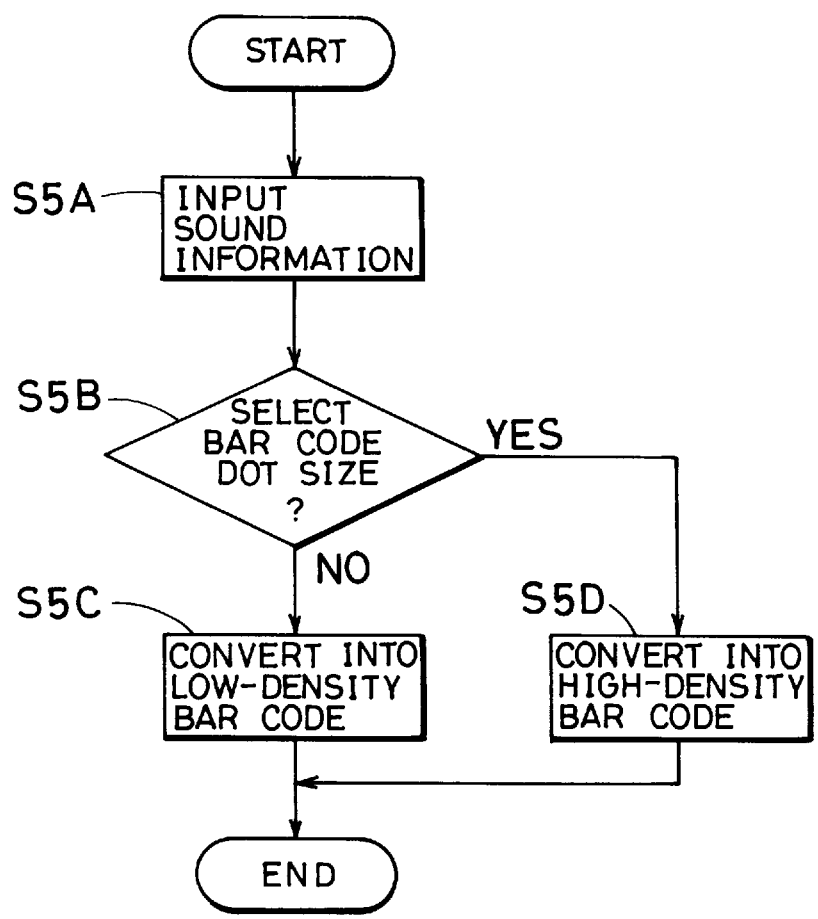
FIG. 34 is a flowchart showing the processing for the two-dimensional bar code dot size according to the present invention.

FIG. 34 is a flowchart showing the processing for the two-dimensional bar code dot size according to the present invention. In the flowchart of FIG. 34, the sound information is first inputted (Step S5A). The bar code dot size is designated by the dot size designating circuit in the bar code converting circuit 8 (Step S5B). According to the circumstances, bar code conversion can be executed in a low density bar code dot size (Step S5C) or a high density bar code doe size (Step S5D).

Figure 35:
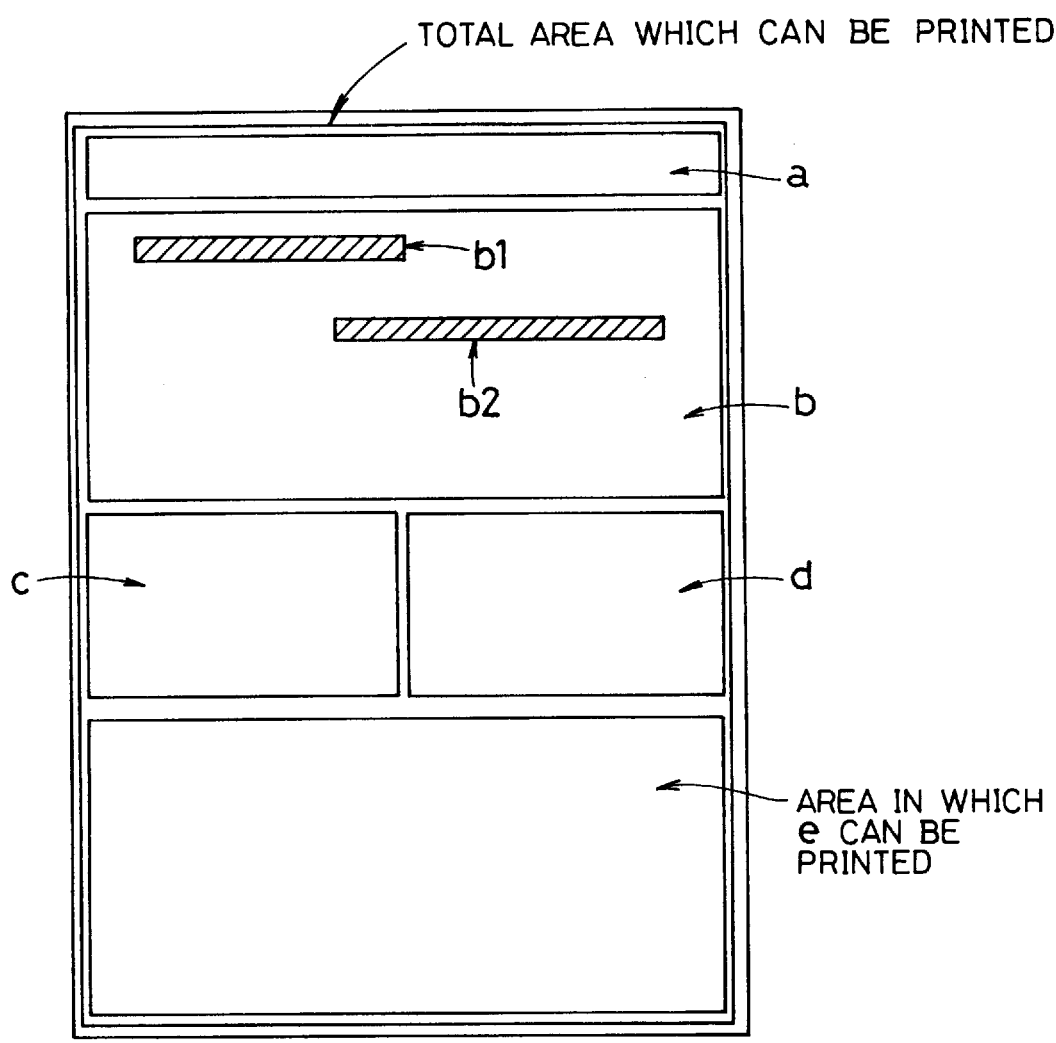
FIG. 35 is a diagram showing an example (2) of the two-dimensional bar code input to the printing sheet according to the present invention.

FIG. 35 is a diagram showing an example 2 of the two-dimensional bar code input to the printing sheet. As shown in FIG. 35, information a to d have been inputted, and information e is being inputted.

Figure 36:
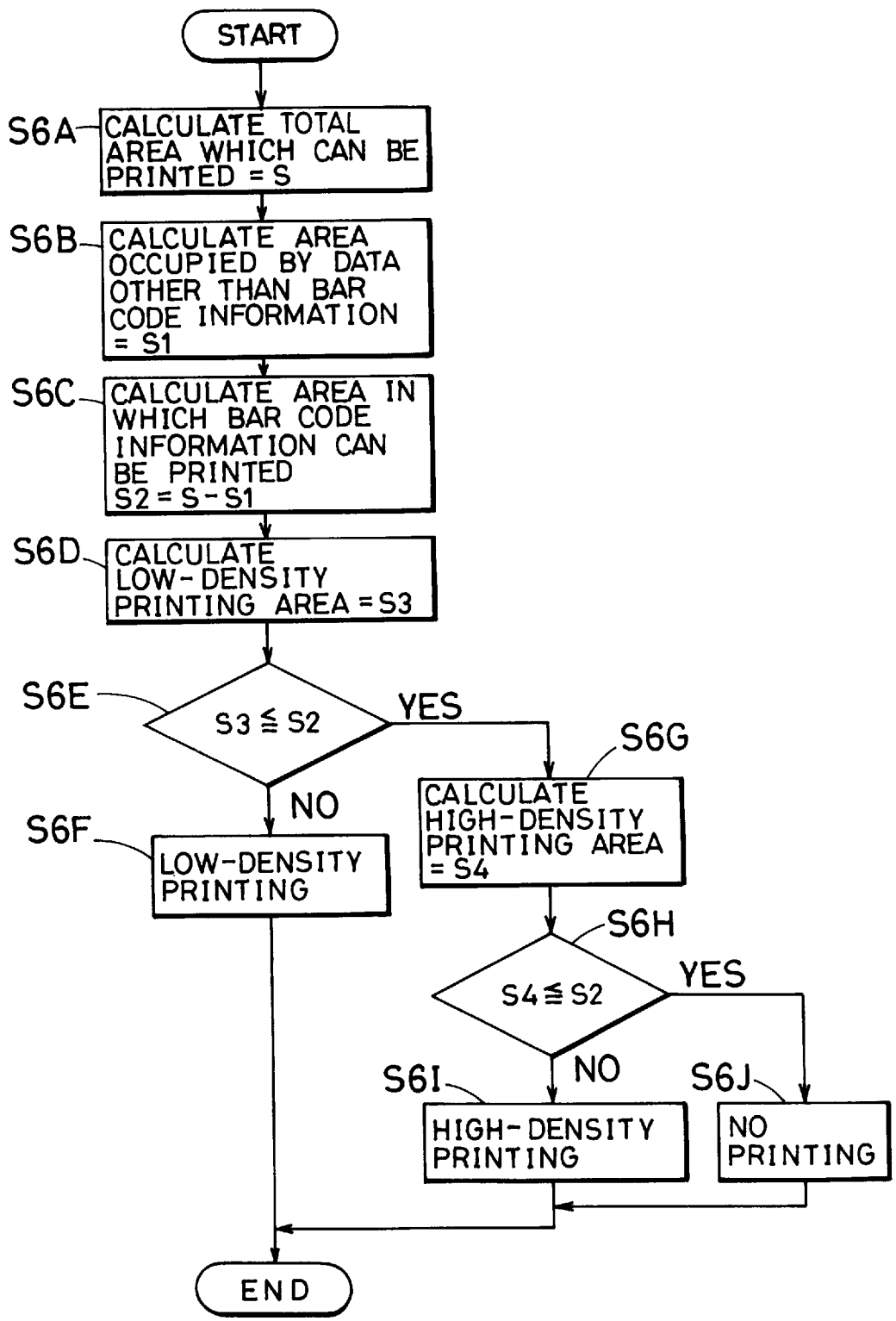
FIG. 36 is a flowchart showing the processing (1) for calculating a printing area according to the present invention.
Figure 37:
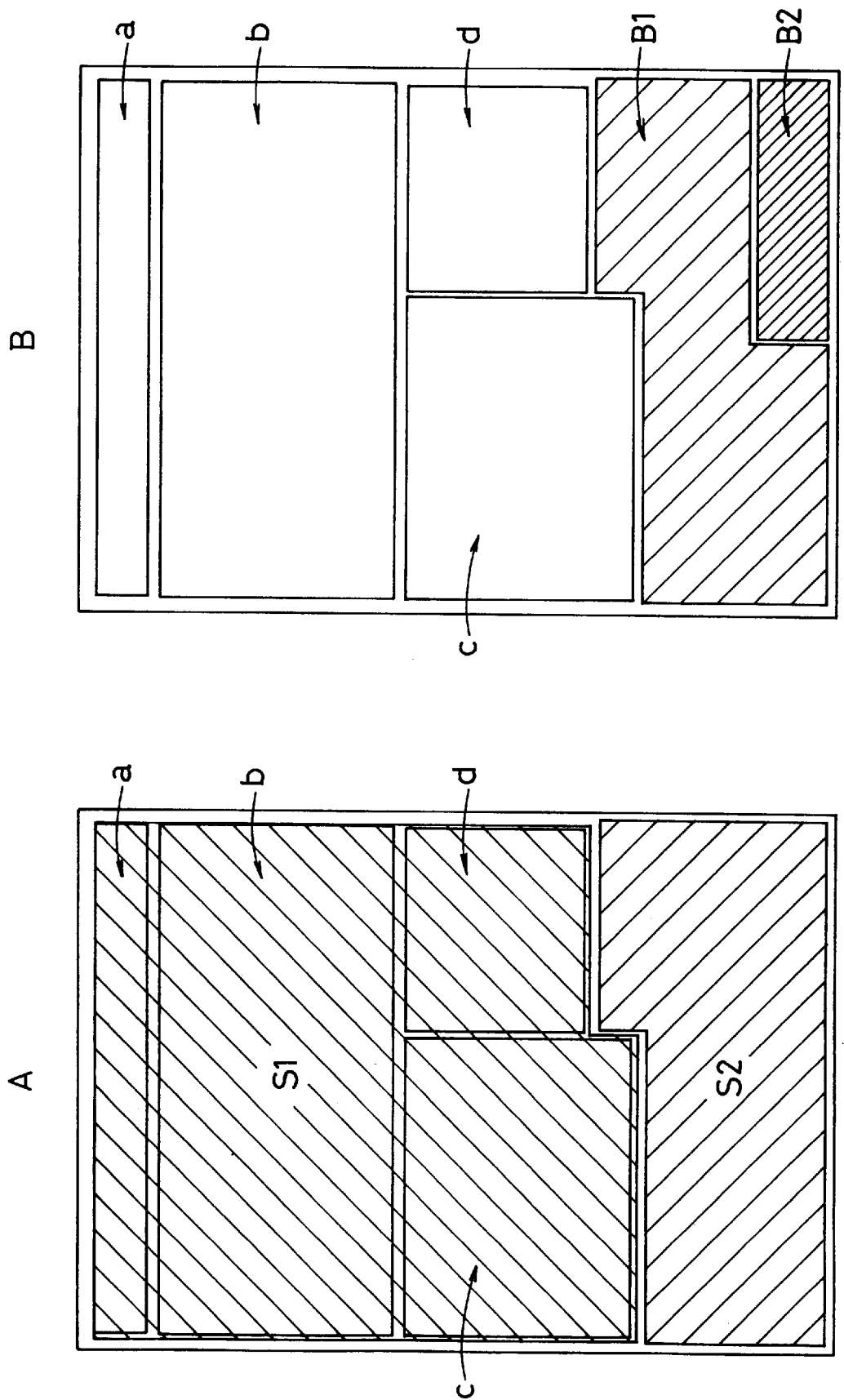
FIGS. 37A and 37B are diagrams showing an example (3) of the two-dimensional bar code input to the printing sheet according to the present invention.

FIG. 36 is a flowchart showing the processing for calculating a printing area according to the present invention. In the flowchart of FIG. 36, the total area on the printing sheet which can be printed is calculated by the area calculating circuit 25, and a value thus obtained is S (Step S6A). Then, the area which is occupied by the information (a to d) other than the two-dimensional bar code is calculated, and a value thus obtained is S1 (Step S6B). The area on which two-dimensional bar code information can be printed is calculated from S and S1, and a value thus obtained is S2 (S2=S−S1). The area necessary for printing in bar code having a low density dot size is calculated, and a value thus obtained is S3 (Step S6D).

It is decided whether printing can be executed in two-dimensional bar code having a low density dot size or not, i.e., whether S3 is equal to or smaller than S2 (Step S6E). If YES, the printing is executed in two-dimensional bar code having a low density dot size. If NO, the area necessary for printing in bar code having a high density dot size is calculated, and a value thus obtained is S4 (Step S6G). It is decided whether printing can be executed in two-dimensional bar code having a high density dot size or not, i.e., whether S4 is equal to or smaller than S2 (Step S6H). If YES, printing is executed in two-dimensional bar code having a high density dot size (Step S6I). If NO, the printing cannot be executed in the area (Step S6J).

FIGS. 37A and 37B are diagrams showing an example 3 of the two-dimensional bar code input to the printing sheet.

As shown in FIG. 37A, information S1 including a to e is inputted. The residual portion S2 which is shown in slanting lines is an area in which the sound information expressed in two-dimensional bar code can be printed.

Figure 38:
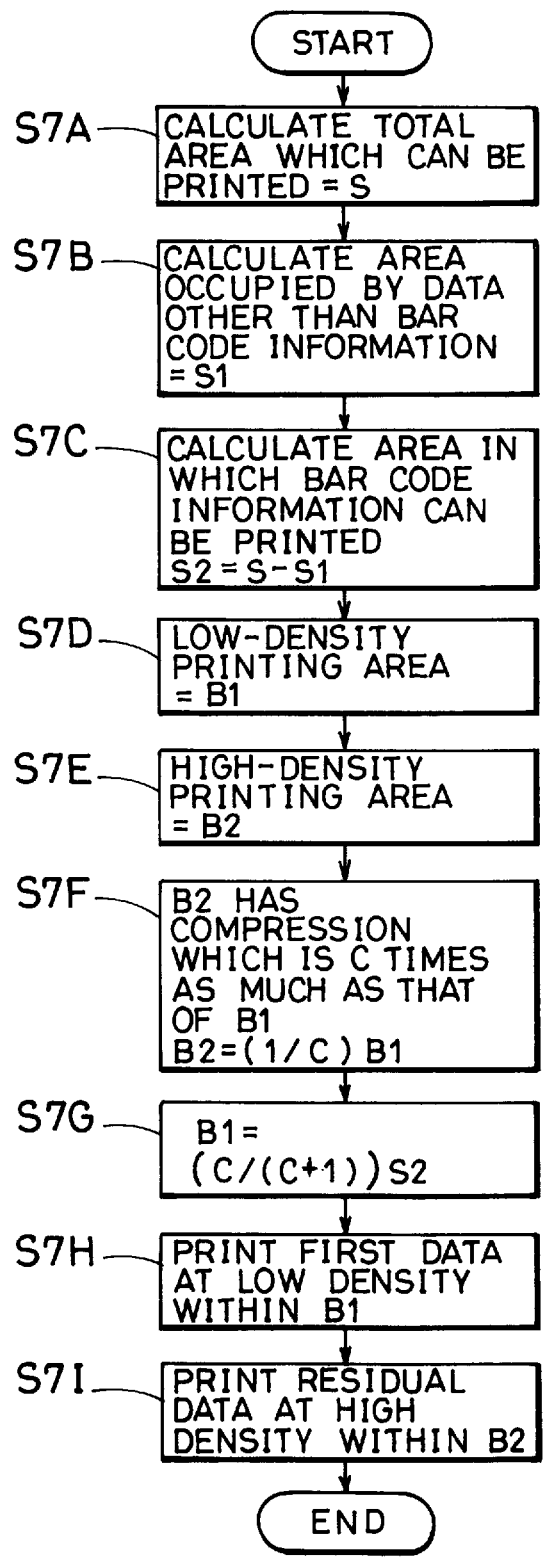
FIG. 38 is a flowchart showing the processing (2) for calculating the printing area according to the present invention.

FIG. 38 is a flowchart showing the processing (2) for calculating the printing area according to the present invention. In the flowchart of FIG. 38, Steps S7A to S7C are the same as Steps S6A to S6C shown in FIG. 36. The area in which the sound information expressed in two-dimensional bar code can be printed is S2 (Step S7C).

An area necessary for printing in two-dimensional bar code having a low density dot size is B1 (Step S7D). An area necessary for printing in two-dimensional bar code having a high density dot size is B2 (Step S7E). Assuming that the area B2 necessary for printing in two-dimensional bar code having a high density dot size has a compression ratio which is C times as much as that of the area B1 necessary for printing in two-dimensional bar code having a low density dot size, B2 is expressed by Formula: B2=(1/C)×B1 (Step S7F). Based on Formula: S2=B1+B2 and B2=(1/C)×B1, the area B1 necessary for printing in two-dimensional bar code having a low density dot size is calculated by Formula: B1=(C/(C+1))×S2 (Step S7G). Thus, the first sound information is printed in two-dimensional bar code having a low density dot size within the area B1 (Step S7H). The residual sound information is printed in two-dimensional bar code having a high density dot size within the area B2 (Step S71).

Figure 39:
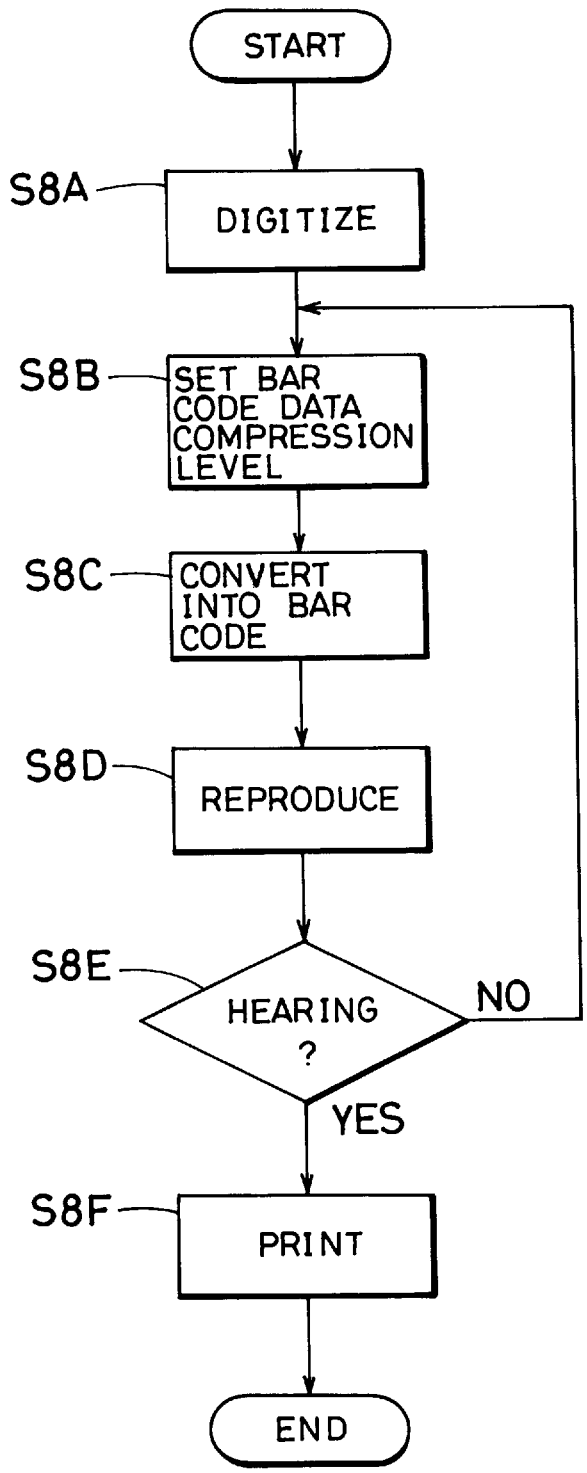
FIG. 39 is a flowchart showing the processing for compressing the two-dimensional bar code according to the present invention.

FIG. 39 is a flowchart showing the processing for compressing the two-dimensional bar code according to the present invention. In the flowchart of FIG. 39, the inputted sound is first digitized (Step S8A). Then, the compression level of the two-dimensional bar code is set (Step S8B). The digitized data is converted into bar code (Step S8C). Actually, the compressed bar code is reproduced (Step S8D). If the sound information cannot be heard (Step S8E), the routine returns to Step S8B so as to reset the compression level. If the sound information can be heard, printing is executed (Step S8F).

Figure 40A:
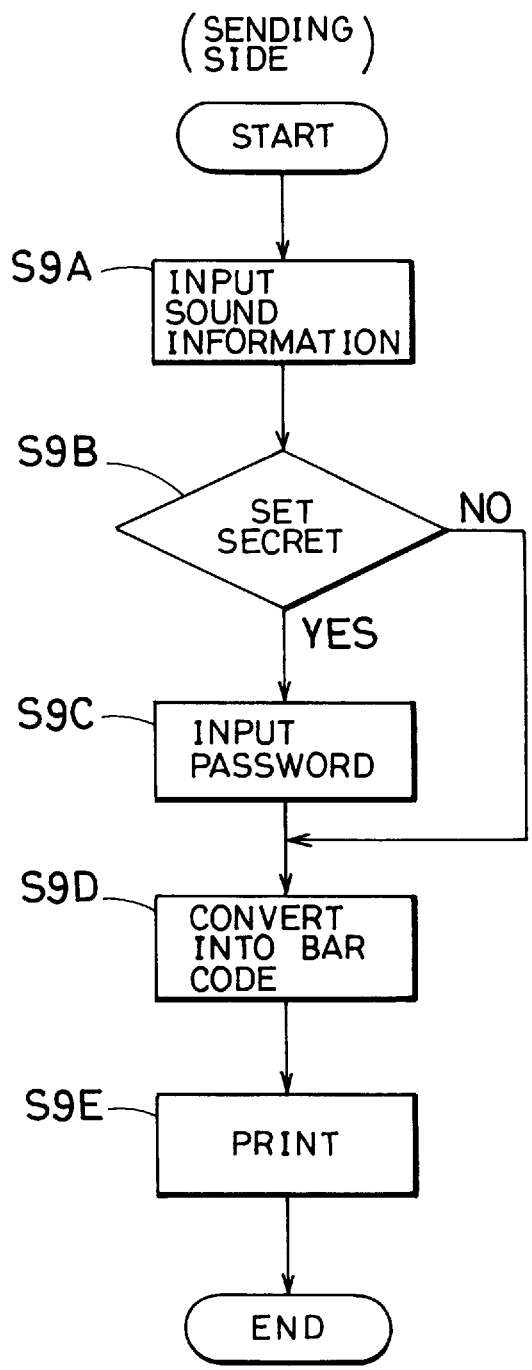
FIGS. 40A and 40B are flowcharts showing the secret processing (1) for the two-dimensional bar code according to the present invention.
Figure 40B:
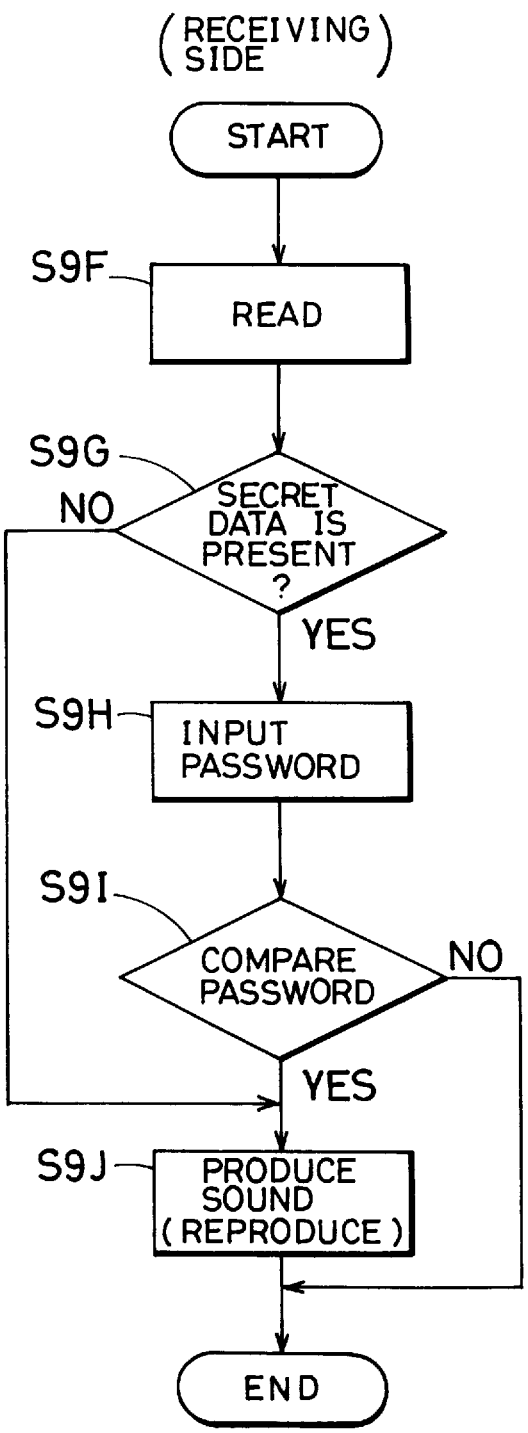

FIGS. 40A and 40B are flowcharts showing the secret processing (1) for the two-dimensional bar code according to the present invention. The two-dimensional bar code having the secret function and the retrieval thereof will be described below. FIG. 40A is a flowchart for the sending side. FIG. 40B is a flowchart for the receiving side. In the flowchart of FIG. 40A for the sending side, the sound information is first inputted (Step S9A). It is decided whether a secret is set or not (Step S9B). If the secret is set, a password is inputted (Step S9C). The password is converted into bar code together with the sound information (Step S9D). Then, printing is executed (Step S9E).

In the flowchart of FIG. 40B for the receiving side, a printing sheet is read by a scanner (Step S9F). It is decided whether or not the read information is the data to which the secret is set (Step S9G). If YES, a password is inputted (Step S9H). The password thus inputted is compared with the password described on the printing sheet (Step S91). If they match, reproduction is executed (Step S9J).

Figure 41A:
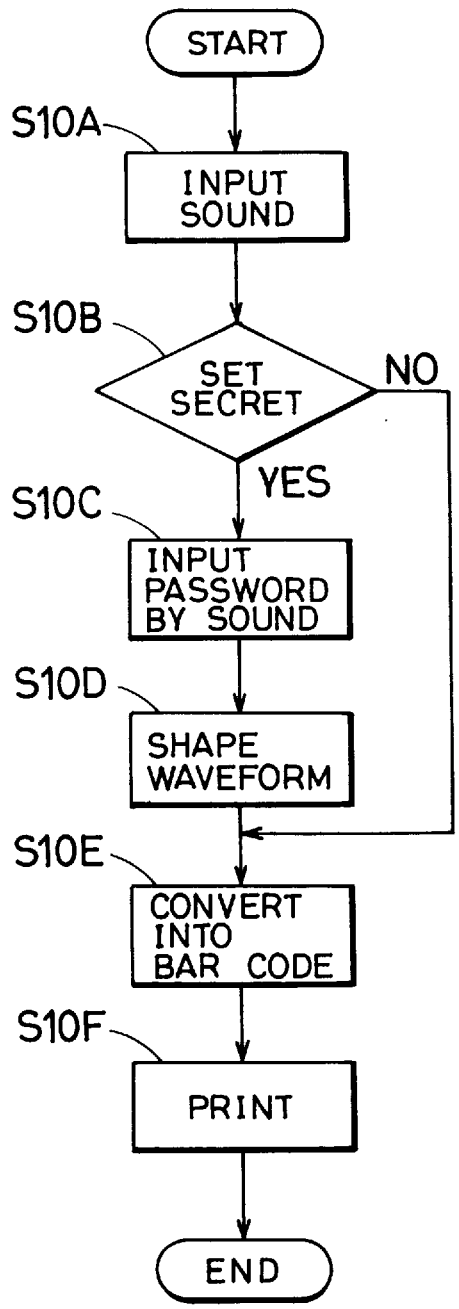
FIGS. 41A and 41B are flowcharts showing the secret processing (2) for the two-dimensional bar code according to the present invention.
Figure 41B:
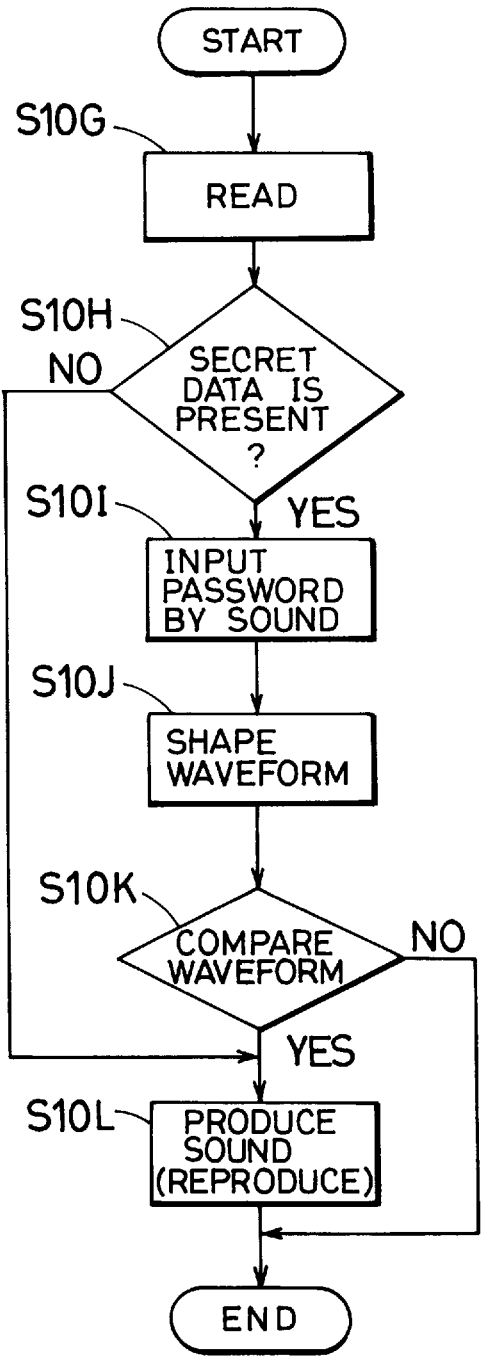

FIGS. 41A and 41B are flowcharts showing the secret processing (2) for the two-dimensional bar code according to the present invention. The two-dimensional bar code having the secret function which uses a sound password and the retrieval thereof will be described below. FIG. 41 A is a flowchart for the sending side.

FIG. 41 B is a flowchart for the receiving side.

In the flowchart of FIG. 41A for the sending side, a sound is first inputted (Step S10A). It is decided whether a secret is set or not (Step S10B). If the secret is set, a password is inputted by a sound (Step S10C). The sound is converted into a password digital signal shaped waveform by a sound waveform generating circuit 26 (Step S10D), expressed in bar code (Step S10E), and printed (Step S10F).

In the flowchart of FIG. 41 B for the receiving side, a printing sheet is read by the scanner (Step S10G). It is decided whether or not the read information is the data to which the secret is set (Step S10H). If YES, a password is inputted by a sound (Step S101). The password which is inputted by the sound is converted into a password digital signal shaped waveform by the sound waveform generating circuit 26 (Step S10J) and compared, by the waveform comparing circuit 27, with a password digital signal of which sound is described on the printing sheet (Step S10K). If they match, reproduction of the sound information is executed (Step S10L).

Figure 42A:
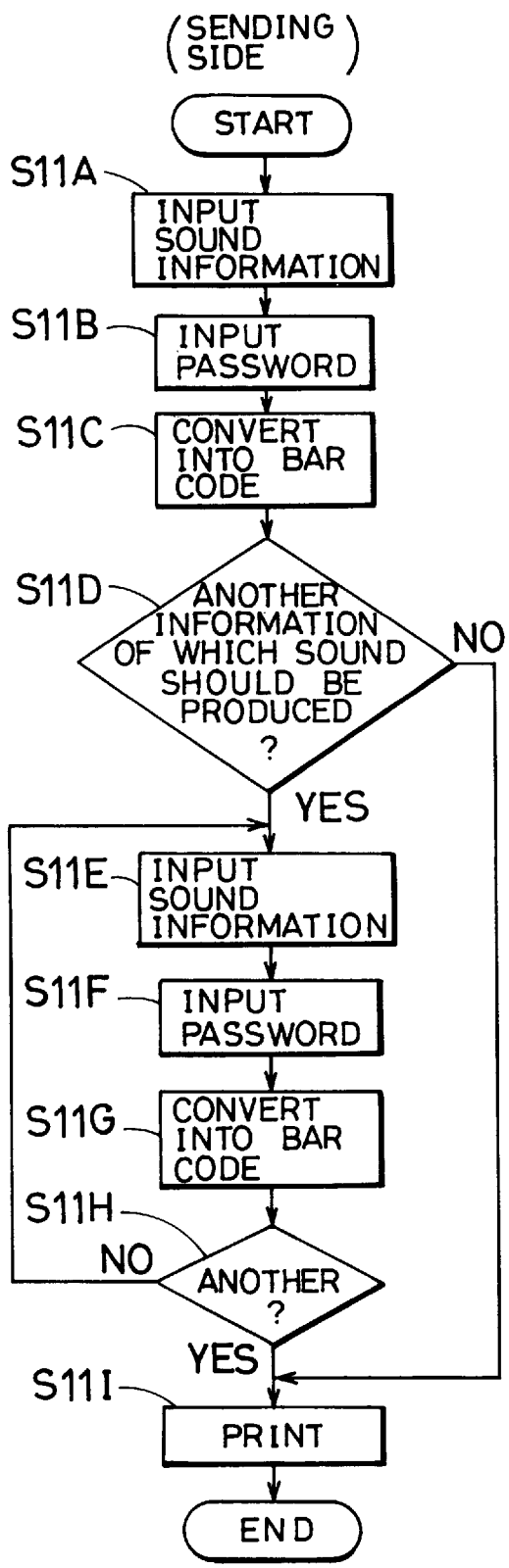
FIGS. 42A and 42B are flowcharts showing the secret processing (3) for the two-dimensional bar code according to the present invention.
Figure 42B:
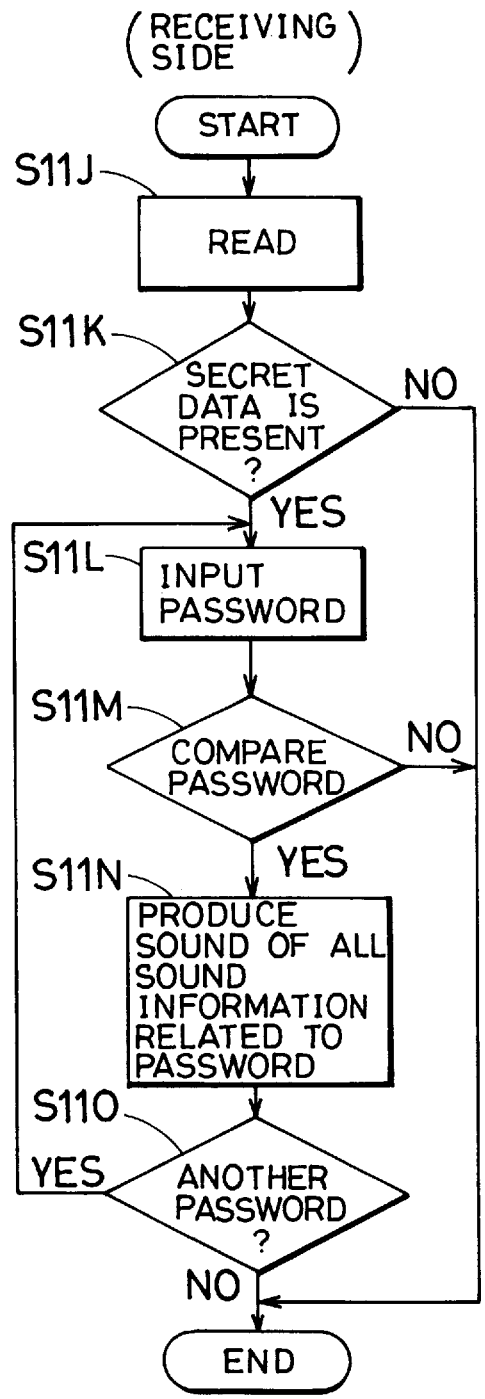

FIGS. 42A and 42B are flowcharts showing the secret processing (3) for the two-dimensional bar code according to the present invention. An example in which the secret function is added to each sound information and the retrieval of the sound information will be described below. FIG. 42A is a flowchart for the sending side. FIG. 42B is a flowchart for the receiving side.

In the flowchart of FIG. 42A, the sound information is first inputted (Step S11A) and a password is inputted (Step S11B). Then, they are converted into bar code (Step S11C). If there is another information which should be reproduced (Step S11D), the sound information is inputted (Step S11E), a password is inputted (Step S11F) and converted into bar code (Step S11G). If there is yet another sound information (Step S11H), this operation is repeated. If there is no sound information, printing is executed (Step S11I).

In the flowchart of FIG. 42B for the receiving side, a printing sheet is read (Step S11J). Then, the presence of secret data is verified (Step S11K). If the secret data is present, a password is inputted. When the password is inputted (Step S11L), the password thus inputted is compared with a password described on the printing sheet (Step S11M). If they mismatch, sound production is not executed. If they match, all the sound information related to the password are reproduced (Step S11N). If there is sound information to which a secret is set by another password (Step S11O), the password is inputted.

Figure 43:
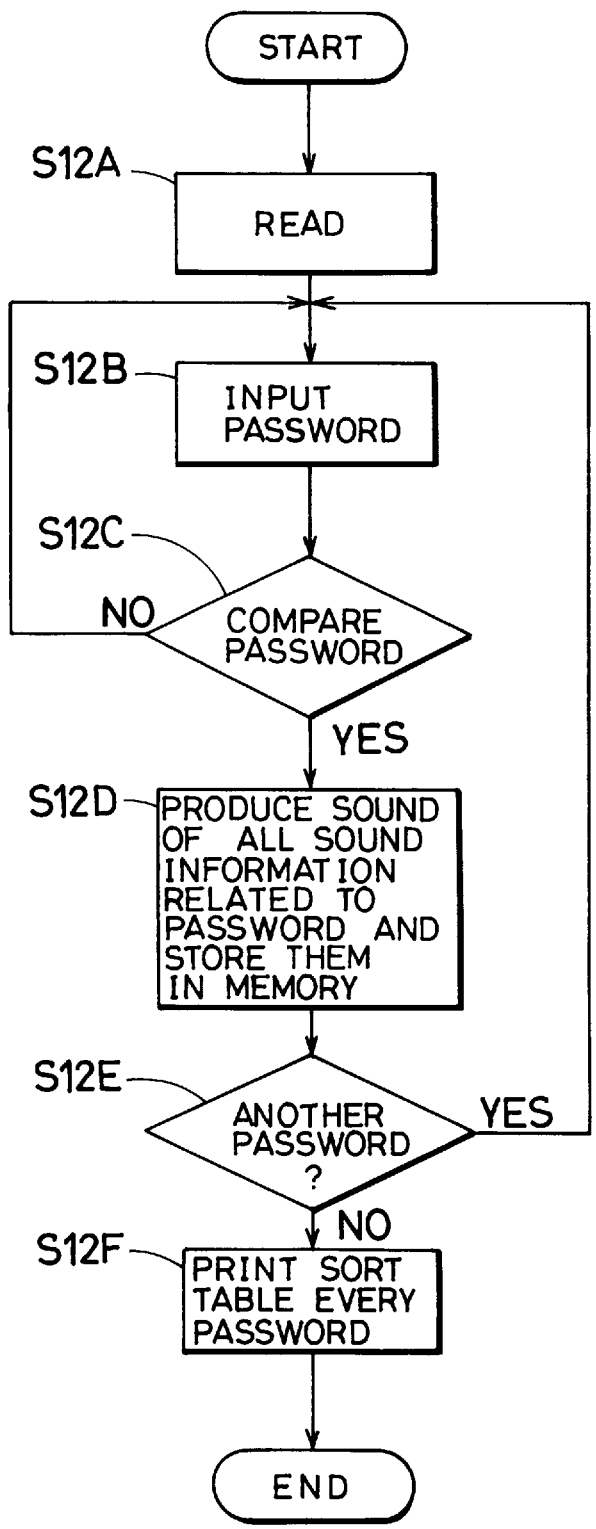
FIG. 43 is a flowchart showing the secret processing (4) for the two-dimensional bar code according to the present invention.

FIG. 43 is a flowchart showing the secret processing (4) for the two-dimensional bar code according to the present invention. An example in which the sort tables of the sound information related to the set passwords are printed in plural passwords shown in FIG. 42 will be described below.

In the flowchart of FIG. 43, if the secret function is added to a lot of sound information, a printing sheet on which the document information, the image information, the graphic information, and the sound information expressed in two-dimensional bar code have already been described together is read (Step S12A). A password is inputted (Step S12B). If the passwords match (Step S12C), all the sound information related to the password are reproduced and stored in a RAM (memory) (Step S12D). If there is another password, the routine returns to Step S12B and the same operation is repeated. If there is no other password, a sort table is printed every password (Step S12F).

According to the structure of the present invention, the following effects can be obtained as described above with reference to FIGS. 2 and 28 to 43.

In the case where the visual information related to the sound information is retrieved on a printing sheet on which the sound information expressed in two-dimensional bar code is added to the visual information including the document information, the image information and the graphic information, the specific coordinates of the sound information which is encoded to two-dimensional bar code are designated so that the related information is scrolled and displayed in the display area on the screen while the sound information corresponding to the specific coordinates is being reproduced. Consequently, the information related to the designated sound information can be verified on the display screen.

Further, there are a plurality of blocks for the information related to the sound information. Even though the cursor is moved while the specific sound information is being reproduced, the screen is scrolled so that the information related to the sound information which is being reproduced can always remain in the display area. Therefore, the related information is not out of the screen area.

When all the information are stored in a reading memory and the designation for retrieving all the visual information related to the sound information is inputted, all the sound information can sequentially be reproduced and the information related to the sound information can be displayed on the screen. Consequently, the contents of the sound information and the related visual information can be grasped simultaneously.

In the case where the inputted sound information is encoded to two-dimensional bar code and printed on the printing sheet, a horizontal or vertical length is automatically calculated when a starting point for printing on the screen and the horizontal or vertical length are respectively designated. Consequently, a printing area is displayed on the screen in a real time, so that verification can be performed by sight and the printing sheet can be used efficiently. In addition, it is easy to change the position, the area and the like after determination.

In the case where the inputted sound information is encoded to two-dimensional bar code and printed on the printing sheet, either of the high or low density dot size of two-dimensional bar code can be selected according to the circumstances. Consequently, when reading the sound information, the area occupied by the two-dimensional bar code can be adjusted while ensuring the grade of the two-dimensional bar code. For example, if the error ratio should be decreased at the time of reading, the low density dot size is selected.

According to the conditions of the area occupied by the two-dimensional bar code, it is automatically decided whether either the high or low density dot size of the two-dimensional bar code should be selected for switching. Therefore, when reading the sound information, the area in which the sound information can be printed can be used efficiently while ensuring the grade of the two-dimensional bar code.

According to the conditions of the area occupied by the two-dimensional bar code, it is possible to switch the dot size of the two-dimensional bar code from a low density to a high density on the way. Consequently, the area in which the sound information can be printed can fully be utilized.

When encoding the inputted sound information to the two-dimensional bar code, the minimum compression level is set to the range in which the sound information can be heard. Consequently, the reading error of the two-dimensional bar code can be reduced.

When a password is set to the inputted sound information, the secret function can be added and canceled.

When adding the secret function to the inputted sound information so as to set a password, the sound can be shaped into waveform and stored as a password. The inputted sound can be compared with the password waveform. Consequently, it is possible to add and cancel the secret function of the sound information by a sound.

Since a plurality of secret functions for setting each password every inputted sound information are provided, the sound information corresponding to each password can be retrieved.

When retrieving each sound information related to the set password, it is possible to display or print the sort tables of the set password and the sound information related to the password on the screen.

The present invention will be described in detail with reference to FIGS. 44 to 57.

Figure 44:
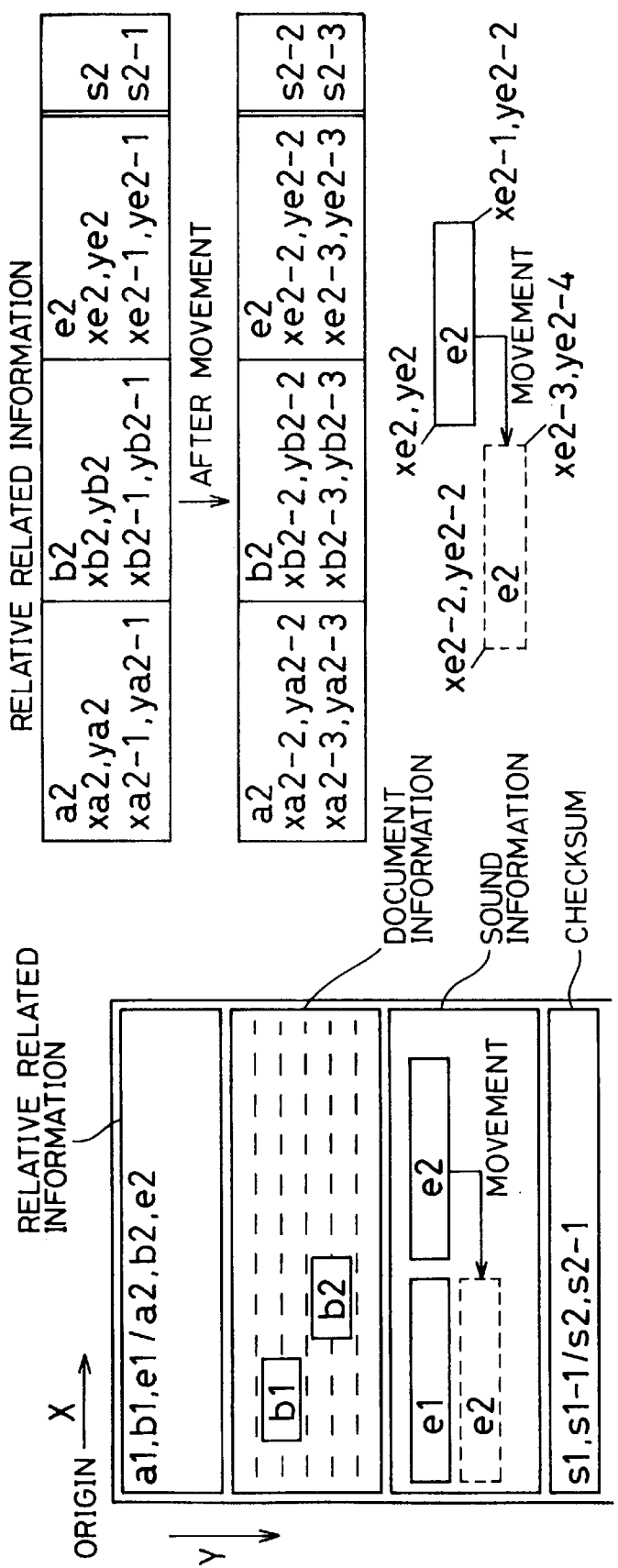
FIG. 44 is a diagram showing the function of moving the area of the sound information according to the present invention.

FIG. 44 is a diagram showing the function of moving the sound information in an area according to the present invention. The function shown in FIG. 44 indicates the processing for editing the relative related information for the area movement of the sound information expressed in two-dimensional bar code.

In FIG. 44, a, b and e indicate the relative related information, the document information and the sound information expressed in two-dimensional bar code.

The relative related information a is position information (sound information management information) which indicates the coordinates of areas for the sound information e expressed in two-dimensional bar code and the related information b to d, areas and the like in the information source including the document information b, the image information c, the graphic information d and the like. The sound information e and the information b to d of the information source are related to one another. A plurality of relative related information are present in the area of the relative related information a.

The information b1 and e1 are related to each other, and the information b2 and e2 are related to each other. The relative related information thus obtained are indicated at a1 and a2. The symbols a to e which will be described below are the same as the foregoing.

Figure 45:
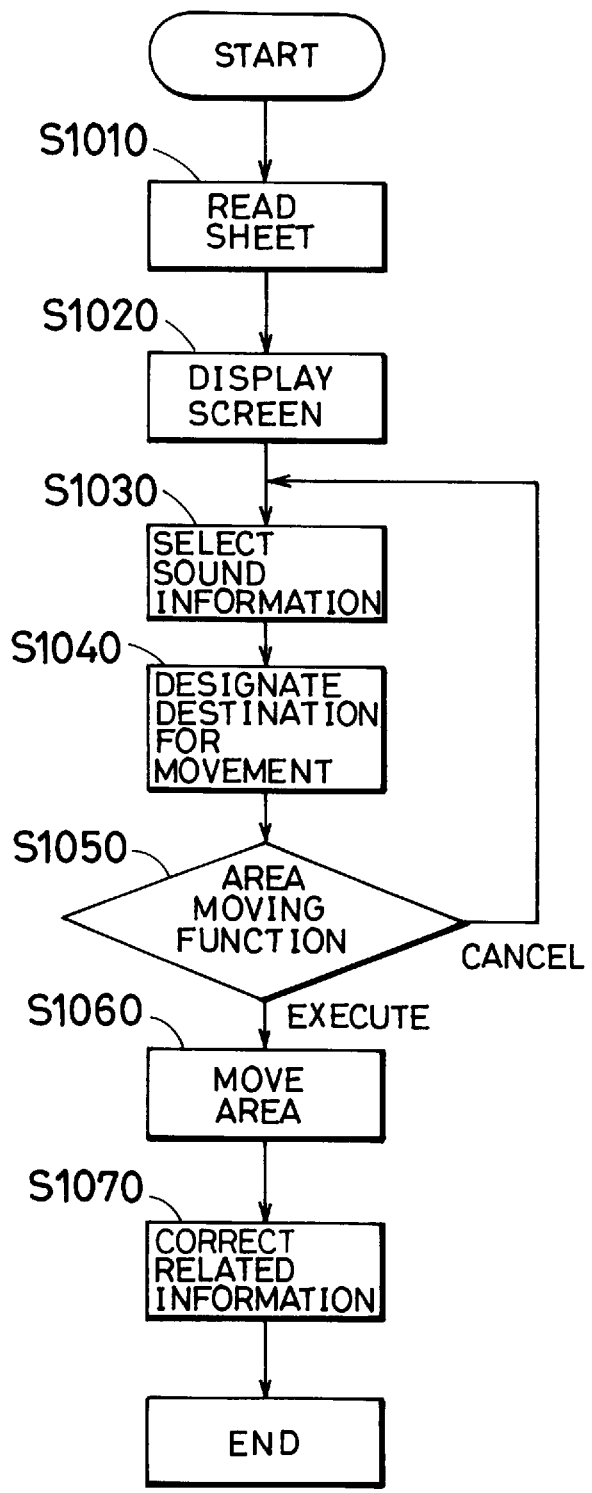
FIG. 45 is a flowchart showing the processing (1) for editing the related information according to the present invention.

FIG. 45 is a flowchart showing the processing (1) for editing the related information according to the present invention. The processing for editing (correcting) the related information (relative related information) for the area movement of the sound information expressed in two-dimensional bar code with reference to the flowchart of FIG. 45 and the diagram of FIG. 44.

In the flowchart of FIG. 45, a printing sheet on which the relative related information a, the document information b, the sound information e expressed in two-dimensional bar code and the like have already been described is read by a scanner (Step S1010), and is displayed on a screen (Step S1020). The sound information which should be moved is selected (Step S1030). The destination for movement of the sound information is designated (Step S1040). The area movement of the sound information is executed or canceled by the area moving function (Step S1050). In the case of cancel, the routine returns to the original display screen in Step S1020. In the case of execution, the sound information is moved to the designated area (Step S1060). The contents of the relative related information are corrected with the area movement of the sound information (Step S1070).

Step S1070 will further be described. As shown in FIG. 44, when the area of the sound information e2 is moved to an area designated in dotted lines, the coordinates e2 (xe2, ye2) and (xe2-1, ye2-1) of the relative related information are interlockingly corrected into the coordinates of the destination for movement (xe2-2, ye2-2) and (xe2-3, ye2-3) by the interlocking correcting function.

According to the edit processing, the relative related information is automatically corrected interlockingly when the sound information expressed in two-dimensional bar code is moved in the area on the display screen. Consequently, it is not necessary to correct the relative related information after area movement, so that the area movement can easily be performed.

Figure 46:
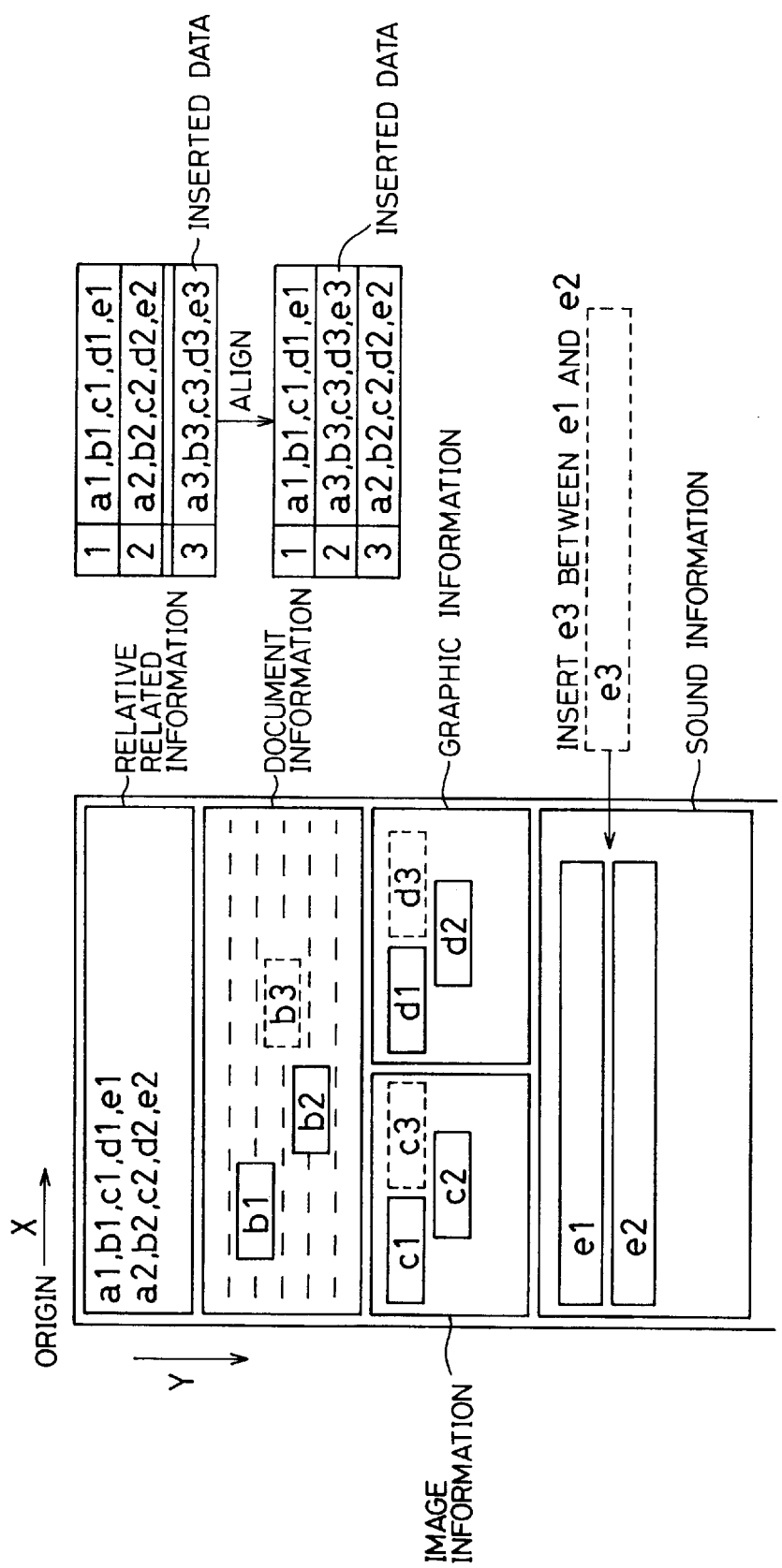
FIG. 46 is a diagram showing the function of inserting the sound information according to the present invention.

FIG. 46 is a diagram showing the function of inserting the sound information according to the present invention. The function shown in FIG. 46 indicates the processing for editing the relative related information for the additional insertion of the sound information expressed in two-dimensional bar code. The information b1, c1, d1 and e1, and b2, c2, d2 and e2 are related respectively, and the relative related information are a1 and a2.

Figure 47:
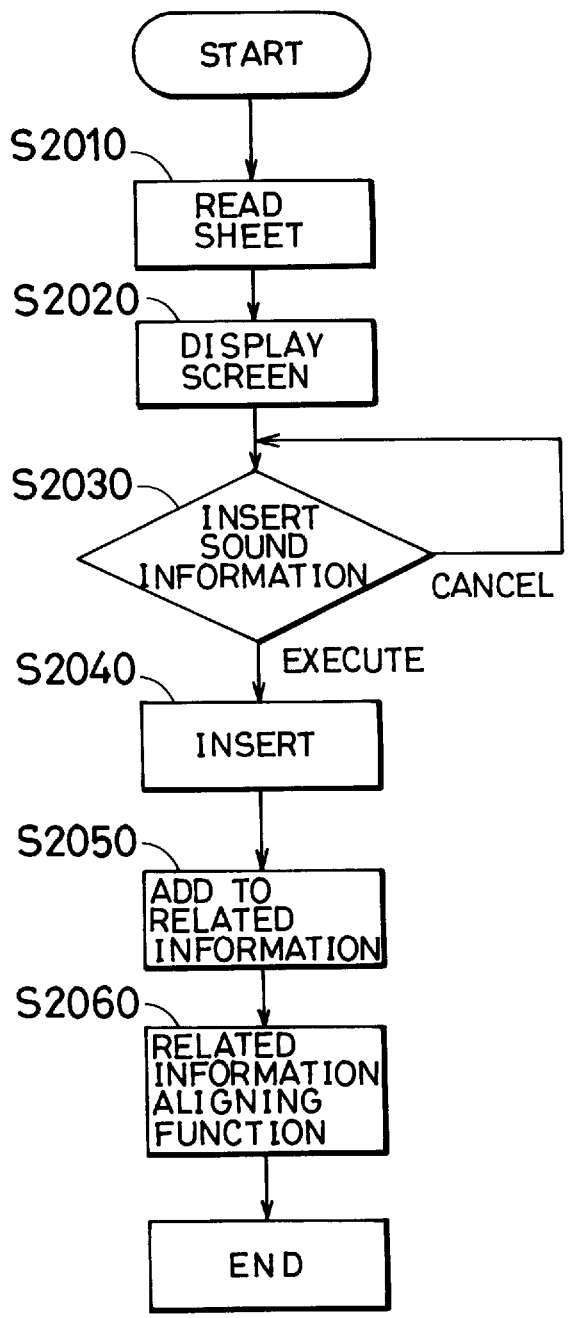
FIG. 47 is a flowchart showing the processing (2) for editing the related information according to the present invention.

FIG. 47 is a flowchart showing the processing (2) for editing the related information according to the present invention. The processing for editing the relative related information executed when the sound information is inserted into the document information to which a plurality of sound information have already been added will be described with reference to the flowchart of FIG. 47 and the diagram of FIG. 46.

In the flowchart of FIG. 47, a printing sheet on which the relative related information a, the document information b, the image information c, the graphic information d, the sound information e expressed in two-dimensional bar code and the like have already been described is read by a scanner (Step S2010), and is displayed on a screen (Step S2020). The insertion of the sound information is executed or canceled by the inserting function (Step S2030). In the case of cancel, the routine returns to the original screen display in Step S2020. In the case of execution, the sound information is inserted (Step S2040). The coordinates of the inserted sound information and the relative related information are added (Step S2050). A plurality of relative related information are aligned in order of area which is closer to the origin of the printing sheet (screen) by the aligning function (Step S2060).

Steps S2040 to S2060 will further be described. As shown in FIG. 46, in the case where the information b3, c3 and d3 related to the sound information e3 are added between the information b1 and b2, c1 and c2, and d1 and d2, respectively, the relative related information a3 is inserted between the information a1 and a2 to perform edit again.

According to the edit processing, when the sound information which should be expressed in two-dimensional bar code is further inserted into a plurality of sound information expressed in two-dimensional bar code, the relative related information are automatically related again and aligned. Consequently, the information can easily be retrieved.

Figure 48:
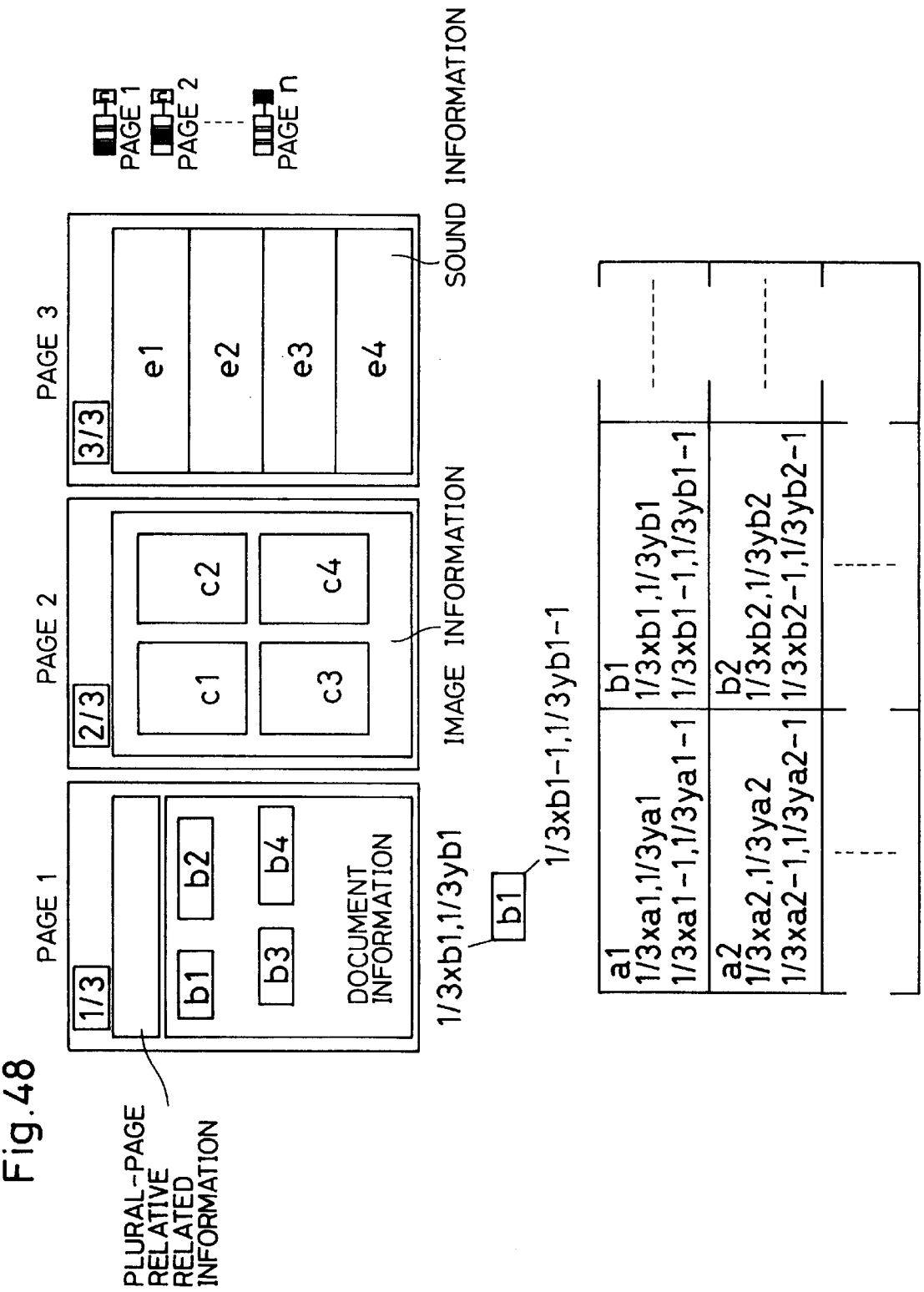
FIG. 48 is a diagram showing the function of adding the page information of the related information according to the present invention.

FIG. 48 is a diagram showing the function of adding the page information of the related information according to the present invention. The function shown in FIG. 48 indicates the edit processing for adding the page information to the relative related information in the case where the sound information expressed in two-dimensional bar code and the information related to the sound information are described on plural pages, respectively.

As shown in FIG. 48, the page information is further added to the relative related information a when the relative related information a and the document information b are on Page 1, the image information c is on Page 2, and the sound information e is on Page 3.

Figure 49:
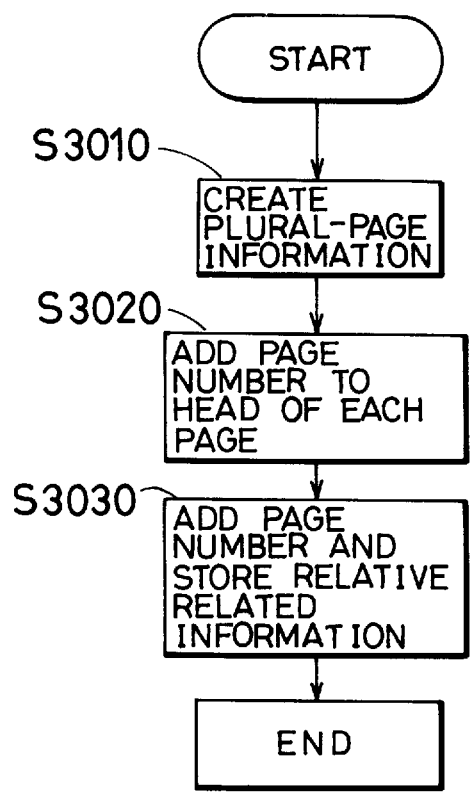
FIG. 49 is a flowchart showing the processing (3) for editing the related information according to the present invention.

FIG. 49 is a flowchart showing the processing (3) for editing the related information according to the present invention. The processing for editing the relative related information executed when each related information is created on plural pages of the sheet on which the sound information expressed in two-dimensional bar code is described will be described with reference to the flowchart of FIG. 49 and the diagram of FIG. 48.

In FIG. 49, when the relative related information a and the document information b are created on Page 1, the image information c is created on Page 2, and the sound information e is created on Page 3 as shown in FIG. 48 (Step S3010), the page number is added to the head of each page (Step S3020). The page number and the coordinate information of the page are combined, added to the relative information and stored in the RAM so as to be described on the head of Page 1 (Step S3030).

According to the edit processing, the sound information and the related information described on plural pages can be managed so that the range in which the sound information expressed in two-dimensional bar code is utilized can be enlarged.

Figure 50:
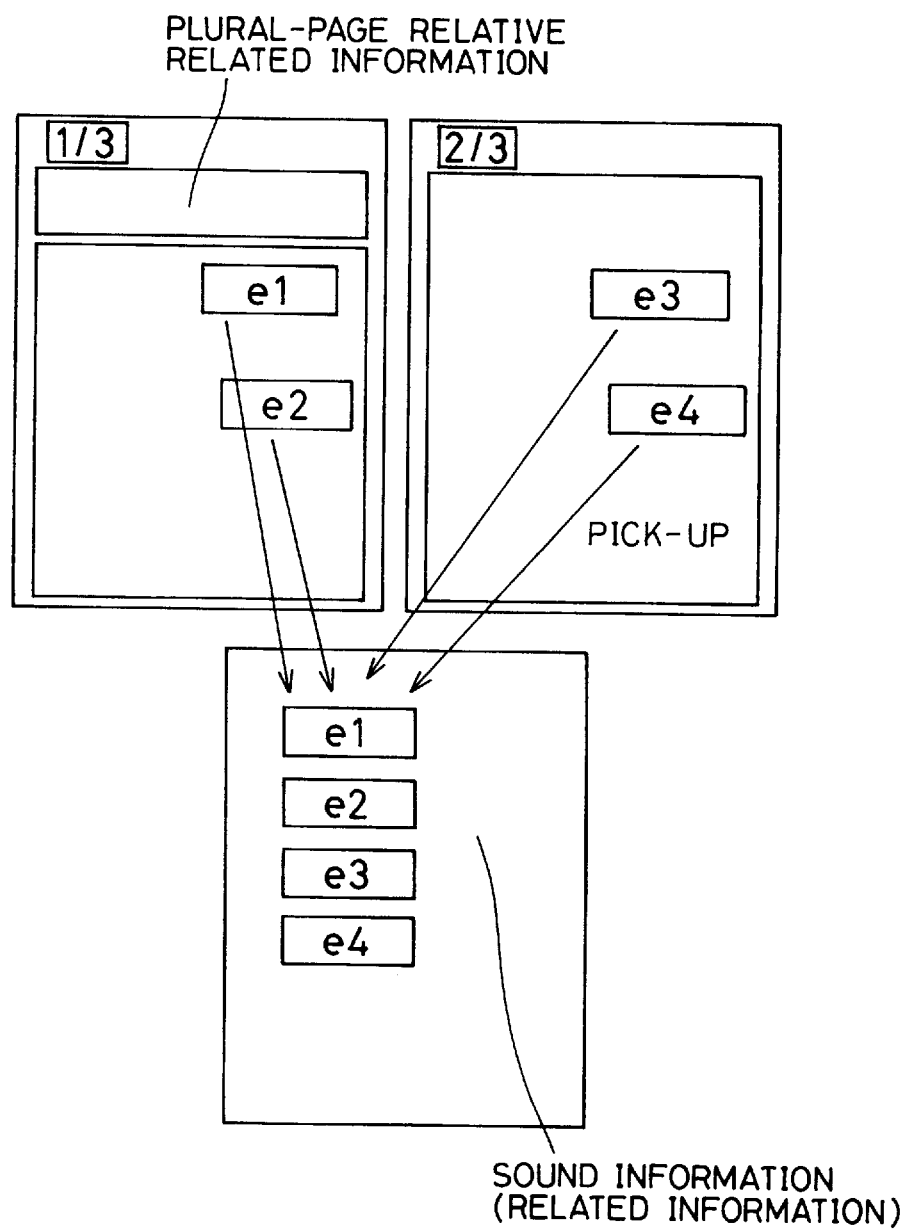
FIG. 50 is a diagram showing the function of retaining the sound information according to the present invention.

FIG. 50 is a diagram showing the function of retaining the sound information according to the present invention. The function shown in FIG. 50 indicates the edit processing for picking up only the sound information and retaining the same on another sheet in the case where the sound information expressed in two-dimensional bar code are described on plural pages.

As shown in FIG. 50, in the case where the sound information e1 and e2 are described on Page 1 and the sound information e3 and e4 are described on Page 2, the same sound information e1 to e4 are sequentially picked up from the head and retained on the sheet.

Figure 51:
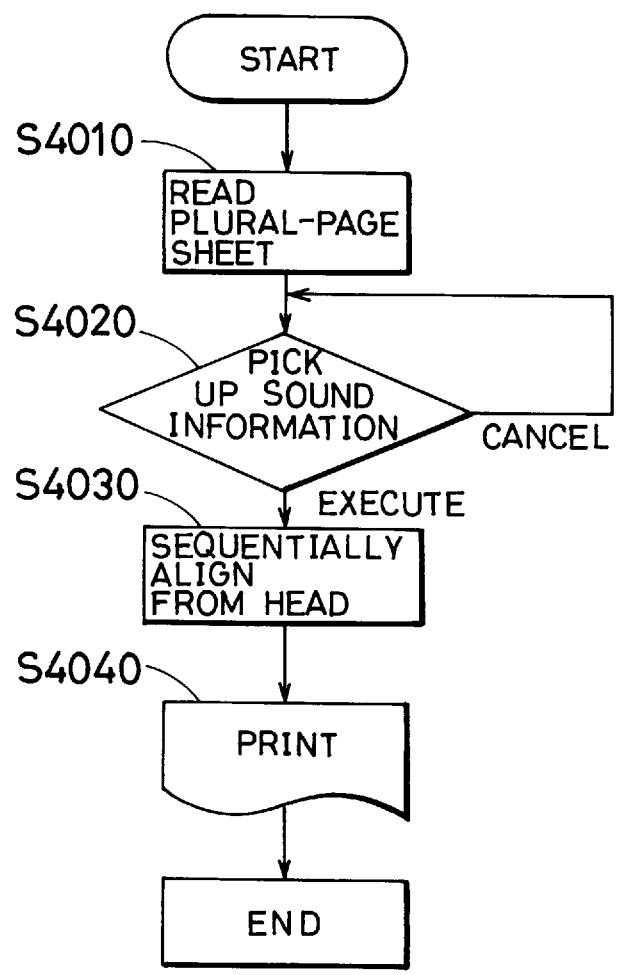
FIG. 51 is a flowchart showing the processing for retaining the sound information according to the present invention.

FIG. 51 is a flowchart showing the processing for retaining the sound information according to the present invention. The edit processing for picking up only the sound information and retaining the same on a sheet in the case where the related sound information are described together on plural sheets will be described with reference to the flowchart of FIG. 51 and the diagram of FIG. 50.

In FIG. 51, the printing sheet having a plurality of pages on which each information and the sound information expressed in two-dimensional bar code have already been described is read by a scanner (Step S4010). The function of picking up the sound information is executed or canceled (Step S4020). In the case of cancel, the routine stands by on the original screen in Step S4010. In the case of execution, only the sound information are sequentially picked up in order of which page number and coordinate system are closer to an origin, and are aligned on a new page and displayed (Step S4030). The sound information thus displayed are printed and retained on the printing sheet (Step S4040).

According to the processing for retaining the sound information, only the sound information expressed in two-dimensional bar code can be picked up from the information source in which each information is described on plural printing sheets, and printed and retained on other printing sheets.

Figure 52:
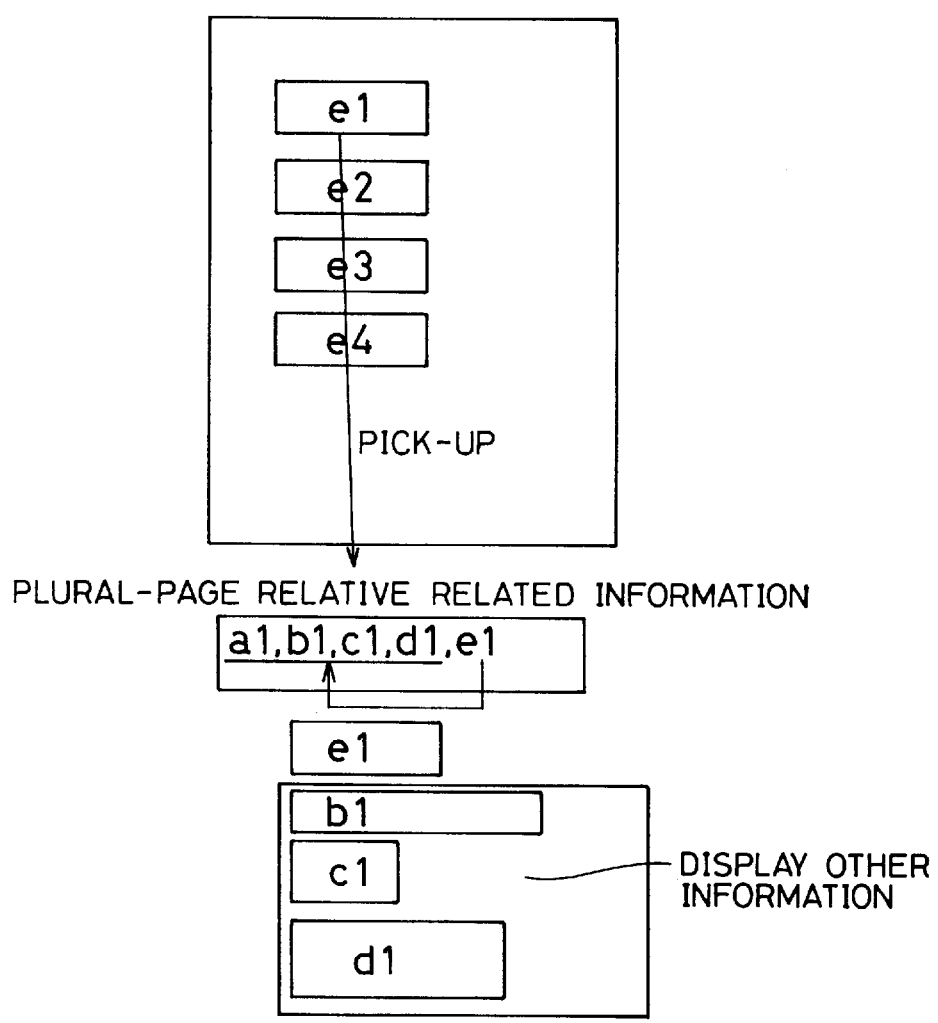
FIG. 52 is a diagram showing the function of calling the sound information and the information related to the sound information according to the present invention.

FIG. 52 is a diagram showing the function of calling the sound information and the information related to the sound information according to the present invention. The function shown in FIG. 52 indicates the edit processing for picking up the sound information retained in FIG. 50 and calling the related information from the relative related information. As shown in FIG. 52, the sound information e1 to e4 printed on other sheets are picked up so that the related information can be aligned and called from the relative related information.

Figure 53:
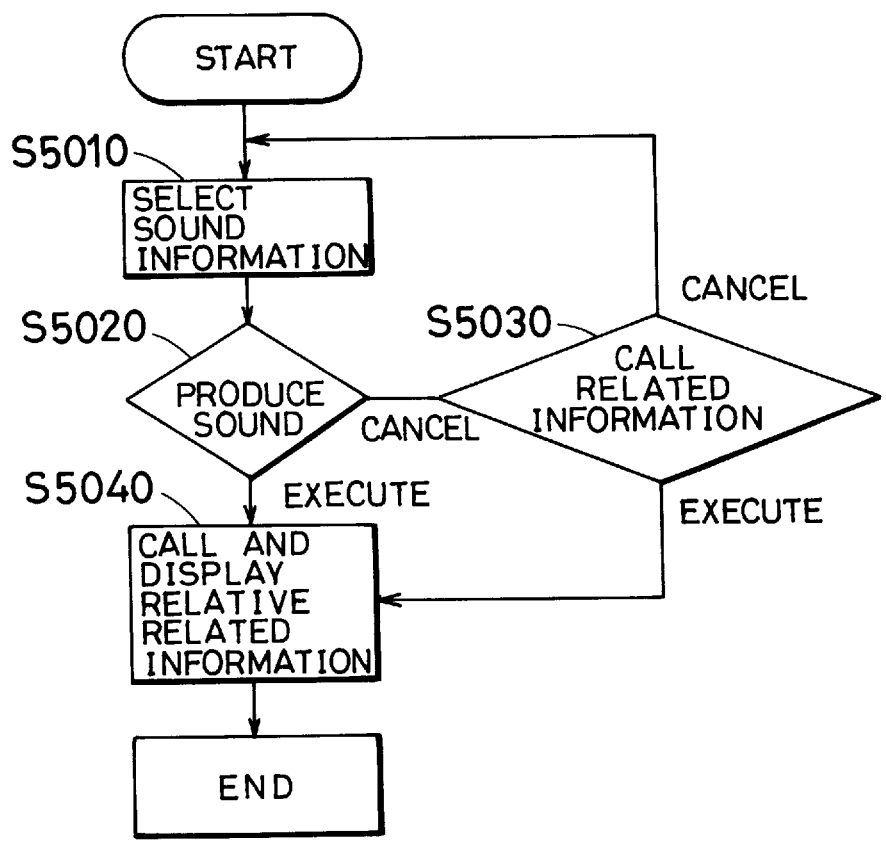
FIG. 53 is a flowchart showing the processing for retrieving the related information according to the present invention.

FIG. 53 is a flowchart showing the processing for retrieving the related information according to the present invention. The edit processing for collecting the sound information on plural pages on another sheet and selecting the sound information so that the information related to the sound information can be called will be described with reference to the flowchart of FIG. 53 and the diagram of FIG. 52.

In FIG. 53, the sound information aligned in FIG. 50 is selected (Step S5010). The sound production (reproduction) of the sound information is executed or canceled (Step S5020). In the case of cancel, the sound information is not reproduced but the related information such as document information, image information or graphic information is called and displayed beneath the sound information (Step S5030). In the case of execution, the sound information is reproduced and the related information such as the document information, the image information or the graphic information is called and displayed beneath the sound information (Step S5040).

According to the retrieval processing, the sound information is picked up so that the related information can be called. Consequently, the information can be retrieved more efficiently. In addition, the information related to the sound information on plural pages can be retrieved more easily.

Figure 54:
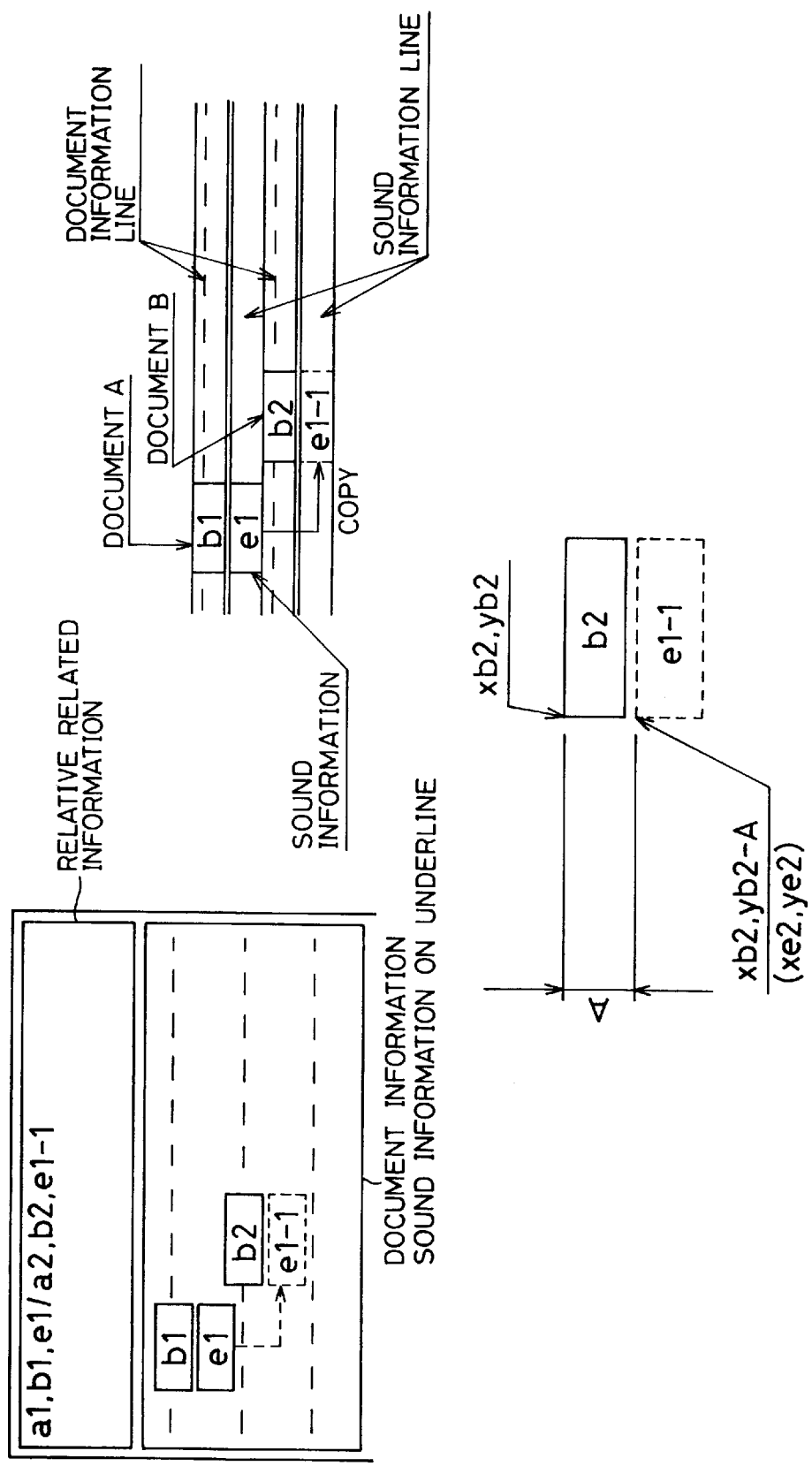
FIG. 54 is a diagram showing the function of copying the area of the sound information according to the present invention.

FIG. 54 is a diagram showing the function of copying the area of the sound information according to the present invention. The function shown in FIG. 54 indicates the processing for editing the relative related information for the area copy of the sound information expressed in two-dimensional bar code.

Figure 55:
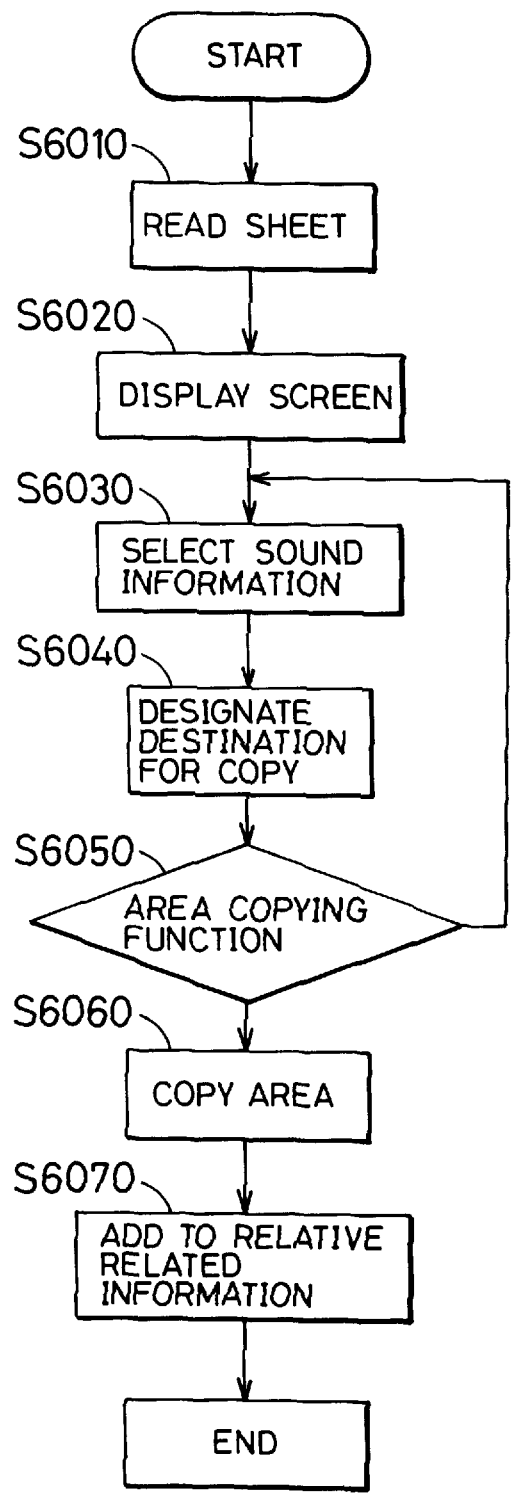
FIG. 55 is a flowchart showing the processing (4) for editing the related information according to the present invention.

FIG. 55 is a flowchart showing the processing (4) for editing the related information according to the present invention. The processing for editing (correcting) the relative related information for the copy of the sound information expressed in two-dimensional bar code will be described with reference to the flowchart of FIG. 55 and the diagram of FIG. 54.

In the flowchart of FIG. 55, a printing sheet on which the relative related information a, the document information b, the sound information e expressed in two-dimensional bar code and the like have already been described is read by a scanner (Step S6010), and is displayed on a screen (Step S6020). The sound information which should be copied is selected (Step S6030). The destination for copy of the sound information is designated (Step S6040). The area copy of the sound information is executed or canceled by the area copying function (Step S6050). In the case of cancel, the routine returns to the original display screen in Step S6020. In the case of execution, the sound information is copied on the designated area (Step S6060). The contents of the relative related information are added with the area copy of the sound information (Step S6070).

Steps S6060 to S6070 will further be described below. As shown in FIG. 54, the sound information e1 is managed on an underline beneath the document information b1 (A). In the case where the same sound information is required in the same document or beneath another document b2 (B), the sound information e1 which should be copied is selected and the destination for copy is designated. Consequently, the sound information e1-1 is copied. The Y direction of a sound information line is expressed by coordinate: yb2–A=ye2. The X direction of the sound information line is expressed by coordinate: xb2=xe2. In addition, the position information of the sound information e1-1 is added to the relative related information.

According to the edit processing, the area in which the sound information should be copied is designated and the sound information is copied by the area copying function so that the relative related information can additionally be corrected interlockingly. Consequently, it is not necessary to correct the relative related information again.

Figure 56:
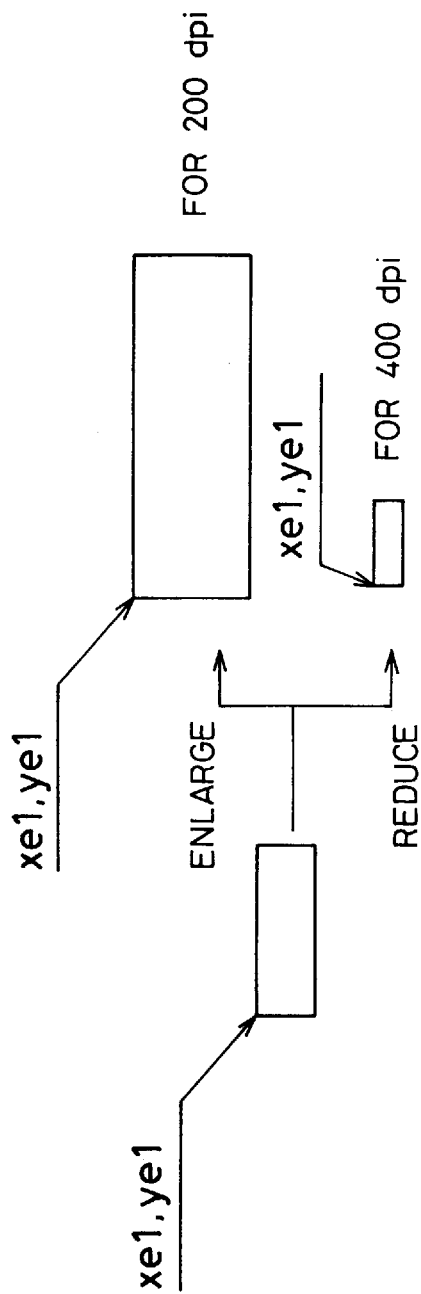
FIG. 56 is a diagram showing the function of enlarging/reducing the sound information according to the present invention.

FIG. 56 is a diagram showing the function of enlarging/reducing the sound information according to the present invention. The function shown in FIG. 56 indicates the processing for setting a dot level so as to perform the encoding to two-dimensional bar code according to the resolution of a reader (scanner).

Figure 57:
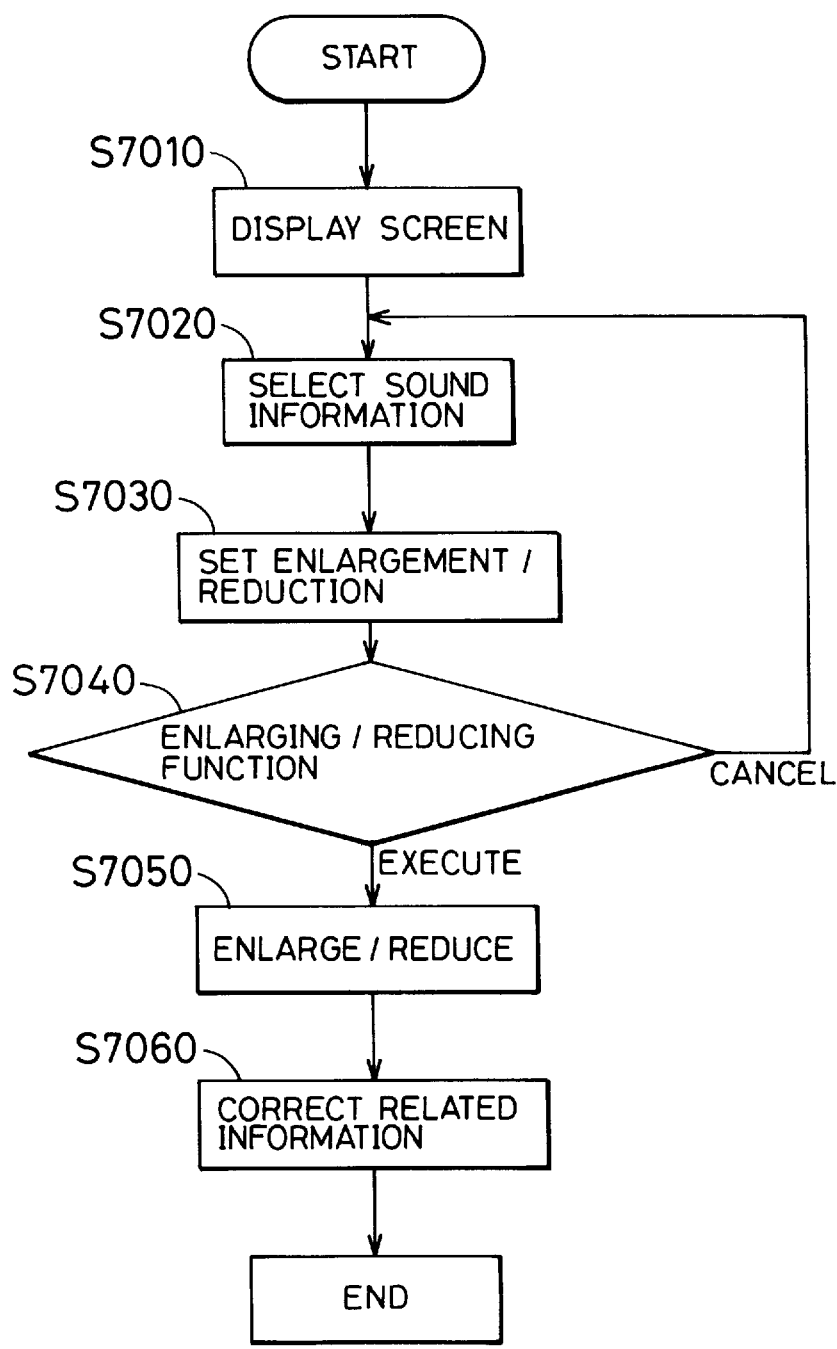
FIG. 57 is a flowchart showing the processing (5) for editing the related information according to the present invention.

FIG. 57 is a flowchart showing the processing (5) for editing the related information according to the present invention. The enlargement/reduction of the dot level of the sound information expressed in two-dimensional bar code will be described with reference to the flowchart of FIG. 57 and the diagram of FIG. 56.

In FIG. 57, the printing sheet on which the relative related information a, the document information b, the sound information e expressed in two-dimensional bar code and the like have already been described is read by the scanner and displayed on the screen (Step S7010). The sound information which should be enlarged or reduced is selected (Step S7020) to set enlargement or reduction (Step S7030). The function of enlarging/reducing the sound information is executed or canceled (Step S7040). In the case of cancel, the routine returns to the original display screen in Step S7010. In the case of execution, the selected sound information is enlarged/reduced (Step S7050). The contents of the relative related information are corrected with the enlargement/reduction of the sound information (Step S7060).

As shown in FIG. 56, enlargement/reduction can be set according to the resolution of the reader (scanner) for 200 dpi or 400 dpi.

By the edit processing, the enlarging/reducing function is provided so that the dot size of the two-dimensional bar code can be set according to the resolution level on the reader side.

According to the structure of the present invention, the following effects can be obtained as described above with reference to FIGS. 2 and 44 to 57.

In the case where the sound information expressed in two-dimensional bar code is related to the information of the information source including the document information, the image information, the graphic information and the like based on the relative related information having coordinate information so as to edit the information, the coordinate information of the relative related information is automatically corrected interlockingly when moving the area of the sound information on the display screen. Consequently, edit can be performed more quickly and efficiently. Accordingly, it is not necessary to set the coordinates of the relative related information again.

In the case where the sound information expressed in two-dimensional bar code is related to the information described on plural pages, the page number is added to the relative related information and the coordinate information on the page is combined and corrected. Consequently, it is possible to manage the sound information on plural pages.

When performing copy by the function of copying the sound information in an area, the relative related information is additionally corrected interlockingly. Consequently, it is not necessary to set the coordinates of the relative related information again.

The enlarging/reducing function is provided so that the dot size of the two-dimensional bar code can be set according to the resolution level on the reader side.

When additionally inserting the sound information expressed in two-dimensional bar code into a plurality of sound information expressed in two-dimensional bar code in the information of the information source, the relative related information stored in the means for storing the sound information and the relative related information are realigned with the additional insertion of the sound information and the coordinate information of the relative related information are corrected. Consequently, information retrieval can easily be performed.

Only the sound information is picked up from the information described on plural pages, and edited and saved on the printing sheet. Consequently, it is possible to quickly retrieve the sound information described on plural pages.

The sound information is picked up so that the information related to the sound information can be called. Consequently, the information can be retrieved more efficiently. In addition, it is easy to retrieve the information related to the sound information on plural pages.

The present invention will be described in detail with reference to FIGS. 58 to 76.

According to the present invention, the encoding page eject control code, the summary control code, the title control code and the like are inserted into the text memory 37 shown in FIG. 2 apart from the document page eject control code according to the prior art, so that edit can be performed by using two-dimensional bar code and the printed manner expressed in two-dimensional bar code which answers the purpose can be created. In addition, the printing sheets can be fetched by the scanner 13b shown in FIG. 2 so as to reuse the data.

The two-dimensional bar code used in present invention will be described below.

Figure 58:
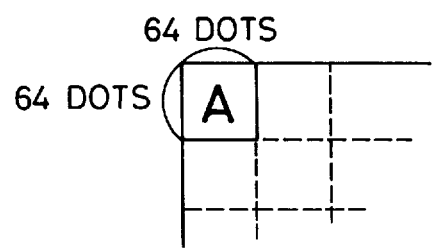
FIG. 58 is a diagram showing the number of dots which represent type.
Figure 59:
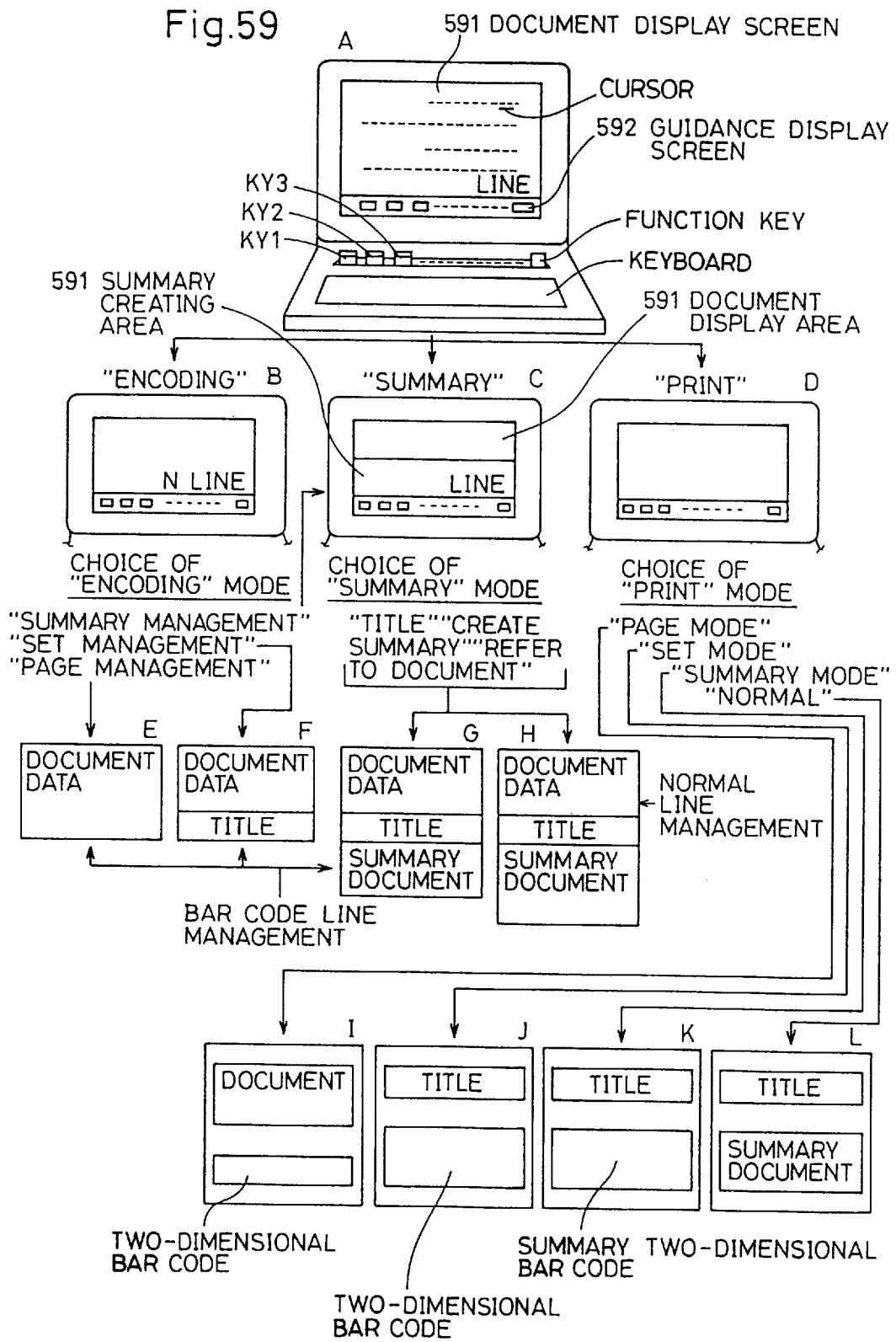
FIGS. 59A to 59L are diagrams for explaining the operation of an embodiment according to the present invention.

The relation between the type document and the two-dimensional bar code will be described with reference to FIG. 58. An example of type is 64 dots×64 dots/character, and the character spacing and the line spacing will be omitted in the description. As an example of code, the section code 0601 of (A) is expressed in 2 bytes, i.e., 16 bits. Similarly, 1 bit which is encoded to two-dimensional bar code in 4 dots becomes 16 dots×16 dots. As compared with type, the data length is compressed to ¼ and the area is compressed to ⅙ (see FIGS. 75 and 76).

The area ratio of the type to the two-dimensional bar code in output data is 16 to 1. The print information of a text can be expressed in the reduced area. Even though the character spacing and the line spacing are included, the same way is employed.

As will be described below, the present invention utilizes the two-dimensional bar code as a printing format. When the two-dimensional bar code is used, the information is compressed so that the document to be recorded on a page can be printed in more characters than the normal type document. For this reason, the page line number management of type print is different from that of the two-dimensional bar code. If the page line number management of type print is the normal line management, that of the two-dimensional bar code is the bar code line management.

The entire flow from the normal state of document display until encoding to two-dimensional bar code and print will schematically be described with reference to FIGS. 59A to 59L. FIG. 59A shows the appearance of a word processor according to an embodiment.

When the document which should be encoded to two-dimensional bar code is displayed on a document display screen 591 as shown in FIG. 59A, "encoding", "summary" and "print" are displayed on a guidance display screen 592.

Function keys KY1, KY2 and KY3 corresponding to the display are pressed down so that each function can be selected. If "encoding" is selected, "page management", "set management" and "summary management" are displayed on the guidance display screen 592 as shown in FIG. 59B.

If "summary" is selected, the display screen 591 is divided into "document display area 591a" and "summary or title creating area 591 b". As shown in FIG. 59C, "summarize title", "create" and "refer to document" are displayed on the guidance display screen 592.

If "print" is selected, "page mode", "set mode", "summary mode", and "normal" are displayed on the guidance display screen 592 as shown in FIG. 59D.

In the case of "page management" in the "encoding" mode, "page management" is selected so that the two-dimensional bar code of the document information displayed on the display screen 591 is created as shown in FIG. 59E. The number of lines which include the document information and the two dimensional bar code is displayed as an N line on the lower right of the display screen 591 as shown in FIG. 59B (N is a numeric value which is calculated at that time). The N lines may be the number of residual lines as will be described below.

In the case of "set management" in the "encoding" mode, "set management" is selected so that the two-dimensional bar code of the document information displayed on the display screen 591 is created as shown in FIG. 59F. A title can be inputted on the head of a page. The number of lines which include the title and the two-dimensional bar code is displayed on the lower right of the display screen 591.

If "summary management" in the "encoding" mode is selected, the state shown in FIG. 59C is obtained. More specifically, if "summary management" is selected for the document information displayed on the display screen 591 (FIG. 59B), the display screen 591 shown in FIG. 59C is obtained. The display screen 591 is divided into two areas. The document information can be inputted to one of areas. The title or summary can be inputted to the other area.

If "title" in the "summary" mode is selected, the area 591b becomes a title creating area. The key of "create summary" is pressed down, the area 591b becomes a summary creating area. The title or summary is usually created by the information inputted by the key. If "refer to document" on the guidance display screen 592 is selected, the text of the document display area 591a can be introduced into the summary or title.

If the key of "refer to document" is pressed down, the cursor key of a keyboard functions in the document display area 591a. The area of the text which is an object is designated, and an execution key of the keyboard is pressed down. Consequently, the text in the area designated in the document display area 591a is copied in and after the final cursor position of the area 591b obtained before "refer to document" is selected. Thus, the summary or title text can be created efficiently.

If "summary" is selected in FIG. 59A to move to FIG. 59C, the document data is created as shown in FIG. 59H. If "encoding" is selected in FIG. 59A and the key of "summary management" is pressed down in FIG. 59B to create the summary or title in FIG. 59D, the display shown in FIG. 59G is obtained. If "page mode" is selected and executed in "print" of FIG. 59D, print shown in FIG. 59I is obtained. More specifically, the document on the relevant page of the document data in the bar code line management created in FIG. 59E is printed, and the two-dimensional bar code image is printed beneath the same document.

If "set mode" is selected in FIG. 59D, print shown in FIG. 59J is obtained. After the title shown in FIG. 59F is printed in type, the relevant page of the document data is encoded to two-dimensional bar code and printed. If "summary mode" is selected in FIG. 59D, print shown in FIG. 59K is obtained. In FIG. 59K, the title written in FIG. 59G is printed in the type mode, and the summary document shown in FIG. 59G is encoded to two-dimensional bar code and printed.

If "normal" is selected in FIG. 59D, the document data, the title and the summary document shown in FIG. 59H are printed in type. For this reason, in the case where the title and the summary document are created beneath the document data after page eject or the area is designated on and after the title, the title and the summary document can be printed in type as shown in FIG. 59L.

Figure 60:
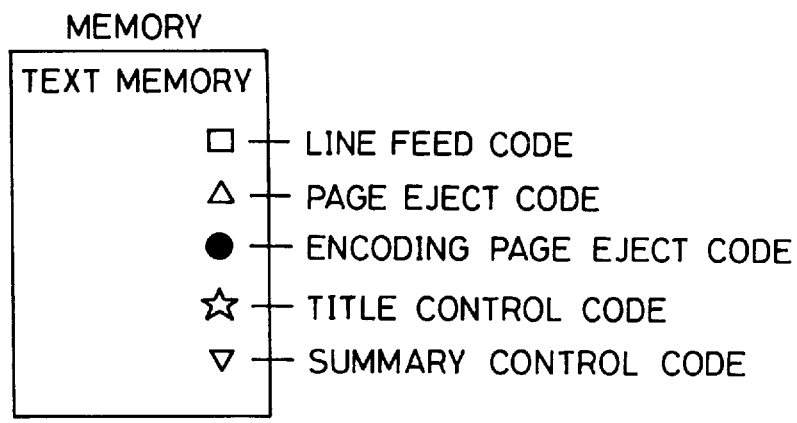
FIG. 60 is a diagram for explaining each control code of a text memory.
Figure 61:
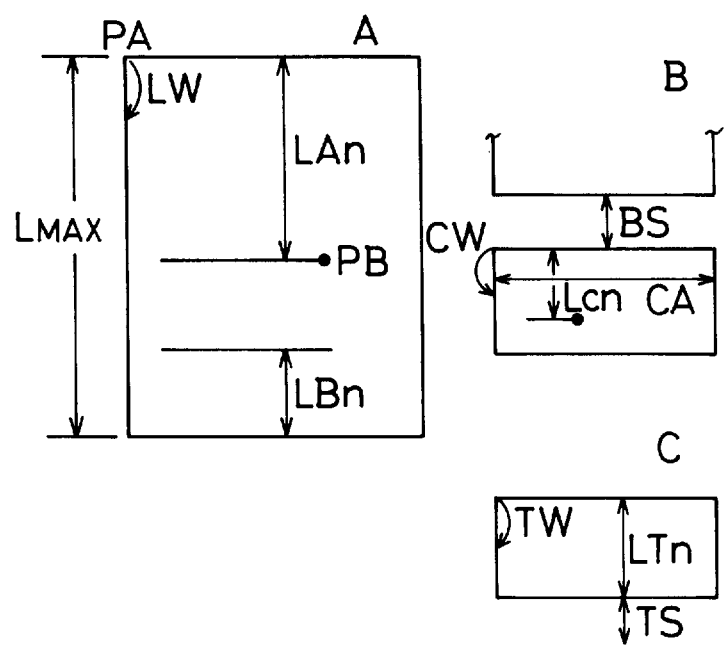
FIGS. 61A to 61C are diagrams for explaining the contents of display.
Figure 62:
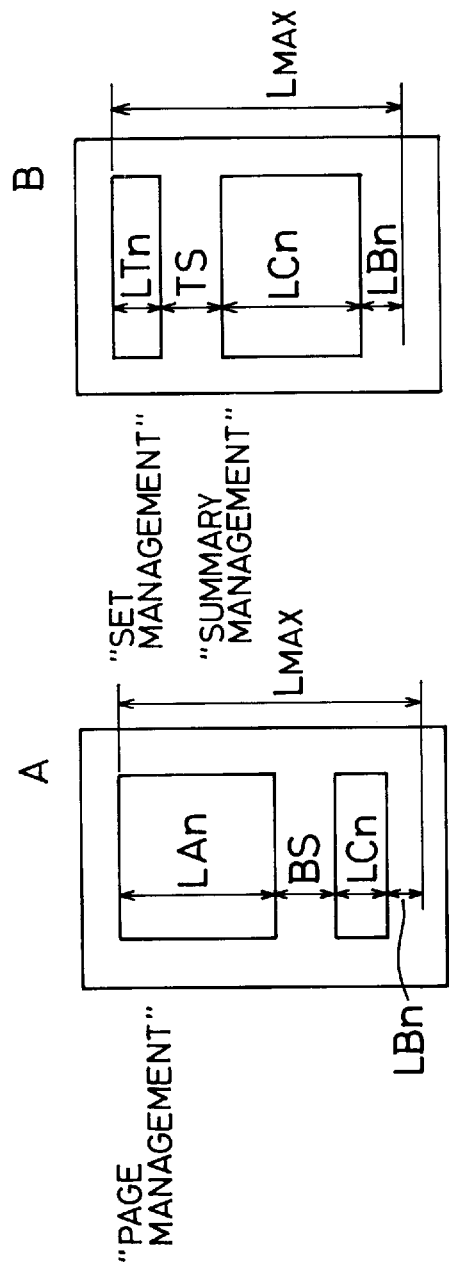
FIGS. 62A and 62B are diagrams for explaining the contents of print.

FIG. 60 shows the page eject control code for document information, the page eject control code for code output, the title control code and the summary control code in the document information.

In a text memory, the line feed code (□) and the page eject code (Δ) are set as the conventional functions. The encoding page eject code (●), the title control code (☆) and the summary control code () are further set as the functions of the present invention.

In the case of "page management", the page eject control code (Δ) in the normal document is ignored and the page eject code for code output (●) should be inputted again. In this case, bar code line management means management by the number of lines occupied by the document information and the two-dimensional bar code information corresponding thereto.

In the case of "set management", the page eject control code (Δ) in the normal document is ignored and the page eject code for code output (●) should be inputted again. In this case, the bar code line management means management by the number of lines obtained by replacing the document information with the two-dimensional bar code information. Occasionally, the title can be inputted to the head of a page (as shown in FIG. 59J).

In the case of "summary management", the page eject control code (Δ) in the normal document is ignored and the page eject code for code output (●) should be inputted again. In this case, the bar code line management means management by the number of lines obtained by replacing the created summary control code () with the two-dimensional bar code information. Occasionally, the title control code (☆) can be inputted to the head of a page (as shown in FIGS. 59K and 59L). By first input in the title and summary text, the order of a title and a summary can be seen, and the control code is automatically inserted into a text file.

FIGS. 61A to 61C show the results of memory, display and print of the type and two-dimensional bar code in each edit. FIGS. 61A and 61B show the contents obtained when the type data and the two-dimensional bar code are created, respectively. FIG. 61C shows the contents of the title creating data. FIG. 62A shows page management. FIG. 62B shows set management and summary management.

Figure 63:
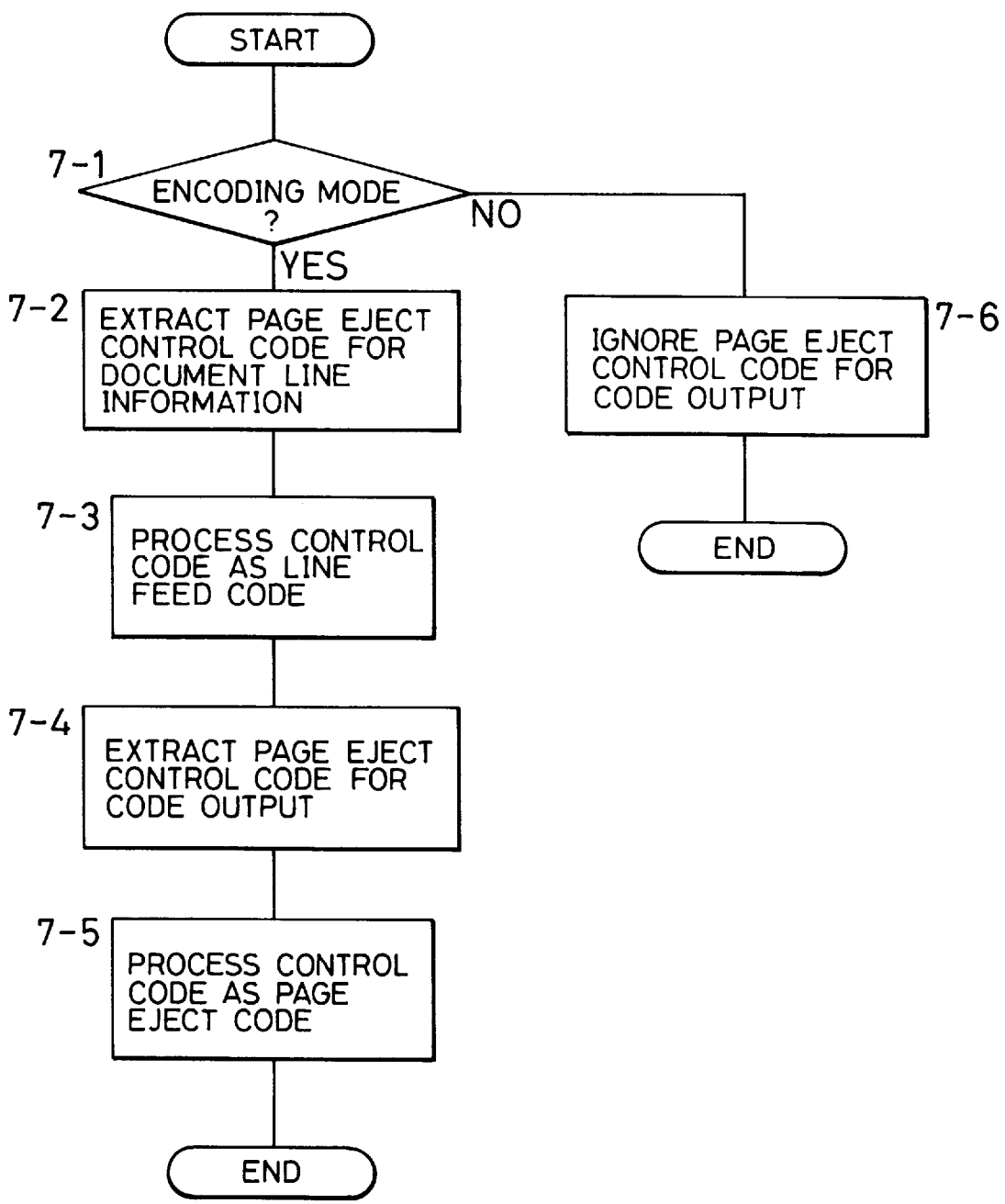
FIG. 63 is a flowchart showing the processing for extracting each control code.

PA=page head address
PB=variable address
Lmax=print longitudinal width
LW=text line spacing width BS=space over bar code
CW=bar code width
CA=encoded line information number
LAn=type longitudinal length
LBn=residual length
LCn=encoded longitudinal length
LDn=residual line number=LBn/LW=integral value
TW=title line spacing width
LTn=title longitudinal length
TS=space under title FIG. 63 is a flowchart for the control code of code output and document. In FIG. 63, if the mode is "encoding" (Step 7-1), the page eject control code for document line information is extracted (Step 7-2). The page eject control code thus extracted is processed as the line feed code (Step 7-3). Then, the page eject control code for code output is extracted (Step 7-4). The page eject control code for code output thus extracted is processed as the page eject control code (Step 7-5). In Step 7-1, the mode is not "encoding", the page eject control code for code output is ignored (Step 7-6).

Figure 64:
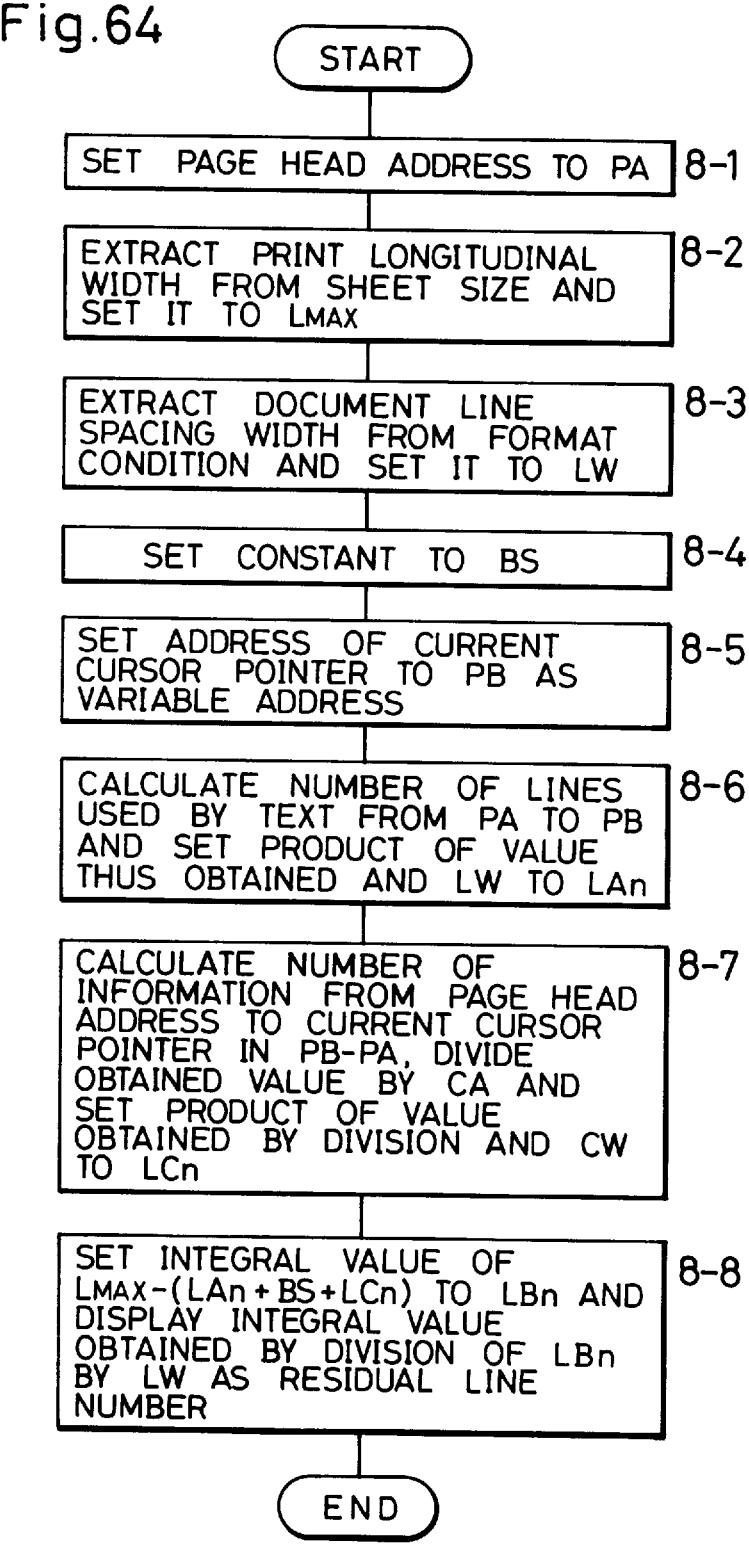
FIG. 64 is a flowchart showing page management.

FIG. 64 is a flowchart for page management edit which explains line management. In FIG. 64, a page head address is set to PA (Step 8-1). A print longitudinal width is extracted from a sheet size and set to Lmax (Step 8-2). A text line spacing width is extracted from the format condition and set to LW, and a constant is set to BS (Steps 8-3 and 8-4). Then, the address of the current cursor pointer is set to PB as a variable address, and the number of lines used by the text from PA to PB is calculated. The product of a value thus obtained and LW is set to LAn (Steps 8-5 and 8-6). Then, (PB−PA) is computed to calculate the number of information from the page head address to the current cursor pointer. A value thus obtained is divided by an encoded line information number CA. The product of a value obtained by division and CW is set to LCn (Step 8-7). Then, Lmax−(LAn+BS+LCn) is computed. An integral value thus obtained is set to LBn. LBn is divided by LW. An integral value obtained by division is displayed as the residual line number (Step 88).

If LBn is a negative value, the next address of the current cursor pointer directly before LBn becomes negative is set to PA as a negative head address, which is not described in the flowchart. In the case where a format is changed in the document, LBn should be set in consideration thereof. When calculating the number of used lines in Step 8-6, the page eject control code for document information is ignored and treated as the page feed code and the page eject control code for code output is treated as the page eject control code.

Figure 65:
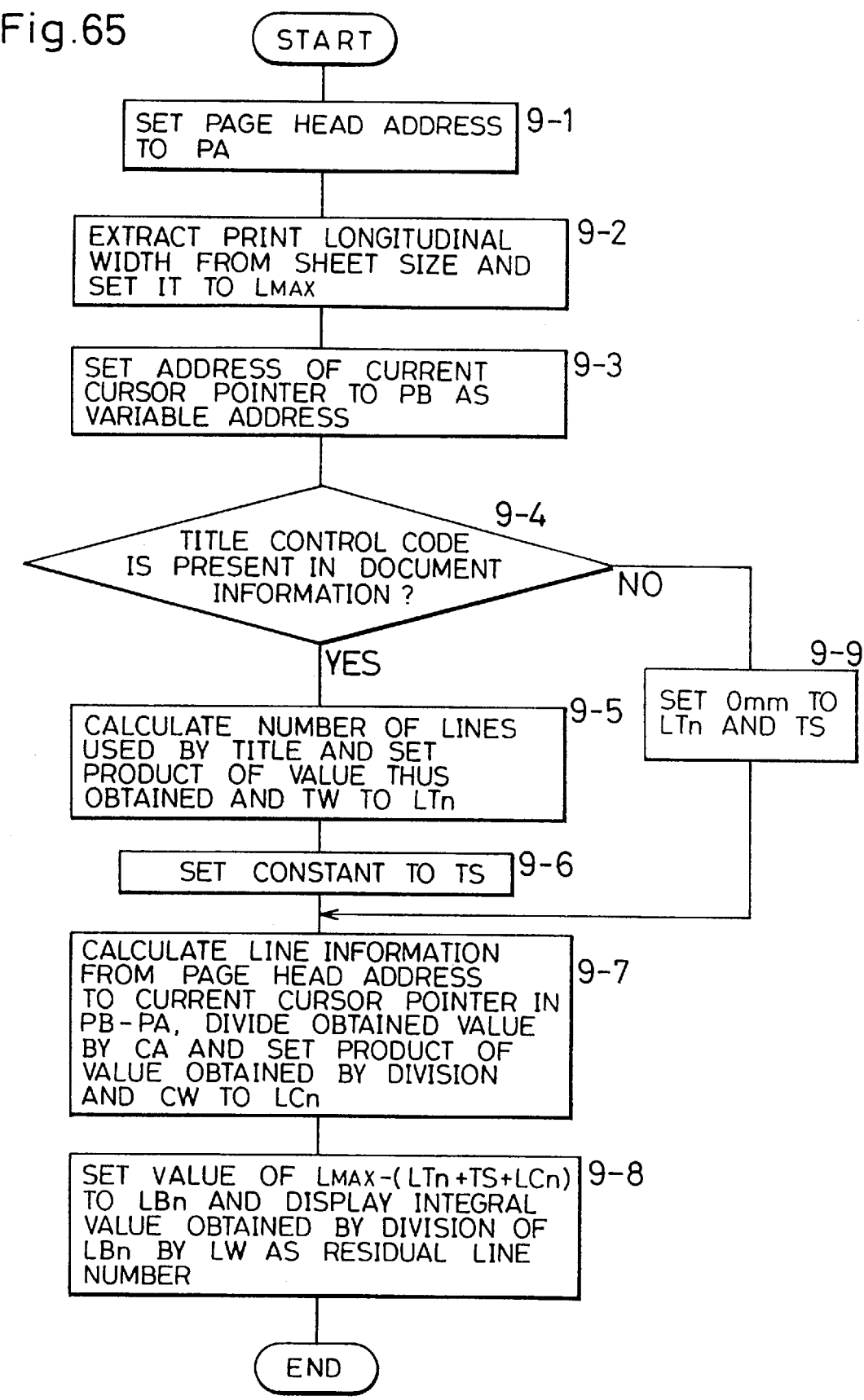
FIG. 65 is a flowchart showing set management.

FIG. 65 is a flowchart for set management edit which explains line management. The details are the same as in FIG. 64. The type information is inputted as a title as required, and the contents of document is treated in two-dimensional bar code. For example, a fixed value (10 mm) can be set to a title space TS. In FIG. 65, a page head address is first set to PA, and a print longitudinal width is extracted from a sheet size and set to Lmax (Steps 9-1 and 9-2). Then, the address of the current cursor pointer is set to PB as a variable address (Step 9-3).

If the title control code is present in the document information, the number of lines used by the title is calculated. The product of a value thus obtained and TW is set to LTn, and a constant (for example, 10 mm) is set to TS (Steps 9-4, 9-5 and 9-6). In Steps 9-7 and 9-8, the same processing is executed as in Steps 8-7 and 8-8 of FIG. 64. If the title control code is not present in the document information in Step 9-4, 0 mm is set to LTn and TS. The routine proceeds to Step 9-7.

Figure 66:
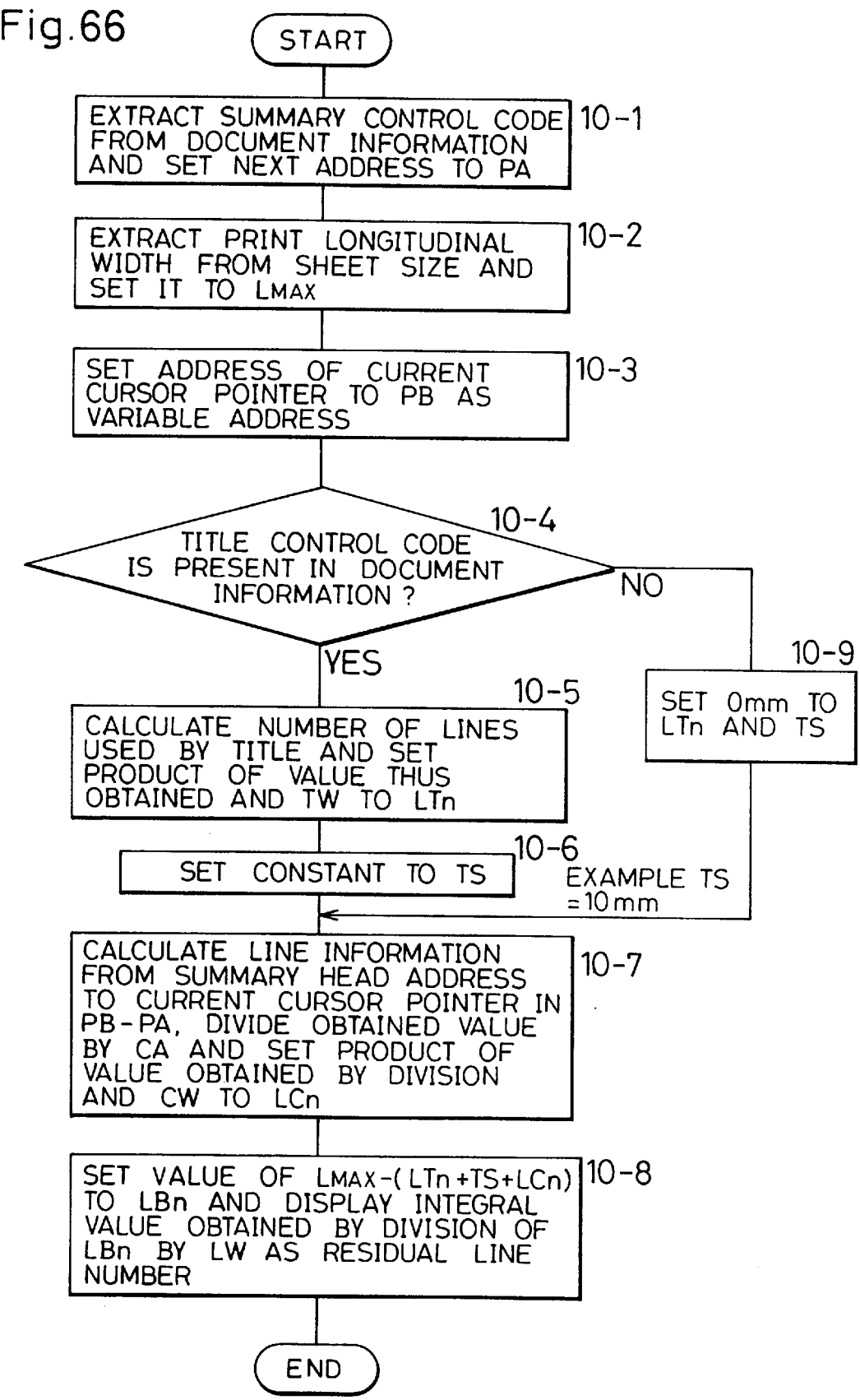
FIG. 66 is a flowchart showing summary management.

FIG. 66 is a flowchart of summary management edit which explains line management. The type information is inputted as a title as required. and the contents of summary document is treated in two-dimensional bar code. For example, a fixed value (10 mm) can be set to a space under a title TS. In FIG. 66, the summary control code is extracted from the document information, and the next address is set to PA. In the subsequent Steps, the same processing is executed as Steps on and after Step 9-2 of FIG. 65.

Figure 67:
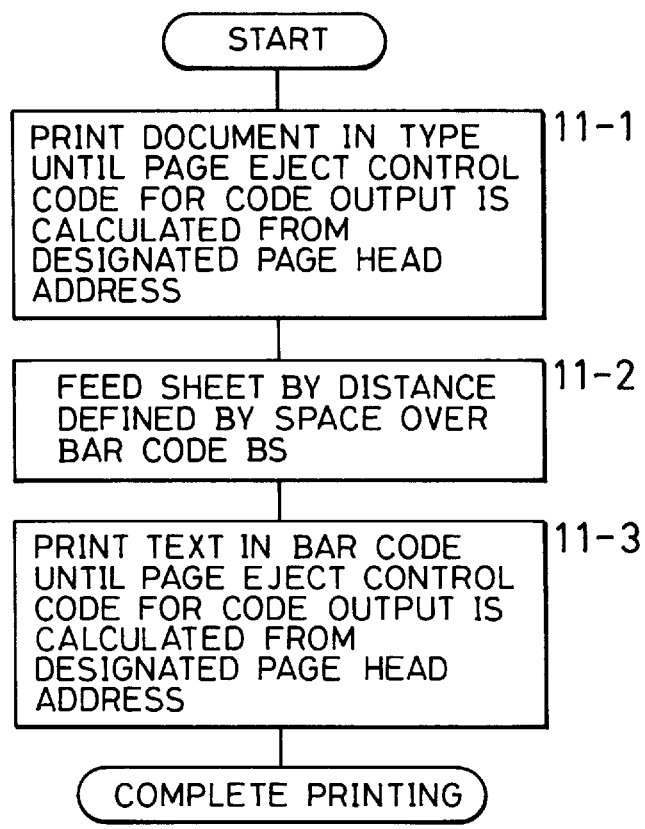
FIG. 67 is a flowchart showing page management print.
Figure 68:
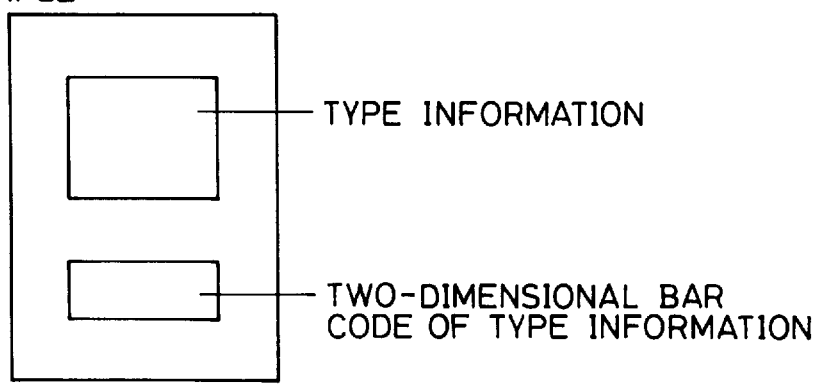
FIG. 68 is a diagram showing an example of the page management print.

FIG. 67 is a flowchart for page management print. In the same way as a print example shown in FIG. 68, the type information and the two-dimensional bar code thereof are outputted. In FIG. 67, a text is printed in type until the page eject control code for code output is detected from the designated page head address (Step 11-1). Then, a sheet is fed by a distance defined by a space BS (Step 11-2). The text is printed in bar code until the page eject control code for code output is detected from the designated page head address (Step 11-3).

Figure 69:
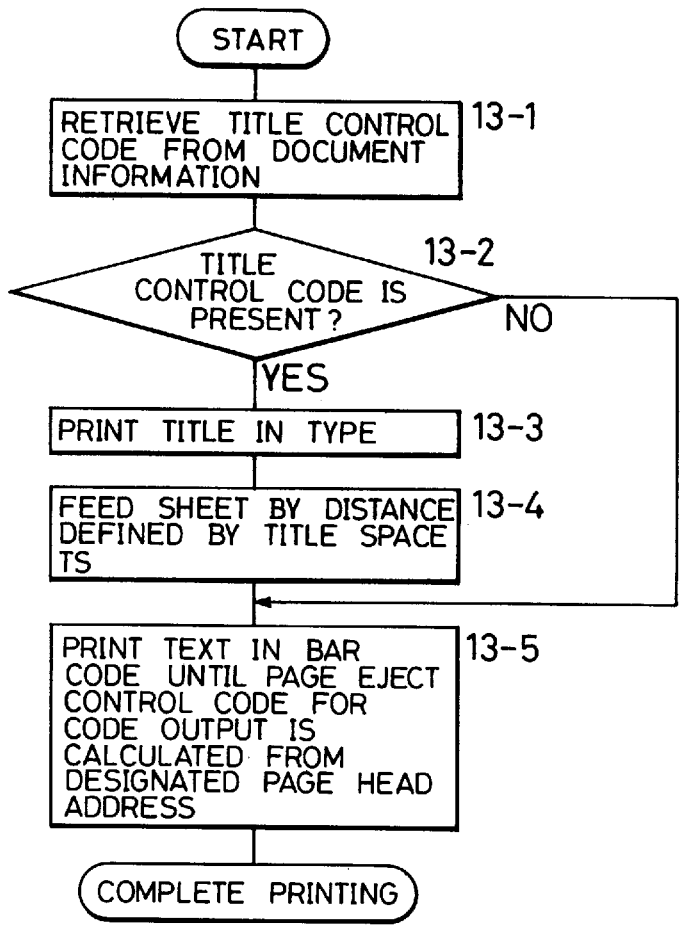
FIG. 69 is a flowchart showing set management print.
Figure 70:
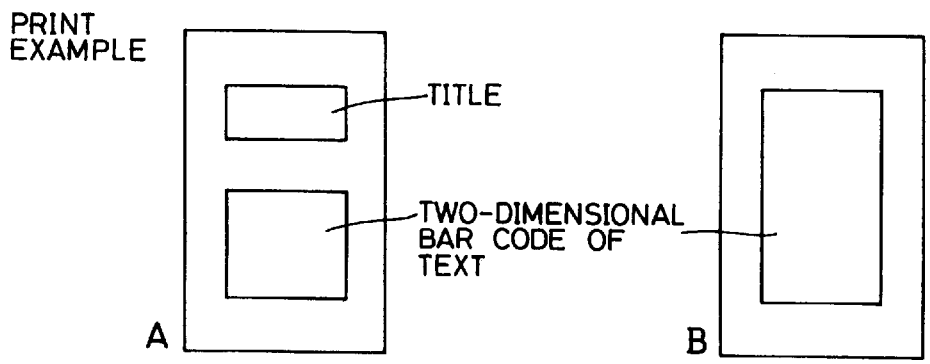
FIGS. 70A and 70B are diagrams showing an example of the set management print.

FIG. 69 is a flowchart for set management print. In the same way as a print example shown in FIG. 70, a title and the two-dimensional bar code of a text are outputted. In FIG. 69, the title control code is retrieved from the document information. If the title control code is present, the title is printed in type (Steps 13-1, 13-2 and 13-3). Then, a sheet is fed by a title space TS (Step 13-4). The text is printed in bar code until the page eject control code for code output is detected from the designated page head address (Step 13-5). If the title control code is not present in Step 13-2, the routine proceeds to Step 13-5.

Figure 71:
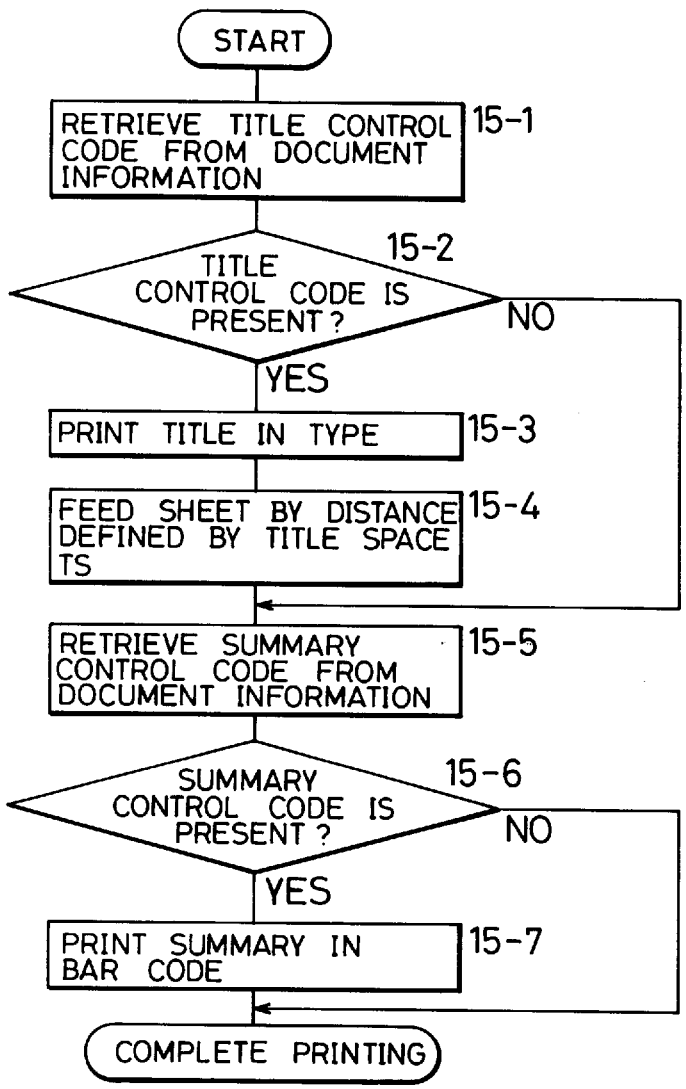
FIG. 71 is a flowchart showing summary management print.
Figure 72:
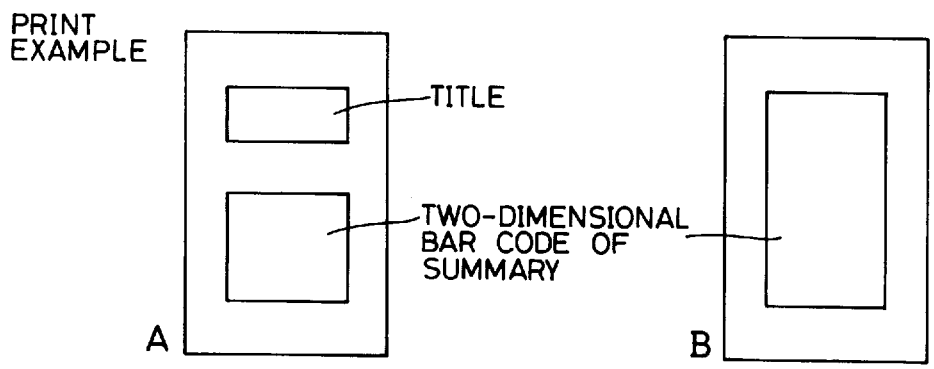
FIGS. 72A and 72B are diagrams showing an example of the summary management print.
Figure 73:
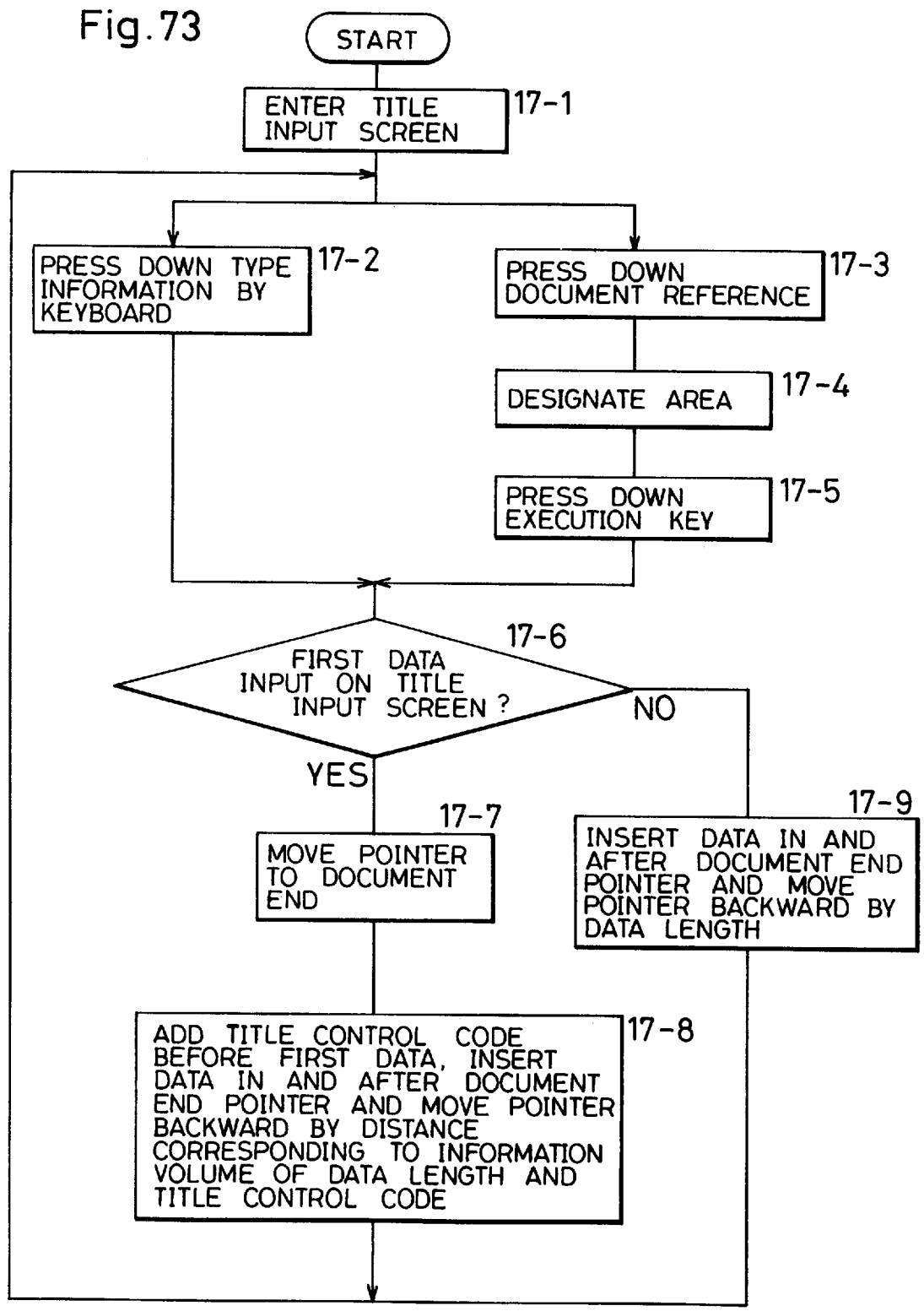
FIG. 73 is a flowchart showing the processing for inserting a title and the title control code for title input into the end of document data.

FIG. 71 is a flowchart for summary management print. In the same way as a print example shown in FIG. 72, the title and the two-dimensional bar code of the summary or the summary document are outputted. In FIG. 73, the title control code is retrieved from the document information. If the title control code is present, the title is printed in type (Steps 15-1, 15-2 and 15-3). The sheet is fed by a title space TS (Step 15-4). The summary control code is retrieved from the document information. If the summary control code is present, the summary is printed in bar code (Steps 15-5, 15-6 and 15-7).

FIG. 73 is a flowchart for inserting the title control code and the title in the title input on 2-screen display into the end of the document data. In FIG. 73, when a title input screen is displayed, "type information" is pressed down by a keyboard. If it is the first data input on the title input screen, a pointer is moved to the end of the document (Steps 17-1, 17-2, 17-6 and 17-7). Then, the title control code is added before the first data to insert the data in and after the document end pointer, and the pointer is moved backward by a distance corresponding to the information volume of the data length and the title control code (Step 17-8).

Figure 74:
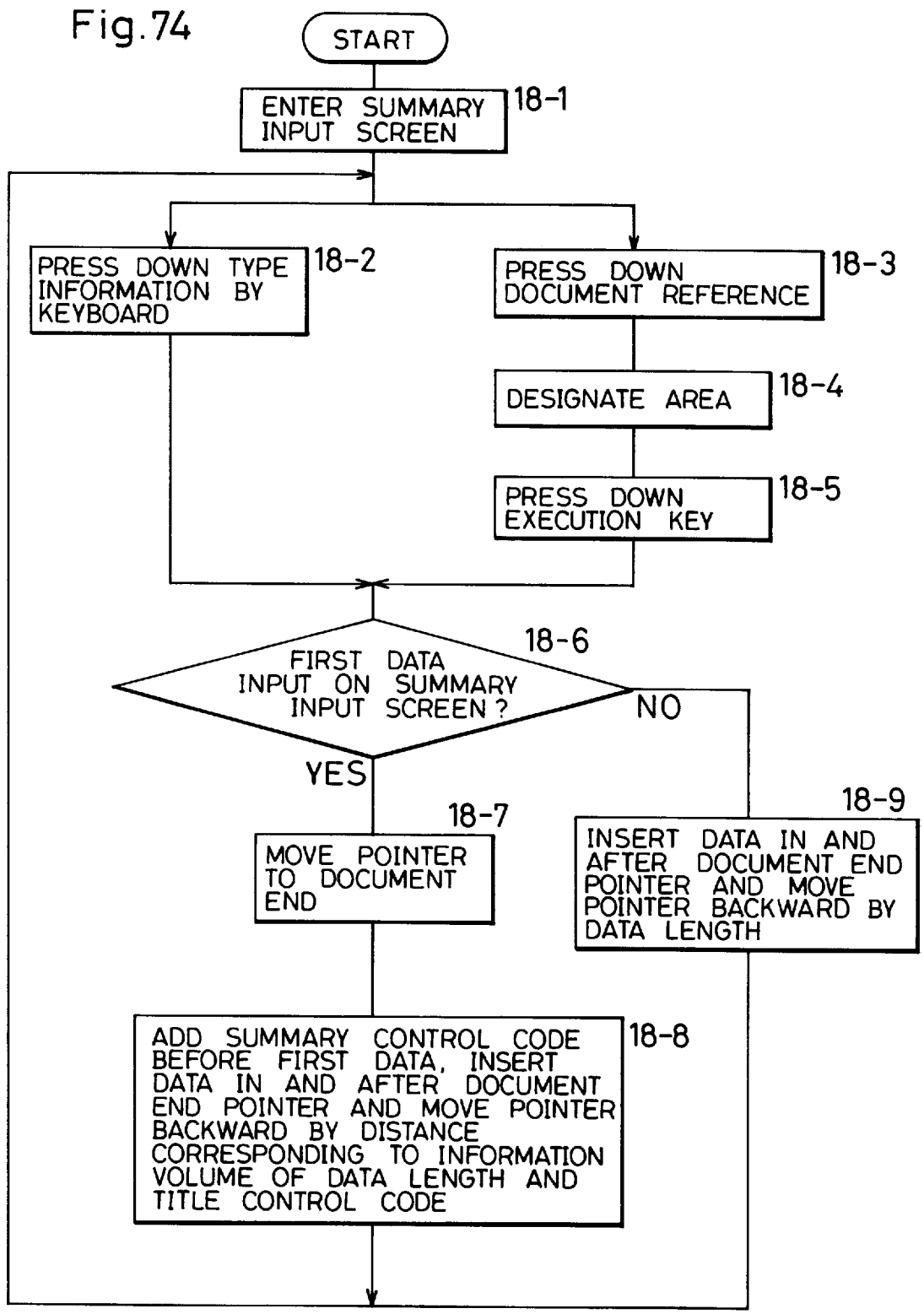
FIG. 74 is a flowchart showing the processing for inserting a summary and the summary title control code for summary input into the end of the document data.
Figure 75:
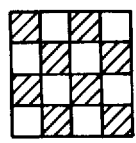
FIG. 75 is a diagram showing an example of two-dimensional bar code.
Figure 76:
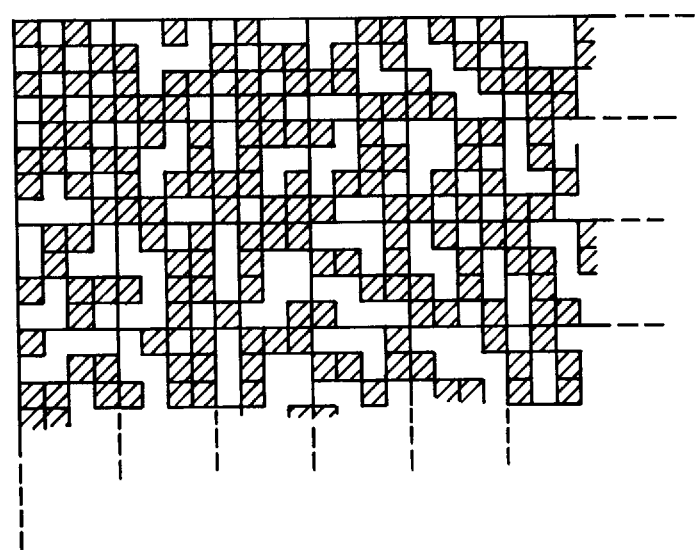
FIG. 76 is a diagram showing an example of two-dimensional bar code print.

In Step 17-1, after the title input screen is displayed, "refer to document" is pressed down by the keyboard to designate an area and an execution key is pressed down (Steps 17-3, 17-4 and 17-5). Consequently, the routine proceeds to Step 17-6. In Step 17-6, if it is not the first data input, the data is inserted in and after the document end pointer and the pointer is moved backward by a distance of the data length (Step 17-9). FIG. 74 is a flowchart for inserting the summary control code and the summary in the summary input on 2-screen display into the end of the document data, in which the processing is the same as in FIG. 73.

According to the structure of the present invention described above with reference to FIGS. 2 and 58 to 76, the character information (type text information) cannot only be printed in type but can be converted into two-dimensional bar code and printed on a sheet medium at a high density. Accordingly, if the two-dimensional bar code printed on the sheet medium is read by a reader such as a scanner, the type information can easily be reproduced.

In general, the two-dimensional bar code can compress more information volume than type print, and can output the information for many pages onto a sheet having the small number of pages. Consequently, the sheet can easily be managed.

Since print is not performed in type, the document information can be kept secret and managed on a sheet.

The information can be managed by a sheet medium. Therefore, it is easy to retain the file for management. Further, the information can be copied more easily. A large amount of information is printed, so that information distribution can greatly be enhanced. The print information which is not necessary can easily be extracted or replaced, and incinerated.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An information reproducer comprising:
   reading means for reading visual information and sound information printed on a printing sheet,
   storage means for storing the visual information and the sound information read by the reading means,
   display means for selectively displaying the stored visual information on a screen,
   visual information designating means for designating a partial area of the visual information displayed on the display screen,
   connecting means for connecting the partial area of the visual information designated by the designating means with a part of the sound information corresponding thereto, and
   sound information reproducing means for reading, from the storage means, and reproducing the sound information connected with the designated visual information.

2. The information reproducer according to claim 1, wherein the printing sheet is produced by an information creating unit, and the information creating unit comprises:
   visual information input means for inputting visual information,
   sound information input means for inputting sound information,
   related information input means for inputting the related information for connecting the visual information with the sound information by the connecting means, and
   printing means for printing the visual information, the sound information and the related information together on a printing sheet.

3. The information reproducer according to claim 2, wherein the sound information and the related information printed on the printing sheet include two-dimensional bar code.

4. The information reproducer according to claim 1, wherein the display means further comprises the function of selectively displaying, on a screen, the sound information stored in the storage means, and the information reproducer further comprises: sound information designating means for partially designating an area of the sound information displayed on the display screen, reproduction control means for making the sound information reproducing means reproduce the sound information in the designated area, display control means for reading from the storage means the visual information connected with the designated sound information and making the display means display the read visual information when the visual information is not displayed in the display means.

5. The information reproducer according to claim 4, further comprising forbidding means for stopping the function of the display control means while the reproduction control means is making the sound information reproducing means reproduce the sound information.

6. The information reproducer according to claim 1, wherein the sound information has a first password for setting a secret, and the information reproducer further comprises password input means for inputting a second password and password reading means for making the sound information reproducing means reproduce the sound information only when the second password coincides with the first password.

7. The information reproducer according to claim 1, wherein the sound information printed on the printing sheet includes two-dimensional bar code.

8. An information reproducing device comprising:
   a reading device that reads visual information and sound information printed on a printing sheet;
   a memory communicating with the reading device, the memory storing the visual information and the sound information read by the reading device;
   a display communicating with the memory, the display selectively displaying the stored visual information on a display screen;
   a visual information designating device operatively coupleable with the display, the visual information designating device enabling a partial area of the visual information displayed on the display screen to be designated;

a connecting device communicating with the display through the visual information designating device, the connecting device connecting the partial area of the visual information designated by the visual information designating device with a part of the sound information corresponding thereto; and a sound information reproducing device communicating with the connecting device and the memory, the sound information reproducing device reading, from the memory, and reproducing the sound information connected with the designated partial area of the visual information.

9. The information reproducing device according to claim 8, wherein the reading device comprises a scanner and wherein the visual information designating device comprises at least one of a keyboard, a pen, a tablet, a coordinate detecting circuit and a cursor position control circuit.

10. A method of reproducing information using a two-dimensional bar code, the method comprising:

(a) reading visual information and sound information printed on a printing sheet;

(b) storing the visual information and the sound information read in step (a) in a memory;

(c) selectively displaying the stored visual information on a display screen;

(d) designating a partial area of the visual information displayed on the display screen;

(e) connecting the partial area of the visual information designated in step (d) with a part of the sound information corresponding thereto; and (f) reading, from the memory, and reproducing the sound information connected with the designated partial area of the visual information.

11. An information reproducer comprising:

reading means for optically reading visual information, sound information and relative relational information printed on a printing sheet, the sound information and the relative relational information including two-dimensional bar code, storage means for storing the visual information, the sound information and the relative relational information read by the reading means, display means for selectively displaying the stored visual information on a screen, visual information designating means for designating a partial area of the visual information displayed on the display screen, connecting means for connecting the partial area of the visual information designated by the designating means with a part of the sound information corresponding thereto in accordance with the relative relational information, and sound information reproducing means for reading, from the storage means, and reproducing the sound information connected with the designated visual information.

* * * * *